(12) United States Patent
Kaneoya et al.

(10) Patent No.: US 9,442,321 B2
(45) Date of Patent: *Sep. 13, 2016

(54) LIQUID CRYSTAL DISPLAY DEVICE

(71) Applicant: DIC CORPORATION, Tokyo (JP)

(72) Inventors: Masakazu Kaneoya, Kita-adachi-gun (JP); Kiyofumi Takeuchi, Kita-adachi-gun (JP); Seiji Funakura, Kamisu (JP); Isao Oshiumi, Tokyo (JP); Katsunori Shimada, Sakura (JP)

(73) Assignee: DIC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/649,379

(22) PCT Filed: Nov. 26, 2013

(86) PCT No.: PCT/JP2013/081728
§ 371 (c)(1),
(2) Date: Jun. 3, 2015

(87) PCT Pub. No.: WO2014/087880
PCT Pub. Date: Jun. 12, 2014

(65) Prior Publication Data
US 2015/0309361 A1 Oct. 29, 2015

(30) Foreign Application Priority Data

Dec. 4, 2012 (JP) .................................. 2012-265199
Jun. 17, 2013 (JP) .................................. 2013-126575

(51) Int. Cl.
*C09K 19/60* (2006.01)
*G02F 1/1335* (2006.01)
(Continued)

(52) U.S. Cl.
CPC ..... *G02F 1/133514* (2013.01); *C09K 19/2014* (2013.01); *C09K 19/3001* (2013.01);
(Continued)

(58) Field of Classification Search
CPC .................................................. G02F 1/133514
See application file for complete search history.

(56) References Cited

U.S. PATENT DOCUMENTS 8,178,173 B1 5/2012 Matsumoto et al.
8,860,912 B2 10/2014 Kaneoya et al.
(Continued)

FOREIGN PATENT DOCUMENTS

CN 1784481 A 6/2006
CN 101817992 A 9/2010
(Continued)

OTHER PUBLICATIONS

International Search Report dated Feb. 18, 2014, issued in corresponding application No. PCT/JP2013/081728, (2 pages).
(Continued)

*Primary Examiner* — Chancecity Robinson
(74) *Attorney, Agent, or Firm* — Westerman, Hattori, Daniels & Adrian, LLP

(57) ABSTRACT

There is provided a liquid crystal display apparatus that may limit a reduction in the voltage holding ratio (VHR) of a liquid crystal layer and limit an increase in the ion density (ID) in the liquid crystal layer and address issues of faulty display such as white missing pixels, alignment inconsistencies, and burn-in. The liquid crystal display apparatus includes a first substrate, a second substrate, a liquid crystal composition layer held between the first substrate and the second substrate, a color filter including a black matrix and at least RGB three-color pixel portions, a pixel electrode, and a common electrode. The liquid crystal composition layer is composed of a liquid crystal composition including one or more compounds represented by General Formula (LC1).

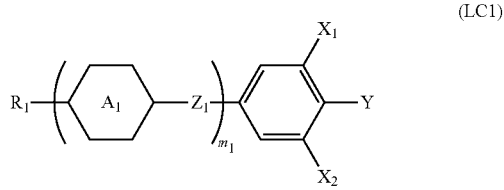

(LC1)

14 Claims, 1 Drawing Sheet

(51) Int. Cl.
*C09K 19/32* (2006.01)
*C09K 19/20* (2006.01)
*C09K 19/54* (2006.01)
*G02F 1/13* (2006.01)
*C09K 19/04* (2006.01)
*C09K 19/12* (2006.01)
*C09K 19/30* (2006.01)
*C09K 19/52* (2006.01)

(52) U.S. Cl.
CPC ......... *C09K19/3066* (2013.01); *C09K 19/322* (2013.01); *C09K 19/542* (2013.01); *C09K 19/60* (2013.01); *G02F 1/133512* (2013.01); C09K 2019/0448 (2013.01); C09K 2019/0466 (2013.01); C09K 2019/122 (2013.01); C09K 2019/123 (2013.01); C09K 2019/301 (2013.01); C09K 2019/3004 (2013.01); C09K 2019/304 (2013.01); C09K 2019/3016 (2013.01); C09K 2019/3021 (2013.01); C09K 2019/3036 (2013.01); C09K 2019/3037 (2013.01); C09K 2019/523 (2013.01); G02F 1/13 (2013.01)

(56) References Cited

U.S. PATENT DOCUMENTS

| 8,885,124 B2 | 11/2014 | Kaneoya et al. |
| 9,120,968 B2 | 9/2015 | Kaneoya et al. |
| 2006/0257763 A1 | 11/2006 | Araki |
| 2010/0097562 A1 | 4/2010 | Park et al. |
| 2010/0271569 A1 | 10/2010 | Ohkuma et al. |
| 2011/0058138 A1 | 3/2011 | Huh et al. |
| 2011/0297881 A1 | 12/2011 | Hirata et al. |
| 2015/0232757 A1 | 8/2015 | Kaneoya et al. |
| 2015/0232758 A1 | 8/2015 | Kuriyama et al. |

FOREIGN PATENT DOCUMENTS

| JP | 2000-019321 A | 1/2000 |
| JP | 2000-192040 A | 7/2000 |
| JP | 2006-317602 A | 11/2006 |
| JP | 2007-133131 A | 5/2007 |
| JP | 2008-144105 A | 6/2008 |
| JP | 2009-007432 A | 1/2009 |
| JP | 2009-58546 A | 3/2009 |
| JP | 2009-109542 A | 5/2009 |
| JP | 2009-163014 A | 7/2009 |
| JP | 2010-189560 A | 9/2010 |
| JP | 2010-250117 A | 11/2010 |
| JP | 2010-256509 A | 11/2010 |
| JP | 2010-260997 A | 11/2010 |
| JP | 2011-141356 A | 7/2011 |
| JP | 2011-186043 A | 9/2011 |
| TW | 200621898 A | 7/2006 |
| WO | 2004/099343 A1 | 11/2004 |
| WO | 2010/095506 A1 | 8/2010 |

OTHER PUBLICATIONS

International Search Report, dated May 7, 2013, issued in corresponding appllication No. PCT/JP2013/045351(2 pages).

LIQUID CRYSTAL DISPLAY DEVICE

TECHNICAL FIELD

The present invention relates to a liquid crystal display apparatus.

BACKGROUND ART

Liquid crystal display apparatuses have been widely used in clocks, electronic calculators, various home appliances, measuring equipment, panels for automobiles, word processors, electronic personal organizers, printers, computers, TVs, and the like. Common examples of liquid crystal display methods include a TN (twisted nematic) type, a STN (super-twisted nematic) type, a DS (dynamic light scattering) type, a GH (guest-host) type, an IPS (in-plane switching) type, an OCB (optically compensated birefringence) type, an ECB (electrically controlled birefringence) type, a VA (vertical alignment) type, a CSH (color super-homeotropic) type, and a FLC (ferroelectric liquid crystal). There has been a shift in the driving method used from a conventional static driving to a multiplex driving, which has been commonly employed. Simple-matrix liquid crystal displays and, recently, active-matrix (AM) liquid crystal displays, which are driven using a TFT (thin-film transistor), a TFD (thin-film diode), or the like, have been widely employed.

As illustrated in FIG. 1, a common liquid crystal display apparatus includes two substrates (1) each including an alignment film (4); a transparent electrode layer (3a) serving as a common electrode and a color filter layer (2), which are interposed between one of the alignment film and the corresponding substrate; and a pixel electrode layer (3b) interposed between the other alignment film and the corresponding substrate. The two substrates are arranged so that the alignment films face each other, and a liquid crystal layer (5) is held therebetween.

The color filter layer includes a color filter constituted by a black matrix, a red-colored layer (R), a green-colored layer (G), a blue-colored layer (B), and, as needed, a yellow-colored layer (Y).

The amount of impurities contained in a liquid crystal material constituting the liquid crystal layer is strictly controlled because any impurities remaining in the liquid crystal material would greatly affect the electrical characteristics of the display apparatus. It is known that the material constituting the alignment film also affects the electrical characteristics of the liquid crystal layer because any impurities remaining in the alignment film, which is in direct contact with the liquid crystal layer, would migrate into the liquid crystal layer. Thus, the characteristics of the liquid crystal display apparatus due to impurities contained in a material of the alignment film is currently being studied.

As well as a material of the alignment film, a material of the color filter layer, such as an organic pigment, is also considered to affect the liquid crystal layer due to impurities contained in the material of the color filter layer. The direct effect of a material of the color filter layer on the liquid crystal layer has been considered to be very small compared with the effect of a material of the alignment film since the alignment film and the transparent electrode are interposed between the color filter layer and the liquid crystal layer. However, the thickness of the alignment film is generally 0.1 μm or less, and the thickness of the transparent electrode serving as a common electrode disposed on the color-filter-layer side is generally 0.5 μm or less, even in the case where the thickness of the transparent electrode is increased in order to increase electrical conductivity. Therefore, it cannot be said that the color filter layer and the liquid crystal layer are in an environment where they are completely isolated from each other. Consequently, the impurities contained in the color filter layer, which migrate via an alignment film and a transparent electrode, may reduce the voltage holding ratio (VHR) of the liquid crystal layer and may increase the ion density (ID) in the liquid crystal layer, which results in faulty display such as white missing pixels, alignment inconsistencies, and burn-in.

In order to address the faulty display caused by impurities contained in pigments constituting the color filter, a method of controlling elution of impurities into a liquid crystal by using a pigment such that the proportion of a substance extracted from the pigment with ethyl formate is set to be equal to or less than a specific value (PTL 1) and a method of controlling elution of impurities into a liquid crystal by specifying a pigment contained in a blue colored layer (PTL 2) have been studied. However, there is not a great difference between these methods and a method of simply reducing the amount of impurities contained in a pigment, and these methods provide unsatisfactory improvements in addressing the faulty display in the present situation in which progress has been made in purification techniques for pigments.

On the other hand, focusing on the relationship between organic impurities contained in the color filter and the liquid crystal composition, a method in which the degree of difficulty in dissolving organic impurities in the liquid crystal layer is represented as a hydrophobicity parameter of liquid crystal molecules contained in the liquid crystal layer and the hydrophobicity parameter is controlled to be equal to or more than a specific value; and, on the basis of the correlation between the hydrophobicity parameter and a $-OCF_3$ group at the end of the liquid crystal molecule, a method in which the content of a liquid crystal compound having an $-OCF_3$ group at the end of the liquid crystal molecule in a liquid crystal composition is controlled to a specific value or more have been disclosed (PTL 3). However, the essence of the invention disclosed in the cited document is reducing the effect of impurities contained in a pigment on the liquid crystal layer, and there was no study on the direct relationship between the structure of a pigment used for producing a color filter and the structure of a liquid crystal material.

It has been disclosed that voltage holding ratio (VHR) may be increased by using a pigment washed with deionized water until the specific electrical conductivity of the filtrate of the deionized water used for the washing treatment reaches 20 μS/cm or less. However, there is no description about the specific electrical conductivity of the pigment, and the voltage holding ratio was about 95% (PTL 4), which was insufficient to address the faulty display of liquid crystal display elements, which are becoming more advanced.

It is known that the water-soluble content and the specific electrical conductivity of a pigment may affect the anticorrosive effect of an anticorrosive paint and ease of ejecting ink-jet ink (PTL 5 and PTL 6). However, it is not known how the combination of the water-soluble content and specific electrical conductivity of a pigment and the structure of a liquid crystal material constituting a liquid crystal layer affect faulty display of a liquid crystal display element. Thus, the issue of faulty display of liquid crystal display apparatuses, which are becoming more advanced, has not yet been addressed.

CITATION LIST

Patent Literature

PTL 1: Japanese Unexamined Patent Application Publication No. 2000-19321
PTL 2: Japanese Unexamined Patent Application Publication No. 2009-109542
PTL 3: Japanese Unexamined Patent Application Publication No. 2000-192040
PTL 4: Japanese Unexamined Patent Application Publication No. 2009-7432
PTL 5: Japanese Unexamined Patent Application Publication No. 2008-144105
PTL 6: Japanese Unexamined Patent Application Publication No. 2010-260997

SUMMARY OF INVENTION

Technical Problem

The present invention provides a liquid crystal display apparatus including a specific liquid crystal composition and a color filter including a pigment having a certain water-soluble content and/or a certain specific electrical conductivity, which may limit a reduction in the voltage holding ratio (VHR) of a liquid crystal layer and limit an increase in the ion density (ID) in the liquid crystal layer and address issues of faulty display such as white missing pixels, alignment inconsistencies, and burn-in.

Solution to Problem

In order to address the above-described issues, the inventors of the present invention have conducted extensive studies on the combination of the water-soluble content and/or specific electrical conductivity of a pigment constituting a color filter and the structure of a liquid crystal material constituting a liquid crystal layer. As a result, the inventors have found that a liquid crystal display apparatus that includes a liquid crystal material having a specific structure and a color filter prepared using a pigment having a certain water-soluble content and/or a certain specific electrical conductivity may limit a reduction in the voltage holding ratio (VHR) of a liquid crystal layer and limit an increase in the ion density (ID) in the liquid crystal layer and address the issues of faulty display such as white missing pixels, alignment inconsistencies, and burn-in. Thus, the present invention was made.

Specifically, the present invention provides a liquid crystal display apparatus including a first substrate, a second substrate, a liquid crystal composition layer held between the first substrate and the second substrate, a color filter including a black matrix and at least RGB three-color pixel portions, a pixel electrode, and a common electrode.

The liquid crystal composition layer is composed of a liquid crystal composition including one or more compounds selected from a group consisting of compounds represented by General Formula (LC1) and General Formula (LC2). The amount of the one or more compounds is more than 90% by mass of the total amount of liquid crystal compounds having a dielectric anisotropy of 2 or more.

[Chem. 1]

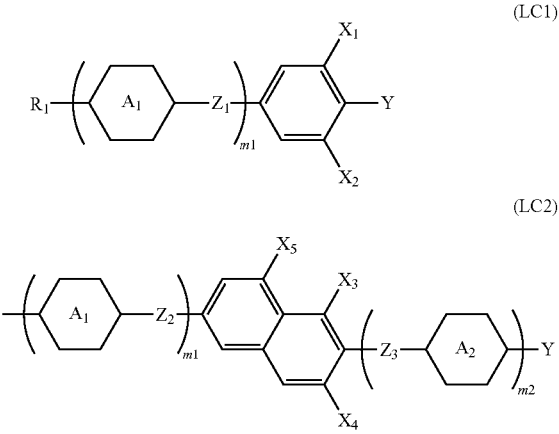

(where $R_1$ each independently represents an alkyl group having 1 to 15 carbon atoms; one or more $CH_2$ groups of the alkyl group may be replaced by —O—, —CH=CH—, —CO—, —OCO—, —COO—, —C≡C—, —CF$_2$O—, or —OCF$_2$— in such a manner that an oxygen atom is not directly adjacent to another oxygen atom; one or more hydrogen atoms of the alkyl group may optionally be replaced by a halogen; $A_1$ and $A_2$ each independently represent any one of the following structures:

[Chem. 2]

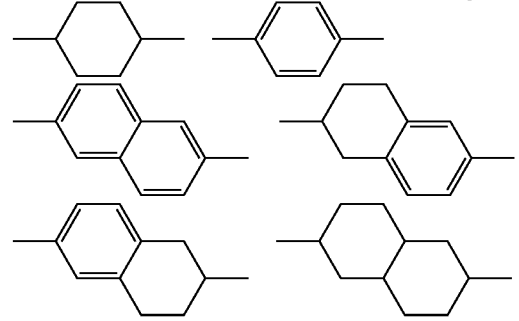

(in these structures, one or more $CH_2$ groups of the cyclohexane ring may be replaced by an oxygen atom, one or more CH groups of the benzene ring may be replaced by a nitrogen atom, and one or more hydrogen atoms may be replaced by F, Cl, $CF_3$, or $OCF_3$); $X_1$ to $X_5$ each independently represent a hydrogen atom, Cl, F, $CF_3$, or $OCF_3$; Y each independently represents a hydrogen atom, Cl, F, $CF_3$, $OCH_2F$, $OCHF_2$, or $OCF_3$; $Z_1$ to $Z_3$ each independently represent a single bond, —CH=CH—, —CF=CF—, —C≡C—, —CH$_2$CH$_2$—, —(CH$_2$)$_4$—, —OCH$_2$—, —CH$_2$O—, —OCF$_2$—, —CF$_2$O—, —COO—, or —OCO—; $m_1$ and $m_2$ are each independently an integer of 0 to 3; and $m_1+m_2$ is 1, 2, or 3).

The RGB three-color pixel portions include, as a coloring material, a pigment having a water-soluble content of 0% by mass or more and 1.5% by mass or less and/or a specific electrical conductivity of 10 μS/cm or more and 150 μS/cm or less.

Advantageous Effects of Invention

The liquid crystal display apparatus according to the present invention includes a specific liquid crystal composition and a color filter including a pigment having a certain water-soluble content and/or a certain specific electrical conductivity, which may limit a reduction in the voltage holding ratio (VHR) of a liquid crystal layer and limit an increase in the ion density (ID) in the liquid crystal layer and address issues of faulty display such as white missing pixels, alignment inconsistencies, and burn-in.

REFERENCE SIGNS LIST

1 Substrate
2 Color filter layer
2*a* Color filter layer including a specific pigment
3*a* Transparent electrode layer (common electrode)
3*b* Pixel electrode layer
4 Alignment film
5 Liquid crystal layer
5*a* Liquid crystal layer including a specific liquid crystal composition

DESCRIPTION OF EMBODIMENTS

Figure 1:
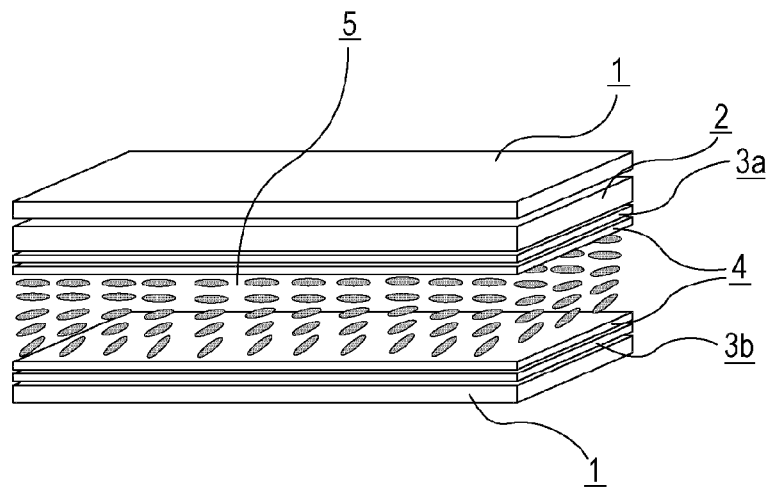
FIG. 1 is a diagram illustrating an example of a common liquid crystal display apparatus of the related art.
Figure 2:
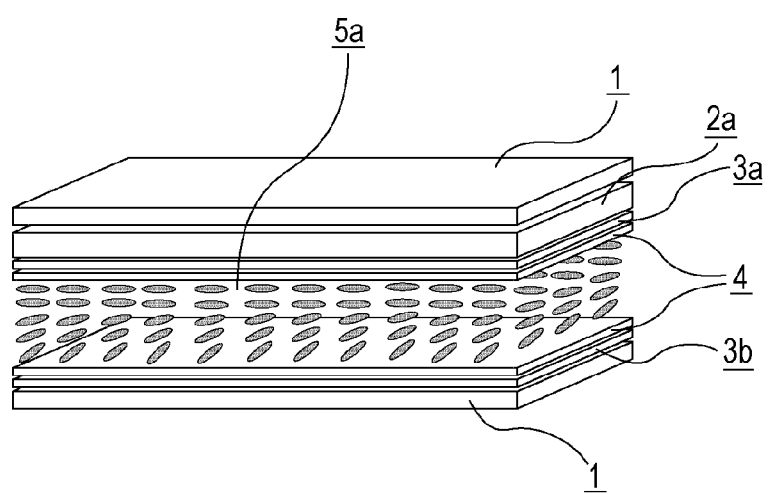
FIG. 2 is a diagram illustrating an example of a liquid crystal display apparatus according to the present invention.

FIG. 2 illustrates an example of the liquid crystal display apparatus according to the present invention, which includes two substrates (1), namely, a first substrate and a second substrate, each including an alignment film (4); a transparent electrode layer (3*a*) serving as a common electrode and a color filter layer (2*a*) including a specific pigment, which are interposed between one of the alignment films and the corresponding substrate; and a pixel electrode layer (3*b*) interposed between the other alignment film and the corresponding substrate. The two substrates are arranged so that the alignment films face each other, and a liquid crystal layer (5*a*) including a specific liquid crystal composition is held therebetween.

The two substrates of the display apparatus are bonded together using a sealant and an encapsulant disposed in the periphery of the substrates. In many cases, granular spacers or resin spacer pillars formed by photolithography are disposed between the substrates in order to maintain a certain distance between the substrates.

(Liquid Crystal Layer)

The liquid crystal layer included in the liquid crystal display apparatus according to the present invention is composed of a liquid crystal composition including one or more compounds selected from a group consisting of compounds represented by General Formula (LC1) and General Formula (LC2). The amount of the compounds is more than 90% by mass of the total amount of liquid crystal compounds having a dielectric anisotropy of 2 or more.

[Chem. 3]

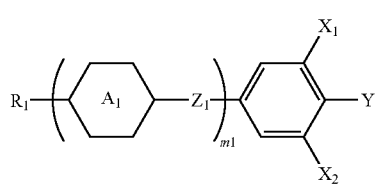

(LC1)

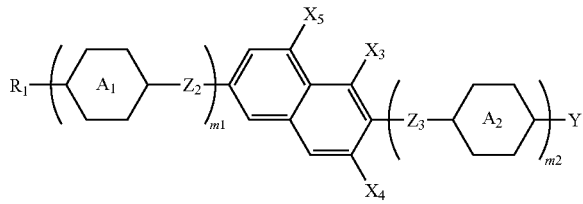

(LC2)

(where $R_1$ each independently represents an alkyl group having 1 to 15 carbon atoms; one or more $CH_2$ groups of the alkyl group may be replaced by —O—, —CH=CH—, —CO—, —OCO—, —COO—, —C≡C—, —$CF_2$O—, or —$OCF_2$— in such a manner that an oxygen atom is not directly adjacent to another oxygen atom; one or more hydrogen atoms of the alkyl group may optionally be replaced by a halogen; $A_1$ and $A_2$ each independently represent any one of the following structures:

[Chem. 4]

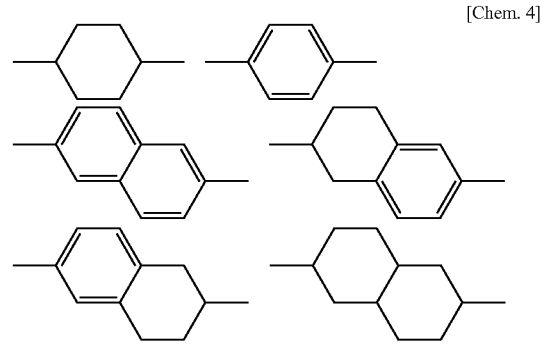

(in these structures, one or more $CH_2$ groups of the cyclohexane ring may be replaced by an oxygen atom, one or more CH groups of the benzene ring may be replaced by a nitrogen atom, and one or more hydrogen atoms may be replaced by F, Cl, $CF_3$, or $OCF_3$); $X_1$ to $X_5$ each independently represent a hydrogen atom, Cl, F, $CF_3$, or $OCF_3$; Y each independently represents a hydrogen atom, Cl, F, $CF_3$, $OCH_2F$, $OCHF_2$, or $OCF_3$; $Z_1$ to $Z_3$ each independently represent a single bond, —CH=CH—, —CF=CF—, —C≡C—, —$CH_2CH_2$—, —$(CH_2)_4$—, —$OCH_2$—, —$CH_2O$—, —$OCF_2$—, —$CF_2O$—, —COO—, or —OCO—; $m_1$ and $m_2$ are each independently an integer of 0 to 3; and $m_1+m_2$ is 1, 2, or 3).

$R_1$ is preferably each independently an alkyl group having 1 to 7 carbon atoms, an alkoxy group having 1 to 7 carbon atoms, or an alkenyl group having 2 to 7 carbon atoms and is more preferably each independently an alkyl group having 1 to 5 carbon atoms, an alkoxy group having 1 to 5 carbon atoms, or an alkenyl group having 2 to 5 carbon atoms.

$A_1$ and $A_2$ are preferably each independently any one of the following structures:

[Chem. 5]

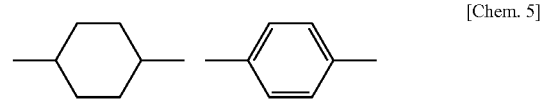

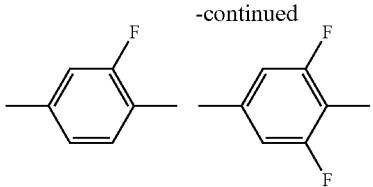

Y is preferably each independently F, $CF_3$, or $OCF_3$ and is particularly preferably F.

$Z_1$ to $Z_3$ are preferably each independently a single bond, —$CH_2CH_2$—, —COO—, —OCO—, —$OCH_2$—, —$CH_2O$—, —$OCF_2$—, or —$CF_2O$— and are more preferably each independently a single bond, —$CH_2CH_2$—, —$OCF_2$—, or —$CF_2O$—, and $m_1$ and $m_2$ are preferably each independently 1 or 2.

The above-described liquid crystal composition preferably further includes one or more compounds represented by General Formula (LC5) below:

[Chem. 6]

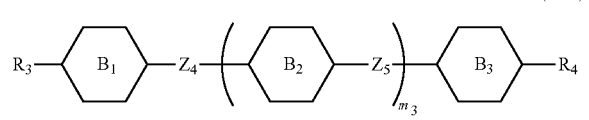

(LC5)

(in General Formula (LC5), $R_3$ and $R_4$ each independently represent an alkyl group having 1 to 15 carbon atoms; one or more $CH_2$ groups of the alkyl group may be replaced by —O—, —CH=CH—, —CO—, —OCO—, —COO—, —C≡C—, —$CF_2O$—, or —$OCF_2$— in such a manner that an oxygen atom is not directly adjacent to another oxygen atom; one or more hydrogen atoms of the alkyl group may optionally be replaced by a halogen; $B_1$ to $B_3$ each independently represent any one of the following structures:

[Chem. 7]

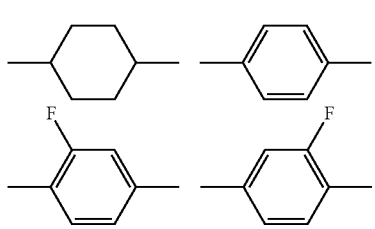

(in these structures, one or more $CH_2CH_2$ groups of the cyclohexane ring may be replaced by —CH=CH—, —$CF_2O$—, or —$OCF_2$— and one or more CH groups of the benzene ring may be replaced by a nitrogen atom); $Z_4$ and $Z_5$ each independently represent a single bond, —CH=CH—, —CF=CF—, —C≡C—, —$CH_2CH_2$—, —$(CH_2)_4$—, —COO—, —$OCH_2$—, —$CH_2O$—, —$OCF_2$—, or —$CF_2O$—; and $m_3$ is 0 to 3).

$R_3$ and $R_4$ are preferably each independently an alkyl group having 1 to 7 carbon atoms, an alkoxy group having 1 to 7 carbon atoms, an alkenyl group having 2 to 7 carbon atoms, or an alkenyloxy group having 2 to 7 carbon atoms and are more preferably each independently an alkyl group having 1 to 5 carbon atoms, an alkoxy group having 1 to 5 carbon atoms, or an alkenyl group having 2 to 5 carbon atoms.

$B_1$ to $B_3$ are preferably each independently any one of the following structures:

[Chem. 8]

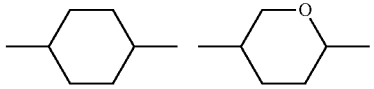

$Z_4$ and $Z_5$ are preferably each independently a single bond, —$CH_2CH_2$—, —COO—, —$OCH_2$—, —$CH_2O$—, —$OCF_2$—, or —$CF_2O$— and are more preferably each independently a single bond or —$CH_2CH_2$—, and $m_3$ is preferably 0, 1, or 2.

The compound represented by General Formula (LC1) is preferably one or more compounds selected from the group consisting of the compounds represented by General Formula (LC1)-1 to General Formula (LC1)-4 below:

[Chem. 9]

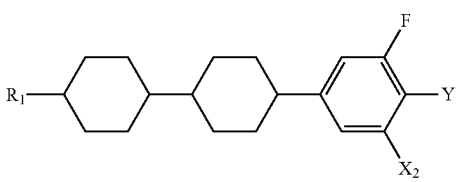

(LC1)-1

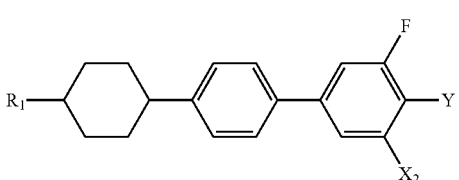

(LC1)-2

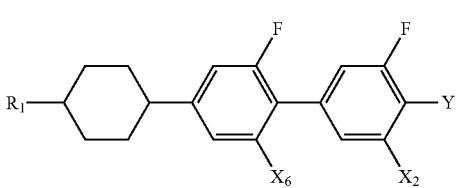

(LC1)-3

(LC1)-4

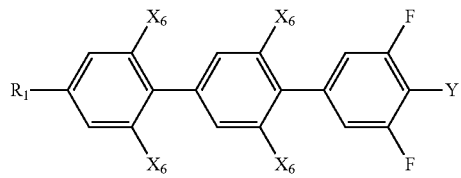

(in General Formulae (LC1)-1 to (LC1)-4, $R_1$ each independently represents an alkyl group having 1 to 15 carbon atoms; one or more $CH_2$ groups of the alkyl group may be replaced by —O—, —CH=CH—, —CO—, —OCO—, —COO—, —C≡C—, —$CF_2$O—, or —O$CF_2$— in such a manner that an oxygen atom is not directly adjacent to another oxygen atom; $X_2$ and $X_6$ each independently represent a hydrogen atom, Cl, F, $CF_3$, or $OCF_3$; when a plurality of $X_6$'s are present, they may be identical or different; and Y each independently represents Cl, F, $CF_3$, $OCH_2F$, $OCHF_2$, or $OCF_3$).

$R_1$ is preferably each independently an alkyl group having 1 to 7 carbon atoms, an alkoxy group having 1 to 7 carbon atoms, or an alkenyl group having 2 to 7 carbon atoms and is more preferably an alkyl group having 1 to 5 carbon atoms, an alkoxy group having 1 to 5 carbon atoms, or an alkenyl group having 2 to 5 carbon atoms.

$X_2$ and $X_6$ are preferably each independently a hydrogen atom or F.

Y is preferably each independently F, $CF_3$, or $OCF_3$.

The compound represented by General Formula (LC1) is preferably one or more compounds selected from the group consisting of the compounds represented by General Formula (LC1)-5 to General Formula (LC1)-24 below:

[Chem. 10]

(LC1)-5

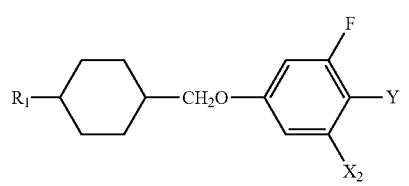

(LC1)-6

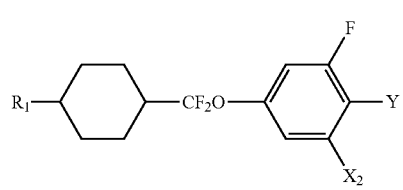

(LC1)-7

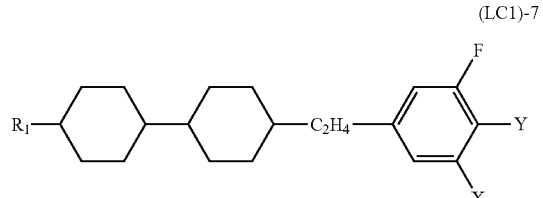

(LC1)-8

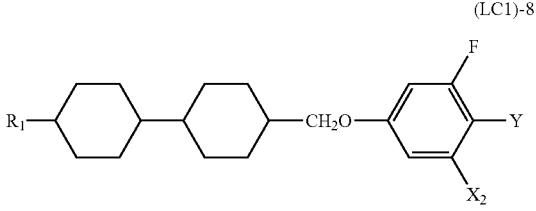

(LC1)-9

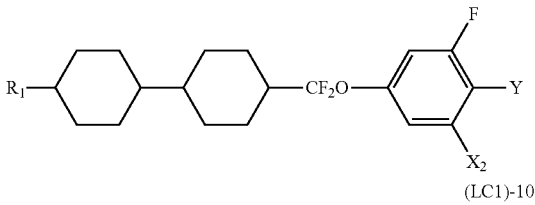

(LC1)-10

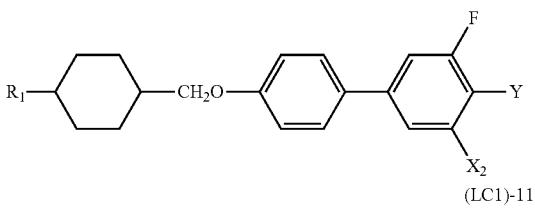

(LC1)-11

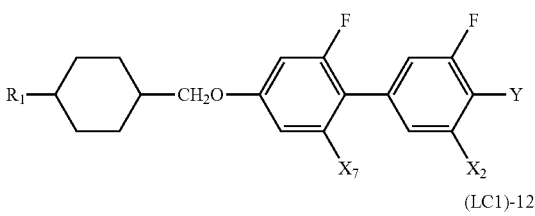

(LC1)-12

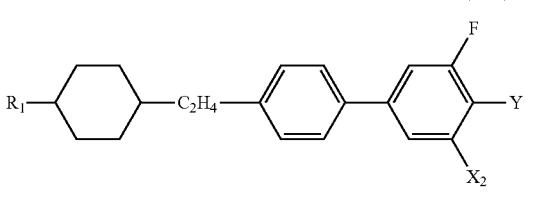

(LC1)-13

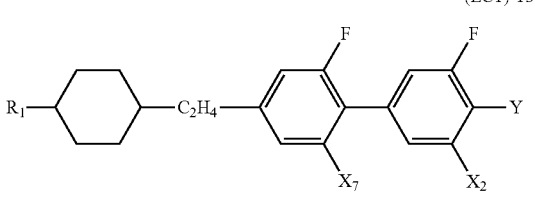

(LC1)-14

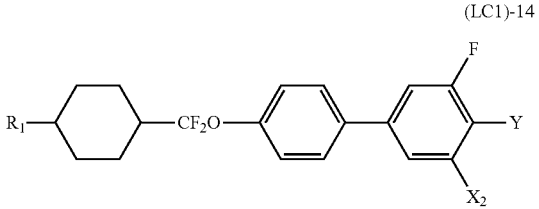

(LC1)-15

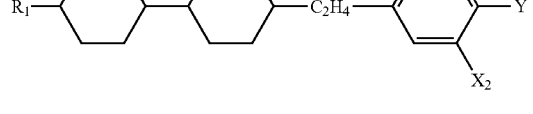

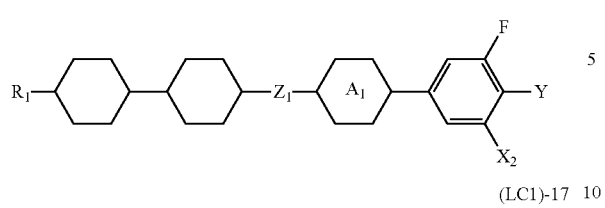
(LC1)-16

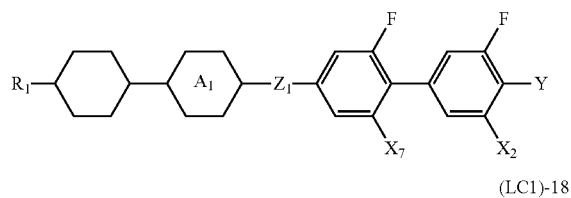
(LC1)-17

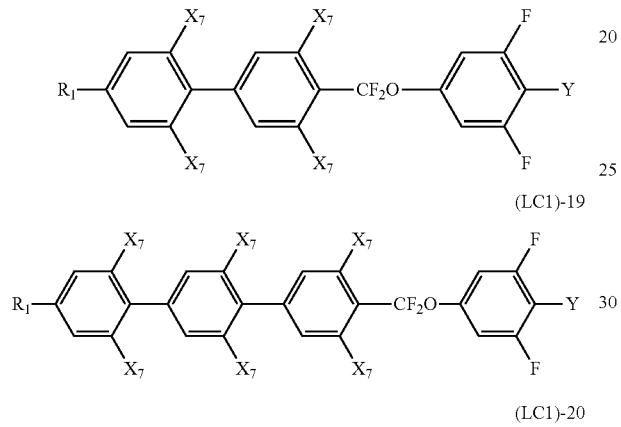
(LC1)-18

(LC1)-19

(LC1)-20

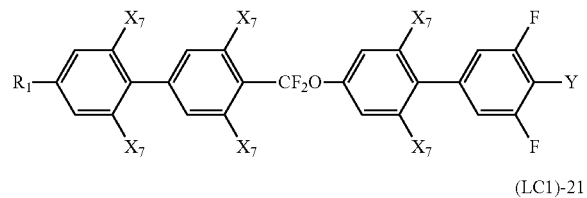
(LC1)-21

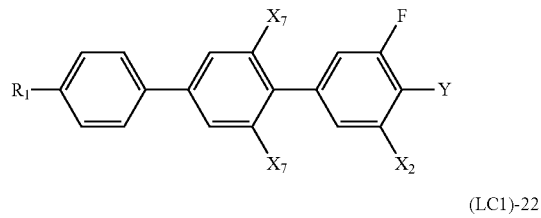
(LC1)-22

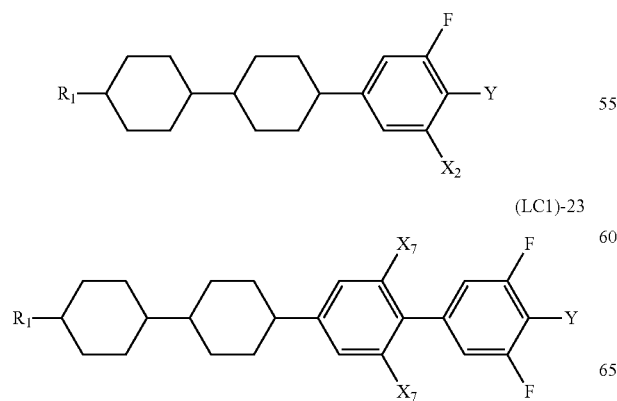
(LC1)-23

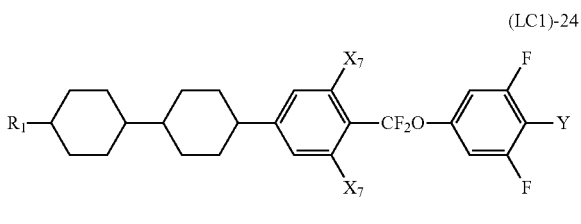
(LC1)-24

(in General Formulae (LC1)-5 to (LC1)-24, $R_1$ each independently represents an alkyl group having 1 to 15 carbon atoms; one or more $CH_2$ groups of the alkyl group may be replaced by —O—, —CH=CH—, —CO—, —OCO—, —COO—, —C≡C—, —CF$_2$O—, or —OCF$_2$— in such a manner that an oxygen atom is not directly adjacent to another oxygen atom; one or more hydrogen atoms of the alkyl group may optionally be replaced by a halogen; $X_2$ and $X_7$ each independently represent a hydrogen atom, Cl, F, $CF_3$, or $OCF_3$; when a plurality of $X_7$'s are present, they may be identical or different; $Z_1$ each independently represents a single bond, —CH=CH—, —C≡C—, —CH$_2$CH$_2$—, —(CH$_2$)$_4$—, —OCH$_2$—, —OCH$_2$O—, —OCF$_2$—, or —CF$_2$O—; Y each independently represents Cl, F, $CF_3$, $OCH_2F$, $OCHF_2$, or $OCF_3$; and

[Chem. 11]

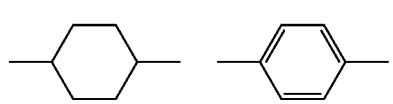

$A^1$ each independently represents any one of the above structures).

$R_1$ is preferably each independently an alkyl group having 1 to 7 carbon atoms, an alkoxy group having 1 to 7 carbon atoms, or an alkenyl group having 2 to 7 carbon atoms and is more preferably an alkyl group having 1 to 5 carbon atoms, an alkoxy group having 1 to 5 carbon atoms, or an alkenyl group having 2 to 5 carbon atoms.

$X_2$ and $X_7$ are preferably each independently a hydrogen atom or F.

Y is preferably each independently F, $CF_3$, or $OCF_3$.

The compound represented by General Formula (LC2) is preferably one or more compounds selected from the group consisting of the compounds represented by General Formula (LC2)-1 to General Formula (LC2)-11 below:

[Chem. 12]

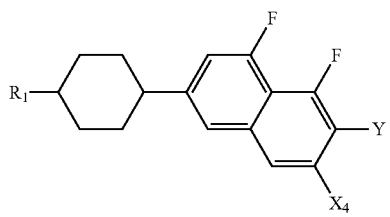
(LC2)-1

(LC2)-2
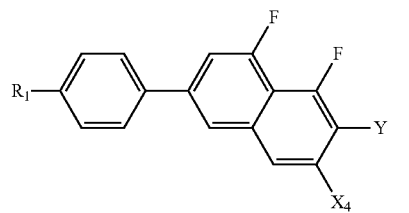

(LC2)-3
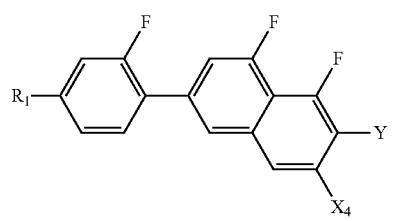

(LC2)-4
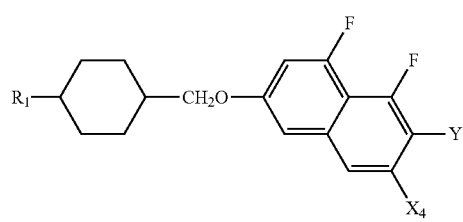

(LC2)-5
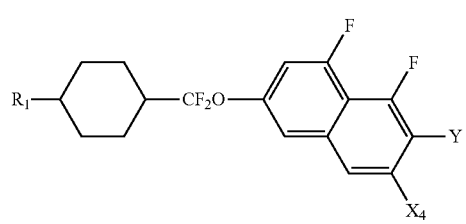

(LC2)-6
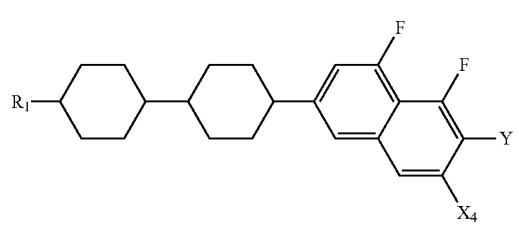

(LC2)-7
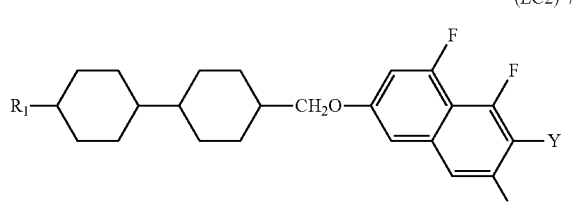

(LC2)-8
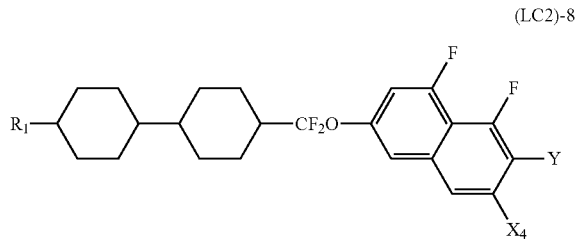

(LC2)-9
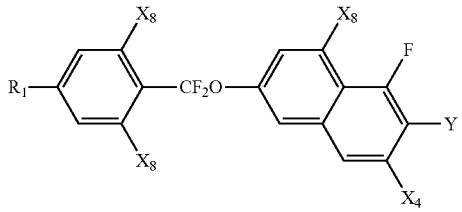

(LC2)-10
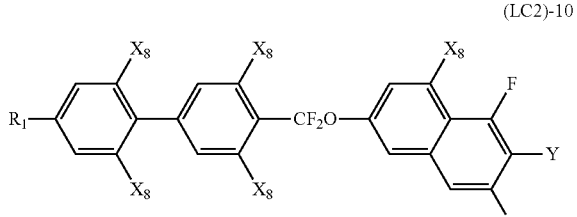

(LC2)-11
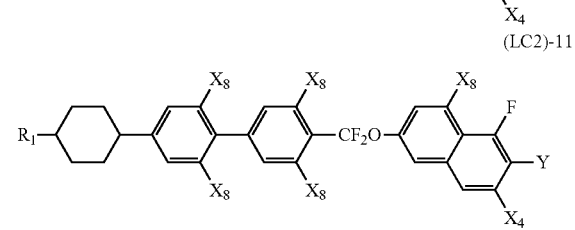

(in General Formulae (LC2)-1 to (LC2)-11, $R_1$ each independently represents an alkyl group having 1 to 15 carbon atoms; one or more $CH_2$ groups of the alkyl group may be replaced by —O—, —CH=CH—, —CO—, —OCO—, —COO—, —C≡C—, —$CF_2O$—, or —$OCF_2$— in such a manner that an oxygen atom is not directly adjacent to another oxygen atom; $X_4$ and $X_8$ each independently represent a hydrogen atom, Cl, F, $CF_3$, or $OCF_3$; when a plurality of $X_8$'s are present, they may be identical or different; Y each independently represents Cl, F, $CF_3$, $OCH_2F$, $OCHF_2$, or $OCF_3$).

$R_1$ is preferably each independently an alkyl group having 1 to 7 carbon atoms, an alkoxy group having 1 to 7 carbon atoms, or an alkenyl group having 2 to 7 carbon atoms and is more preferably an alkyl group having 1 to 5 carbon atoms, an alkoxy group having 1 to 5 carbon atoms, or an alkenyl group having 2 to 5 carbon atoms.

$X_4$ and $X_8$ are preferably each independently a hydrogen atom or F.

Y is preferably each independently F, $CF_3$, or $OCF_3$.

The compound represented by General Formula (LC5) is more preferably one or more compounds selected from the group consisting of the compounds represented by General Formula (LC5)-1 to General Formula (LC5)-15 below:

[Chem. 13]

(LC5)-1
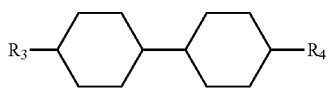

(LC5)-2

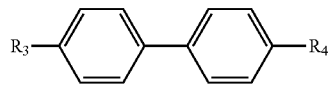 (LC5)-3

 (LC5)-4

 (LC5)-5

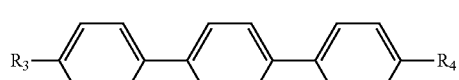 (LC5)-6

 (LC5)-7

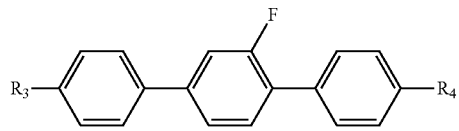 (LC5)-8

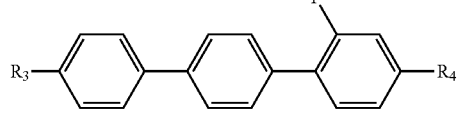 (LC5)-9

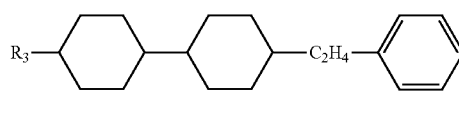 (LC5)-10

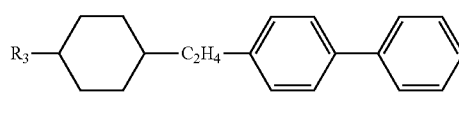 (LC5)-11

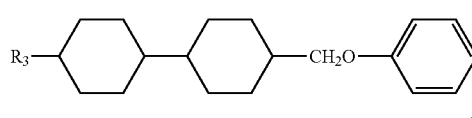 (LC5)-12

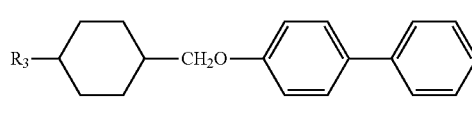 (LC5)-13

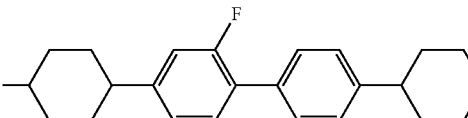 (LC5)-14

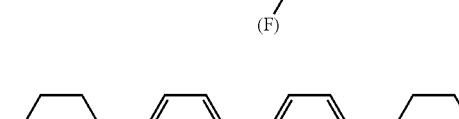

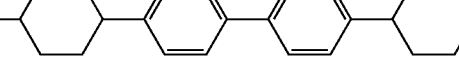

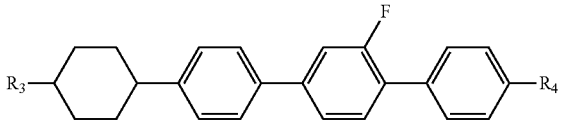 (LC5)-15

(in General Formulae (LC5)-1 to (LC5)-15, $R_3$ and $R_4$ each independently represent an alkyl group having 1 to 7 carbon atoms, an alkoxy group having 1 to 7 carbon atoms, an alkenyl group having 2 to 7 carbon atoms, or an alkenyloxy group having 2 to 7 carbon atoms). $R_3$ and $R_4$ are more preferably each independently an alkyl group having 1 to 5 carbon atoms, an alkoxy group having 1 to 5 carbon atoms, or an alkenyl group having 2 to 5 carbon atoms.

The above-described liquid crystal composition layer may include one or more polymerizable compounds.

Specifically, the above-described liquid crystal composition layer preferably includes one or more polymerizable compounds represented by General Formula (PC1) below:

[Chem. 14]

$$(P_1-Sp_1-Q_1)_{n_1}-MG-(R_{10})_{n_2} \quad (PC1)$$

(in General Formula (PC1), $P_1$ represents a polymerizable functional group; $Sp_1$ represents a spacer group having 0 to 20 carbon atoms; $Q_1$ represents a single bond, —O—, —NH—, —NHCOO—, —OCONH—, —CH=CH—, —CO—, —COO—, —OCO—, —OCOO—, —OOCO—, —CH=CH—, —CH=CH—OCO—, —OCO—CH=CH—, or —C≡C—; $n_1$ and $n_2$ represent 1, 2, or 3; MG represents a mesogenic group or a mesogenic supporting group; $R_{10}$ represents a halogen atom, a cyano group, or an alkyl group having 1 to 25 carbon atoms, and one or more $CH_2$ groups of the alkyl group may be replaced by —O—, —S—, —NH—, —N(CH$_3$)—, —CO—, —COO—, —OCO—, —OCOO—, —SCO—, —COS—, or —C≡C— in such a manner that an oxygen atom is not directly adjacent to another oxygen atom; and, in another case, $R_{10}$ represents $P_2$—$Sp_2$—$Q_2$- (where $P_2$, $Sp_2$, $Q_2$ independently represent the same things as $P_1$, $Sp_1$, $Q_1$, respectively)).

In General Formula (PC1), more preferably, MG represents the following structure:

[Chem. 15]

$$-C_1-Y_1-(C_2-Y_2)_{n_5}-C_3-$$

(where $C_1$ to $C_3$ each independently represent a 1,4-phenylene group, a 1,4-cyclohexylene group, a 1,4-cyclohexenyl group, a tetrahydropyran-2,5-diyl group, a 1,3-dioxane-2,5-diyl group, a tetrahydrothiopyran-2,5-diyl group, a 1,4-bicyclo(2,2,2)octylene group, a decahydronaphthalene-2,6-diyl group, a pyridine-2,5-diyl group, a pyrimidine-2,5-diyl group, a pyrazine-2,5-diyl group, a 1,2,3,4-tetrahydronaphthalene-2,6-diyl group, a 2,6-naphthylene group, a phenanthrene-2,7-diyl group, a 9,10-dihydrophenanthrene-2,7-diyl group, a 1,2,3,4,4a,9,10a-octahydrophenanthrene 2,7-diyl group, or a fluorene 2,7-diyl group; the 1,4-phenylene group, the 1,2,3,4-tetrahydronaphthalene-2,6-diyl group, the 2,6-naphthylene group, the phenanthrene-2,7-diyl group, the 9,10-dihydrophenanthrene-2,7-diyl group, the 1,2,3,4,4a,9,10a-octahydrophenanthrene 2,7-diyl group, and the fluorene 2,7-diyl group may include, as a substituent, one or more F atoms, Cl atoms, $CF_3$ groups, $OCF_3$ groups, cyano groups, alkyl groups having 1 to 8 carbon atoms, alkoxy groups having 1 to 8 carbon atoms, alkanoyl groups having 1 to 8 carbon atoms, alkanoyloxy groups having 1 to 8 carbon atoms, alkenyl groups having 2 to 8 carbon atoms, alkenyloxy groups having 2 to 8 carbon atoms, alkenoyl groups having 2 to 8 carbon atoms, or alkenoyloxy groups having 2 to 8 carbon atoms; $Y_1$ and $Y_2$ each independently represent —COO—, —OCO—, —CH$_2$CH$_2$—, —OCH$_2$—, —CH$_2$O—, —CH=CH—, —C≡C—, —CH=CHCOO—, —OCOCH=CH—, —CH$_2$CH$_2$COO—, —CH$_2$CH$_2$OCO—, —COOCH$_2$CH$_2$—, —OCOCH$_2$CH$_2$—, —CONH—, —NHCO—, or a single bond; and $n_5$ is 0, 1, or 2). $Sp_1$ and $Sp_2$ are more preferably each independently an alkylene group, which may be substituted by one or more halogen atoms or cyano groups. One or more $CH_2$ groups of the alkylene group may be replaced by —O—, —S—, —NH—, —N(CH$_3$)—, —CO—, —COO—, —OCO—, —OCOO—, —SCO—, —COS—, or —C≡C— in such a manner that an oxygen atom is not directly adjacent to another oxygen atom. $P_1$ and $P_2$ are preferably each independently any one of the structures represented by Formula (R-1) to Formula (R-15) below:

[Chem. 16]

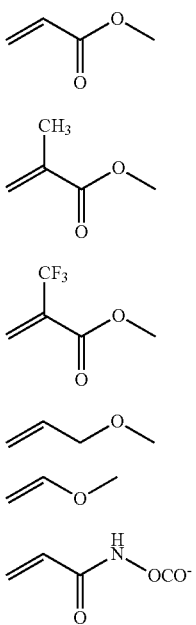

(R-1)
(R-2)
(R-3)
(R-4)
(R-5)
(R-6)

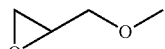 (R-7)

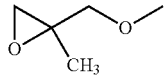 (R-8)

 (R-9)

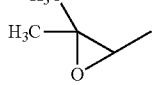 (R-10)

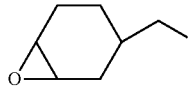 (R-11)

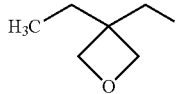 (R-12)

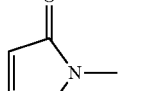 (R-13)

 (R-14)

 (R-15)

Such polymerizable groups can be cured by radical polymerization, radical addition polymerization, cationic polymerization, or anionic polymerization. In the case where polymerization is performed by ultraviolet light polymerization, the structures represented by Formulae (R-1), (R-2), (R-4), (R-5), (R-7), (R-11), (R-13), and (R-15) are preferably employed. The structures represented by Formulae (R-1), (R-2), (R-7), (R-11), and (R-13) are more preferably employed. The structures represented by Formulae (R-1) and (R-2) are more preferably employed.

An example of a polymerizable compound including one polymerizable functional group in the molecule is the compound represented by General Formula (PC1)-0 below:

[Chem. 17]

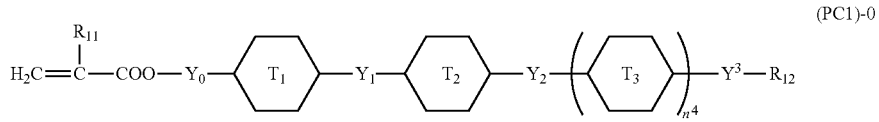

(PC1)-0

(in Formula (PC1)-0, $R_{11}$ represents a hydrogen atom or a methyl group; the six-membered rings $T_1$, $T_2$, and $T_3$ each independently represent any one of the following structures:

[Chem. 18]

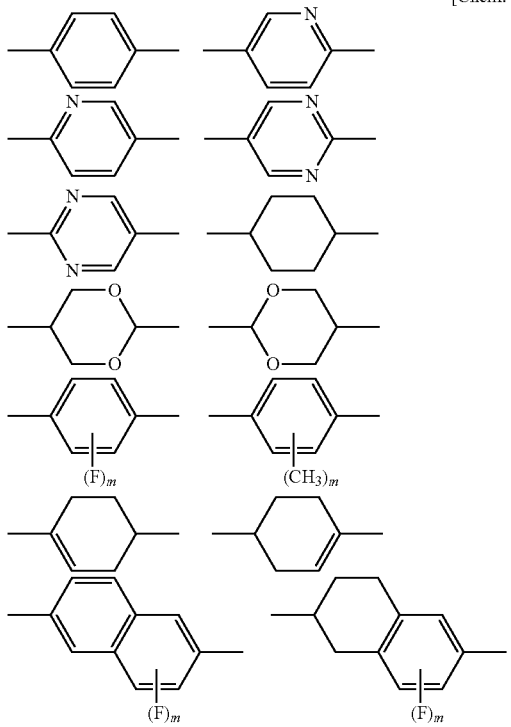

(where m represents an integer of 1 to 4);
$n_4$ represents an integer of 0 or 1;
$Y_0$, $Y_1$, and $Y_2$ each independently represent a single bond, —O—, —OCH$_2$—, —OCH$_2$—, —C$_2$H$_4$—, —COO—, —OCO—, —CH═CH—, —CO—, —OCOO—, —NH—, —NHCOO—, —OCONH—, —OCOCH$_2$—, —CH$_2$OCO—, —COOCH$_2$—, —CH$_2$COO—, —CH═CH—COO—, —OCO—CH═CH—, —CH═CH—OCO—, —COO—CH═CH—, —CH═CCH$_2$—COO—, —COO—CCH$_2$═CH—, —COOC$_2$H$_4$—, —OCOC$_2$H$_4$—, —C$_2$H$_4$OCO—, —C$_2$H$_4$COO—, —C≡C—, —CF$_2$O—, or —OCF$_2$—;

$Y_3$ represents a single bond, —O—, —COO—, or —OCO—; and $R_{12}$ represents a hydrogen atom, a halogen atom, a cyano group, an alkyl group having 1 to 20 carbon atoms, an alkenyl group having 1 to 20 carbon atoms, an alkoxy group having 1 to 20 carbon atoms, or a hydrocarbon group having 1 to 20 carbon atoms). At least one polymerizable compound selected from the group is preferably used.

Examples of a polymerizable compound including two or more polymerizable functional groups in the molecule include the compounds represented by General Formula (PC1)-1 and General Formula (PC1)-2 below:

[Chem. 19]

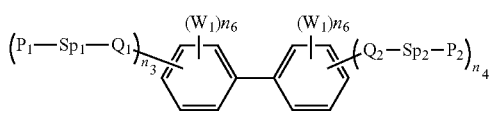

(PC1)-1

(PC1)-2

(where $P_1$, $Sp_1$, $Q_1$, $P_2$, $Sp_2$, $Q_2$, and MG represent the same things as in General Formula (PC1), and $n_3$ and $n_4$ are each independently 1, 2, or 3).

Specifically, the compound represented by General Formula (PC1) is preferably one or more polymerizable compounds selected from the group consisting of the compounds represented by General Formula (PC1)-3 to General Formula (PC1)-11 below:

[Chem. 20]

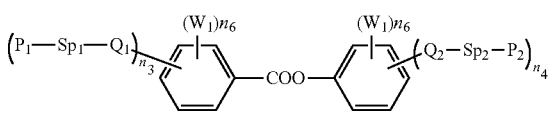

(PC1)-3

(PC1)-4

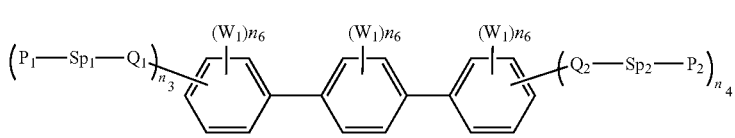

(PC1)-5

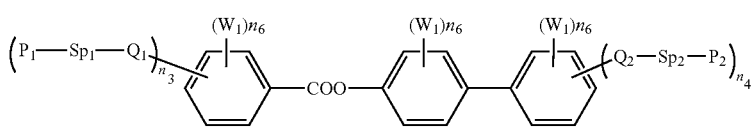

(PC1)-6

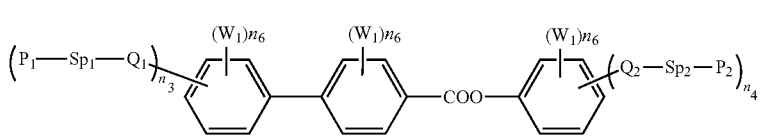

(PC1)-7

-continued

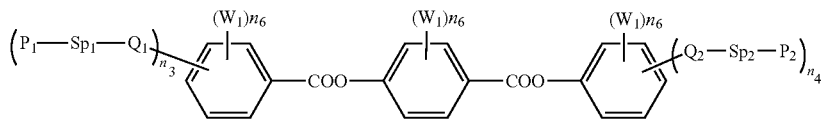
(PC1)-8

[Chem. 21]

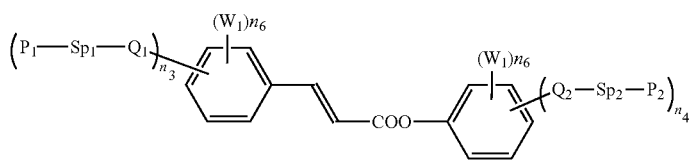
(PC1)-9

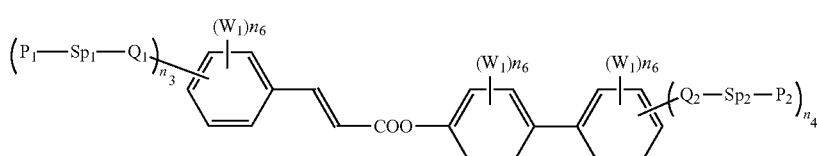
(PC1)-10

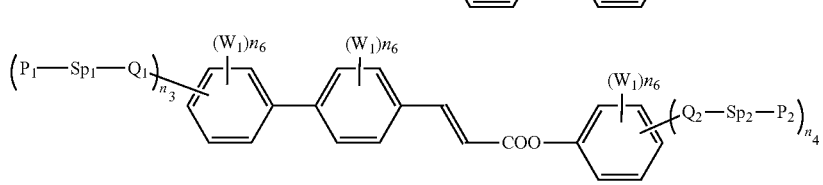
(PC1)-11

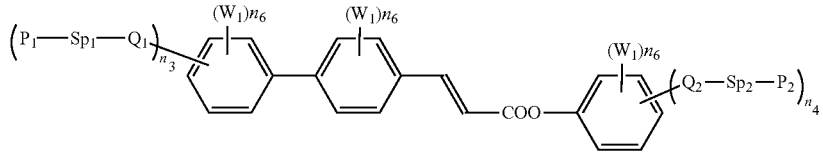

(in General Formula (PC1)-3 to General Formula (PC1)-11, $P_1$, $P_2$, $Sp_1$, $Sp_2$, $Q_1$, and $Q_2$ represent the same things as in General Formula (PC1); $W_1$'s each independently represent F, $CF_3$, $OCF_3$, $CH_3$, $OCH_3$, an alkyl group having 2 to 5 carbon atoms, an alkoxy group having 2 to 5 carbon atoms, an alkenyl group having 2 to 5 carbon atoms, $COOW_2$, $OCOW_2$, or $OCOOW_2$ (where $W_2$ each independently represents a straight-chain or branched chain alkyl group having 1 to 10 carbon atoms or an alkenyl group having 2 to 5 carbon atoms); $n_3$ each independently represents 1, 2, or 3; $n_4$ each independently represents 1, 2, or 3; $n_6$'s each independently represent 0, 1, 2, 3, or 4; and, in the same ring, $n_3+n_6$ and $n_4+n_6$ are 5 or less).

In General Formula (PC1) and General Formula (PC1)-1 to General Formula (PC1)-11, $Sp_1$, $Sp_2$, $Q_1$, and $Q_2$ are preferably a single bond. The value of $n_3+n_4$ is preferably 1 to 3 and is preferably 1 or 2. $P_1$ and $P_2$ are preferably the polymerizable group represented by Formula (R-1) or (R-2). $W_1$ is preferably F, $CF_3$, $OCF_3$, $CH_3$, or $OCH_3$. The value of $n_6$ is 1, 2, 3, or 4.

Specifically, the polymerizable compound represented by General Formula (PC1) is preferably one or more polymerizable compounds selected from the group consisting of the following compounds:

[Chem. 22]

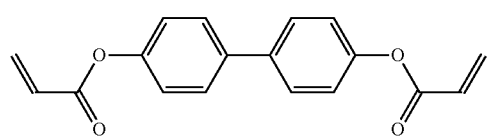
(PC1-3a)

-continued

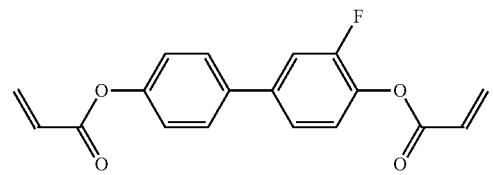
(PC1-3b)

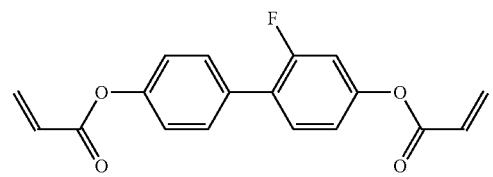
(PC1-3c)

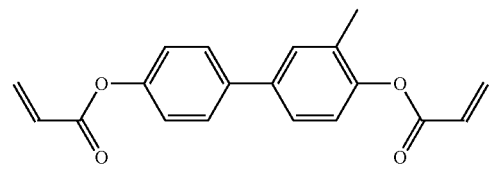
(PC1-3d)

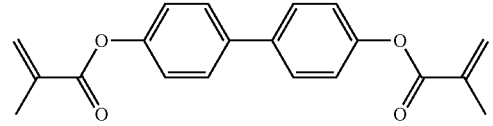
(PC1-3e)

-continued

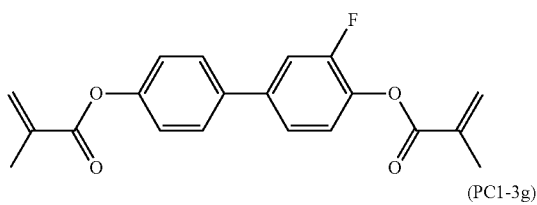
(PC1-3f)

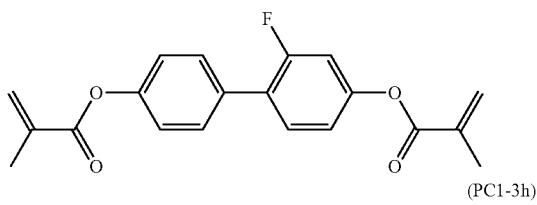
(PC1-3g)

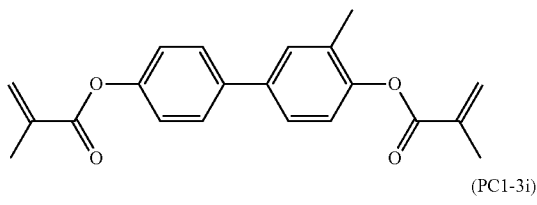
(PC1-3h)

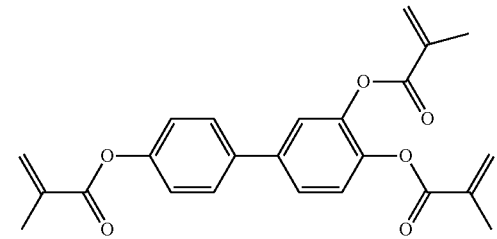
(PC1-3i)

Optionally, a hydrogen atom of the benzene rings of (PC1-3a) to (PC1-3i) may be replaced by a fluorine atom.

It is also preferable that the polymerizable compound is the disc-shaped liquid crystal compound represented by General Formula (PC1)-12 below:

[Chem. 23]

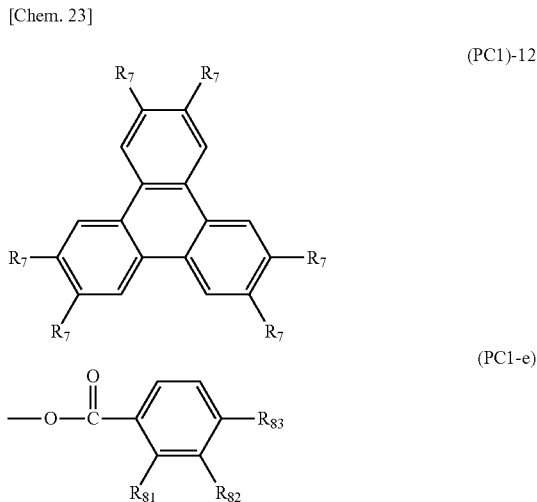
(PC1)-12

(PC1-e)

(in General Formula (PC1)-12, $R_7$'s each independently represent $P_1$—$Sp_1$-$Q_1$ or a substituent represented by General Formula (PC1-e), where $P_1$, $Sp_1$, and $Q_1$ represent the same things as in General Formula (PC1), $R_{81}$ and $R_{82}$ each independently represent a hydrogen atom, a halogen atom, or a methyl group, $R_{83}$ represents an alkoxy group having 1 to 20 carbon atoms, and at least one hydrogen atom of the alkoxy group is replaced by any one of the substituents represented by Formulae (R-1) to (R-15)).

The amount of the polymerizable compound used is preferably 0.05% to 2.0% by mass.

The above-described liquid crystal composition may be used alone for the above-described purpose. Optionally, the above-described liquid crystal composition may include one or more types of antioxidants or may further include one or more types of UV absorbents.

(Color Filter)

The color filter used in the present invention includes a black matrix and at least RGB three-color pixel portions. The RGB three-color pixel portions includes, as a coloring material, a pigment having a water-soluble content of 0.001% by mass or more and 1.5% by mass or less and/or a specific electrical conductivity of 10 µS/cm or more and 150 µS/cm or less.

The water-soluble content of the pigment is preferably 0% by mass or more and 1.2% by mass or less, is more preferably 0% by mass or more and 1.0% by mass or less, and is particularly preferably 0% by mass or more and 0.8% by mass or less.

The specific electrical conductivity of the pigment is preferably 10 µS/cm or more and 120 µS/cm or less, is more preferably 10 µS/cm or more and 100 µS/cm or less, and is particularly preferably 10 µS/cm or more and 80 µS/cm or less.

More specifically, it is preferable that the water-soluble content of the pigment is 0% by mass or more and 1.2% by mass or less and the specific electrical conductivity of the pigment is 10 µS/cm or more and 120 µS/cm or less.

It is more preferable that the water-soluble content of the pigment is 0% by mass or more and 1.0% by mass or less and the specific electrical conductivity of the pigment is 10 µS/cm or more and 100 µS/cm or less.

It is particularly preferable that the water-soluble content of the pigment is 0% by mass or more and 0.8% by mass or less and the specific electrical conductivity of the pigment is 10 µS/cm or more and 80 µS/cm or less.

The term "water-soluble content of the pigment" used herein refers to the content of a constituent of the pigment which dissolves in water. Specifically, the water-soluble content of a pigment can be calculated in accordance with JIS K5101-16-1 (Test methods for pigments-Part 16: Matter soluble in water-Section 1: Hot extraction method), that is, in the following manner:

1. Into a 500-mL rigid beaker, 5.00 g of an accurately weighed pigment is charged. To the beaker, 200 mL of ion-exchange water (electrical conductivity: 5 µS/cm or less, pH: 7.0±1.0) is added. The ion-exchange water is added in small amounts at a time. After 5 mL of first-grade reagent methanol is added to the beaker to soak the pigment in the ion-exchange water to a sufficient degree, the remaining ion-exchange water is added to the beaker. The resulting liquid mixture is boiled for 5 minutes.

2. The liquid mixture is cooled to room temperature, and transferred to a 250-mL graduated cylinder. To the graduated cylinder, the above-described ion-exchange water is added until the volume of the liquid mixture becomes 250 mL. The liquid mixture is vigorously stirred and then filtered through a filter paper No. 5C produced by ADVANTEC.

3. Initially, about 50 mL of the filtrate is removed, and 100 mL of the remaining filtrate is weighed using a graduated cylinder and transferred to an evaporation pan of known mass. The filtrate adhering to the graduated cylinder is washed off with a small amount of ion-exchange water into the evaporation pan.

4. The evaporation pan is placed in a water bath, and evaporation to dryness is performed. The evaporation pan is dried for 2 hours in a drying machine kept at 105° C. to 110° C. and subsequently charged into a desiccator. After the evaporation pan is left to cool, the mass of the evaporation pan is measured. Thus, the amount of substance that remained after evaporation is determined.

5. The water-soluble content of the pigment is calculated using the following formula.

Water-soluble content of the pigment (%)=Amount of substance remaining after evaporation (g)× 2.5/Mass of the pigment (g)×100

The term "specific electrical conductivity of the pigment" used herein refers to a difference between the specific electrical conductivity of a filtrate obtained by filtering an aqueous solution prepared by hot extraction of the pigment using ion-exchange water and the specific electrical conductivity of the ion-exchange water used, that is, specifically, a difference between the specific electrical conductivity of a filtrate obtained in accordance with JIS K5101-16-1 (Test methods for pigments-Part 16: Matter soluble in water-Section 1: Hot extraction method) and the specific electrical conductivity of the ion-exchange water used.

Specific electrical conductivity of the pigment=Specific electrical conductivity of the filtrate−Specific electrical conductivity of the ion-exchange water used The above-described RGB three-color pixel portions preferably include an R pixel portion including, as a coloring material, a diketopyrrolopyrrole-based red pigment; a G pixel portion including, as a coloring material, a halogenated metal phthalocyanine pigment; and a B pixel portion including, as a coloring material, an ∈-type phthalocynian pigment and/or a triarylmethane pigment.

The diketopyrrolopyrrole pigment included in the R pixel portion is preferably one or more pigments selected from C.I. Pigment Red 254, C.I. Pigment Red 255, C.I. Pigment Red 264, and C.I. Pigment Red 272, C.I. Pigment Orange 71, and C.I. Pigment Orange 73, is more preferably one or more pigments selected from C.I. Pigment Red 254, C.I. Pigment Red 255, C.I. Pigment Red 264, and C.I. Pigment Red 272, and is particularly preferably C.I. Pigment Red 254.

The halogenated metal phthalocyanine pigment included in the G pixel portion preferably includes a metal selected from the group consisting of Al, Si, Sc, Ti, V, Mg, Fe, Co, Ni, Zn, Cu, Ga, Ge, Y, Zr, Nb, In, Sn, and Pb as a central metal. When the central metal of the halogenated metal phthalocyanine pigment is trivalent, one group selected from a halogen atom, a hydroxyl group, and a sulfonic group is preferably bonded to the central metal or the central metal is preferably oxo-cross-linked or thio-cross-linked. When the central metal of the halogenated metal phthalocyanine pigment is a tetravalent metal, one oxygen atom or two identical or different groups selected from a halogen atom, a hydroxyl group, and a sulfonic group are preferably bonded to the central metal. Examples of such a halogenated metal phthalocyanine pigment include halogenated metal phthalocyanine pigments belonging to the following two groups.

(Group 1)

Halogenated metal phthalocyanine pigments including a metal selected from the group consisting of Al, Si, Sc, Ti, V, Mg, Fe, Co, Ni, Zn, Cu, Ga, Ge, Y, Zr, Nb, In, Sn, and Pb as a central metal, wherein 8 to 16 halogen atoms per phthalocyanine molecule are bonded to the benzene rings of the phthalocyanine molecule and, when the central metal is trivalent, one group selected from a halogen atom, a hydroxyl group, and a sulfonic group ($-SO_3H$) is bonded to the central metal or, when the central metal is a tetravalent metal, one oxygen atom or two identical or different groups selected from a halogen atom, a hydroxyl group, and a sulfonic group are bonded to the central metal.

(Group 2)

Pigments that are halogenated metal phthalocyanine dimers having a structural unit constituted by two halogenated metal phthalocyanine molecules each including a trivalent metal selected from the group consisting of Al, Sc, Ga, Y, and In as a central metal and 8 to 16 halogen atoms bonded to the benzene rings of the phthalocyanine molecule, the central metals in the structural unit being bonded to each other via a divalent atomic group selected from the group consisting of an oxygen atom, a sulfur atom, a sulfinyl ($-SO-$), and a sulfonyl ($-SO_2-$).

In the halogenated metal phthalocyanine pigment, the halogen atoms bonded to the benzene rings may be all identical or different. Different halogen atoms may be bonded to one benzene ring.

When 9 to 15 bromine atoms of 8 to 16 halogen atoms per phthalocyanine molecule are bonded to the benzene rings of the phthalocyanine molecule, such a halogenated metal phthalocyanine pigment appears yellowish-light green and is most suitably used for green pixel portions of the color filter. The halogenated metal phthalocyanine pigment is insoluble or hardly soluble in water and organic solvents. The halogenated metal phthalocyanine pigment may be a halogenated metal phthalocyanine pigment that has not yet been subjected to the finishing treatment described below (referred to also as "crude pigment") or may be a halogenated metal phthalocyanine pigment that has been subjected to the finishing treatment.

The halogenated metal phthalocyanine pigments belonging to Group 1 or 2 above can be represented by General Formula (PIG-1) below:

[Chem. 24]

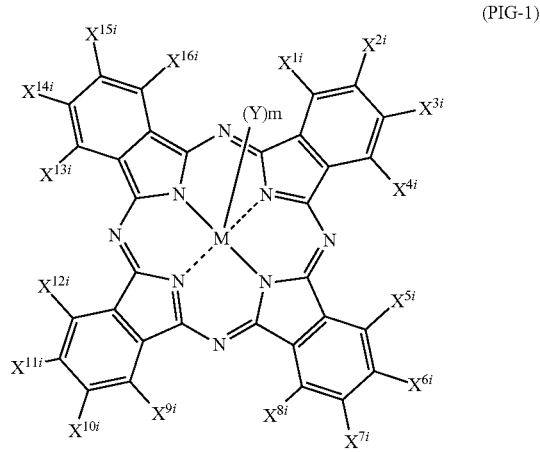

(PIG-1)

In General Formula (PIG-1), the halogenated metal phthalocyanine pigments belonging to Group 1 are as follows.

In General Formula (PIG-1), $X^{1i}$ to $X^{16i}$ represent a hydrogen atom, a chlorine atom, a bromine atom, or an iodine atom. The four X atoms bonded to one benzene ring may be identical or different. Among $X^{1i}$ to $X^{16i}$ bonded to the four benzene rings, 8 to 16 X's are chlorine atoms, bromine atoms, or iodine atoms. M represents a central metal. Among halogenated metal phthalocyanine pigments having the same Y, which is described below, and the same m, which is the number of Y's, a pigment in which, among 16 X's of $X^{1i}$ to $X^{16i}$, the total number of chlorine atoms, bromine atoms, and iodine atoms is less than 8 appears blue. In the same manner, among pigments in which, among 16 X's of $X^{1i}$ to $X^{16i}$, the total number of chlorine atoms, bromine atoms, and iodine atoms is 8 or more, the greater the total number of chlorine atoms, bromine atoms, and iodine atoms, the higher the degree of yellow. Y bonded to the central metal M is a monovalent atomic group selected from the group consisting of a halogen atom that is any one of a fluorine atom, a chlorine atom, a bromine atom, and an iodine atom; an oxygen atom; a hydroxyl group; and a sulfonic group, and m represents the number of Y's bonded to the central metal M and is an integer of 0 to 2.

The value of m is determined on the basis of the valence of the central metal M. When the central metal M is trivalent as is the case for Al, Sc, Ga, Y, and In, m=1. In this case, one group selected from the group consisting of a fluorine atom, a chlorine atom, a bromine atom, an iodine atom, a hydroxyl group, and a sulfonic group is bonded to the central metal. When the central metal M is tetravalent as is the case for Si, Ti, V, Ge, Zr, and Sn, m=2. In this case, one oxygen atom is bonded to the central metal, or two groups selected from the group consisting of a fluorine atom, a chlorine atom, a bromine atom, an iodine atom, a hydroxyl group, and a sulfonic group are bonded to the central metal. When the central metal M is divalent as is the case for Mg, Fe, Co, Ni, Zn, Cu, Zr, Sn, and Pb, Y is absent.

In General Formula (PIG-1) shown above, the halogenated metal phthalocyanine pigments belonging to Group 2 are as follows.

In the General Formula (PIG-1), $X^{1i}$ to $X^{16i}$ are the same as defined above, the central metal M represents a trivalent metal selected from the group consisting of Al, Sc, Ga, Y, and In, and m is 1. Y represents the following atomic group:

[Chem. 25]

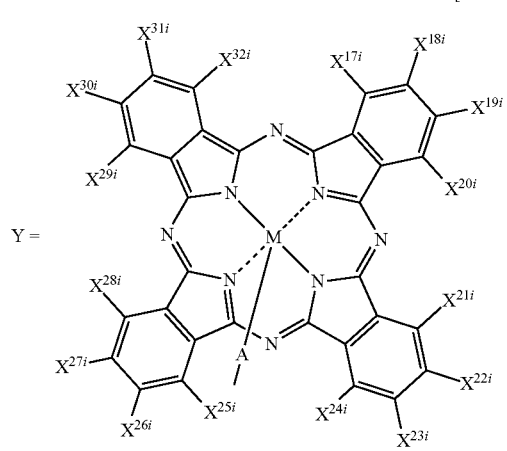

In the chemical structure of the atomic group Y, the central metal M is the same as defined above, and $X^{17i}$ to $X^{32i}$ are the same as the above-described definition of $X^{1i}$ to $X^{16i}$ in General Formula (PIG-1). A represents a divalent atomic group selected from the group consisting of an oxygen atom, a sulfur atom, a sulfinyl (—SO—), and a sulfonyl (—SO$_2$—). M of General Formula (PIG-1) and M of the atomic group Y are bonded to each other via the divalent atomic group A.

In other words, the halogenated metal phthalocyanine pigments belonging to Group 2 are halogenated metal phthalocyanine dimers having a structural unit constituted by two halogenated metal phthalocyanine molecules bonded to each other via the divalent atomic group.

Specific examples of the halogenated metal phthalocyanine pigments represented by General Formula (PIG-1) include (1) to (4) described below.

(1) Halogenated metal phthalocyanine pigments including a divalent metal selected from the group consisting of Mg, Fe, Co, Ni, Zn, Cu, Zr, Sn, and Pb as a central metal, in which 8 to 16 halogen atoms are bonded to 4 benzene rings per phthalocyanine molecule, such as a halogenated copper phthalocyanine pigment, a halogenated tin phthalocyanine pigment, a halogenated nickel phtalocyanine pigment, and a halogenated zinc phtalocyanine pigment. Among such pigments, in particular, a chlorinated and brominated zinc phtalocyanine pigment, that is, C.I. Pigment Green 58, is preferably used.

(2) Halogenated metal phthalocyanine pigments including a trivalent metal selected from the group consisting of Al, Sc, Ga, Y, and In as a central metal, in which one group selected from a halogen atom, a hydroxyl group, and a sulfonic group is bonded to the central metal and 8 to 16 halogen atoms are bonded to 4 benzene rings per phthalocyanine molecule, such as halogenated chloroaluminum phthalocyanine.

(3) Halogenated metal phthalocyanine pigments including a tetravalent metal selected from the group consisting of Si, Ti, V, Ge, Zr, and Sn as a central metal, in which one oxygen atom or two identical or different groups selected from a halogen atom, a hydroxyl group, and a sulfonic group are bonded to the central metal and 8 to 16 halogen atoms are bonded to 4 benzene rings per phthalocyanine molecule, such as halogenated oxytitanium phthalocyanine and halogenated oxyvanadium phthalocyanine.

(4) Pigments that are halogenated metal phthalocyanine dimers having a structural unit constituted by two halogenated metal phthalocyanine molecules including a trivalent metal selected from the group consisting of Al, Sc, Ga, Y, and In as a central metal and 8 to 16 halogen atoms bonded to 4 benzene rings per phthalocyanine molecule, the central metals in the structural unit being bonded to each other via a divalent atomic group selected from the group consisting of an oxygen atom, a sulfur atom, sulfinyl, and sulfonyl, such as a halogenated μ-oxo-aluminium phthalocyanine dimer and a halogenated μ-thio-aluminium phthalocyanine dimer.

Specifically, the halogenated metal phthalocyanine pigment included in the G pixel portion is preferably one or more pigments selected from C.I. Pigment Green 7, C.I. Pigment Green 36, and C.I. Pigment Green 58 and is more preferably one or more pigments selected from C.I. Pigment Green 36 and C.I. Pigment Green 58.

The ∈-type phthalocynian pigment included in the B pixel portion is preferably C.I. Pigment Blue 15:6. The triarylmethane pigment included in the B pixel portion is preferably C.I. Pigment Blue 1 and/or a triarylmethane pigment represented by General Formula (1) below:

[Chem. 26]

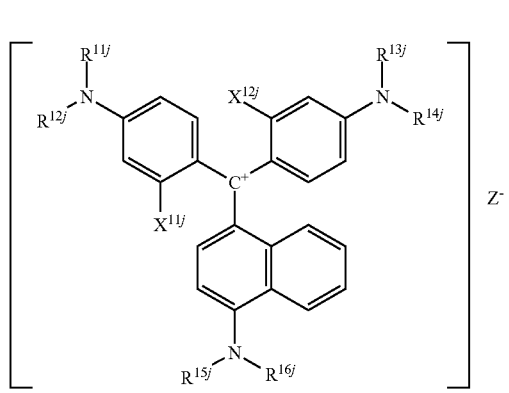

(1)

(in General Formula (1), $R^{11j}$ to $R^{16j}$ each independently represent a hydrogen atom, an alkyl group having 1 to 8 carbon atoms which may be substituted, or an aryl group which may be substituted; when $R^{11j}$ to $R^{16j}$ represent an alkyl group which may be substituted, adjacent $R^{11j}$ and $R^{12j}$, adjacent $R^{13j}$ and $R^{14j}$, and adjacent $R^{15j}$ and $R^{16j}$ may be bonded to each other to form a ring structure; $X^{11j}$ and $X^{12j}$ each independently represent a hydrogen atom, a halogen atom, or an alkyl group having 1 to 8 carbon atoms which may be substituted; $Z^-$ is at least one anion selected from a heteropolyoxometalate anion represented by $(P_2Mo_yW_{18-y}O_{62})^{6-}/6$ where y is an integer of 0, 1, 2, or 3, a heteropolyoxometalate anion represented by $(SiMoW_{11}O_{40})^{4-}/4$, and a lacunary Dawson-type phosphotungstic acid heteropolyoxometalate anion; and, when one molecule includes a plurality of structures represented by Formula (1), the structures may be identical or different).

In General Formula (1), $R^{11j}$ to $R^{16j}$ may be identical or different. Thus, —NRR (RR represents any one combination of $R^{11j}R^{12j}$, $R^{13j}R^{14j}$, and $R^{15j}R^{16j}$) group may be symmetrical or asymmetrical.

When adjacent R's (R represents any one of $R^{11j}$ to $R^{16j}$) are bonded to each other to form a ring, the ring may be formed by cross-linking of hetero atoms. Specific examples of such a ring include the following rings, which may be substituted:

[Chem. 27]

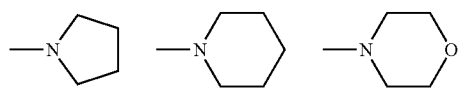

$R^{11j}$ to $R^{16j}$ are preferably each independently a hydrogen atom, an alkyl group which may be substituted, or an aryl group which may be substituted from the viewpoint of chemical stability.

In particular, $R^{11j}$ to $R^{16j}$ are more preferably each independently a hydrogen atom; an alkyl group such as a methyl group, an ethyl group, a propyl group, an isopropyl group, a cyclopropyl group, a butyl group, an isobutyl group, a sec-butyl group, a tert-butyl group, a pentyl group, a cyclopentyl group, a hexyl group, a cyclohexyl group, a heptyl group, an octyl group, or a 2-ethylhexyl group; or an aryl group such as a phenyl group or a naphthyl group.

When $R^{11j}$ to $R^{16j}$ represent an alkyl group or an aryl group, the alkyl group or the aryl group may further include an optional substituent. Examples of the optional substituent that can be included in the alkyl group or the aryl group include the following [Substituent Group Y].

[Substituent Group Y]

Alkyl groups such as a methyl group, an ethyl group, a propyl group, an isopropyl group, a cyclopropyl group, a butyl group, an isobutyl group, a sec-butyl group, a tert-butyl group, a pentyl group, a cyclopentyl group, a hexyl group, a cyclohexyl group, a heptyl group, an octyl group, and a 2-ethylhexyl group; aryl groups such as a phenyl group and a naphthyl group; halogen atoms such as a fluorine atom and a chlorine atom; a cyano group; a hydroxyl group; alkoxy groups having 1 to 8 carbon atoms, such as a methoxy group, an ethoxy group, a propoxy group, and a butoxy group; amino groups which may be substituted, such as an amino group, a diethylamino group, a dibutylamino group, and an acetylamino group; acyl groups such as an acetyl group and a benzoyl group; and acyloxy groups such as an acetyloxy group and a benzoyloxy group.

$R^{11j}$ to $R^{16j}$ are further preferably an alkyl group having 1 to 8 carbon atoms which may be substituted, that is, more specifically, any one of the following alkyl groups: alkyl groups which is not substituted, such as a methyl group, an ethyl group, a propyl group, an isopropyl group, a butyl group, an isobutyl group, a sec-butyl group, a pentyl group, a hexyl group, and a 2-ethylhexyl group; alkoxyalkyl groups such as a 2-methoxyethyl group and a 2-ethoxyethyl group; acyloxy groups such as a 2-acetyloxyethyl group; cyanoalkyl groups such as a 2-cyanoethyl group; and fluoroalkyl groups such as a 2,2,2-trifluoroethyl group and a 4,4,4-trifluorobutyl group.

When $X^{11j}$ and $X^{12j}$ are any one of these alkyl groups, $X^{11j}$ and $X^{12j}$ may further include an optional substituent. Examples of the optional substituent include halogen atoms such as a fluorine atom, a chlorine atom, a bromine atom, and an iodine atom; and alkoxy groups such as a methoxy group, an ethoxy group, and a propoxy group. Specific examples of $X^{11j}$ and $X^{12j}$ include haloalkyl groups such as a fluoromethyl group, a trifluoromethyl group, a trichloromethyl group, and a 2,2,2-trifluoroethyl group; and alkoxyalkyl groups such as a methoxymethyl group.

$X^{11j}$ and $X^{12j}$ are preferably a substituent that causes an appropriate degree of steric hindrance which does not affect torsion to occur, such as a hydrogen atom, a methyl group, a chlorine atom, or a trifluoromethyl group. $X^{11j}$ and $X^{12j}$ are most preferably a hydrogen atom, a methyl group, or a chlorine atom from the viewpoints of color tone and heat resistance.

$Z^-$ is at least one anionic compound selected from a heteropolyoxometalate anion represented by $(P_2Mo_yW_{18-y}O_{62})^{6-}/6$, where y is an integer of 0, 1, 2, or 3; a heteropolyoxometalate anion represented by $(SiMoW_{11}O_{40})^{4-}/4$; and a lacunary Dawson-type phosphotungstic acid heteropolyoxometalate anion. Specifically, the lacunary Dawson-type phosphotungstic acid is preferably a 1-lacunary Dawson-type phosphotungstic acid heteropolyoxometalate anion $(P_2W_{17}O_{61})^{10-}/10$ from the viewpoint of durability.

Specific examples of the triarylmethane pigment represented by General Formula (1) include the compounds shown in Tables 1 to 7 below. However, the present invention is not limited to these compounds as long as the idea of the present invention is not impaired.

TABLE 1

| No. | $R^{11j}$ | $R^{12j}$ | $R^{13j}$ | $R^{14j}$ | $R^{15j}$ | $R^{16j}$ | $X^{11j}$ | $X^{12j}$ | Z— |
|---|---|---|---|---|---|---|---|---|---|
| 1 | C2H5— | C2H5— | C2H5— | C2H5— | C2H5— | H | H | H | (P2W18O62)6— |
| 2 | C2H5— | C2H5— | C2H5— | C2H5— | C2H5— | H | H | H | (P2MoW17O62)6— |
| 3 | C2H5— | C2H5— | C2H5— | C2H5— | C2H5— | H | H | H | (P2Mo2W16O62)6— |
| 4 | C2H5— | C2H5— | C2H5— | C2H5— | C2H5— | H | H | H | (P2Mo3W15O62)6— |
| 5 | C2H5— | C2H5— | C2H5— | C2H5— | C2H5— | H | H | H | (SiMoW11O40)4— |
| 6 | C2H5— | C2H5— | C2H5— | C2H5— | C2H5— | H | H | H | (P2W17O61)10— |
| 7 | CH3— | CH3— | CH3— | CH3— | C2H5— | H | H | H | (P2W18O62)6 |
| 8 | CH3— | CH3— | CH3— | CH3— | C2H5— | H | H | H | (P2MoW17O62)6— |
| 9 | CH3— | CH3— | CH3— | CH3— | C2H5— | H | H | H | (P2Mo3W15O62)6— |

TABLE 2

| No. | $R^{11j}$ | $R^{12j}$ | $R^{13j}$ | $R^{14j}$ | $R^{15j}$ | $R^{16j}$ | $X^{11j}$ | $X^{12j}$ | Z— |
|---|---|---|---|---|---|---|---|---|---|
| 10 | CH3— | CH3— | CH3— | CH3— | C2H5— | H | H | H | (P2Mo3W15O62)6 |
| 11 | CH3— | CH3— | CH3— | CH3— | C2H5— | H | H | H | (SiMoW11O40)4— |
| 12 | CH3— | CH3— | CH3— | CH3— | C2H5— | H | H | H | (P2W17O61)10— |
| 13 | CH3— | CH3— | CH3— | CH3— | Ph— | H | H | H | (P2W18O62)6 |
| 14 | CH3— | CH3— | CH3— | CH3— | Ph— | H | H | H | (P2MoW17O62)6— |
| 15 | CH3— | CH3— | CH3— | CH3— | Ph— | H | H | H | (P2Mo2W16O62)6— |
| 16 | CH3— | CH3— | CH3— | CH3— | Ph— | H | H | H | (P2Mo3W15O62)6— |
| 17 | CH3— | CH3— | CH3— | CH3— | Ph— | H | H | H | (SiMoW11O40)4— |
| 18 | CH3— | CH3— | CH3— | CH3— | Ph— | H | H | H | (P2W17O61)10— |

TABLE 3

| No. | $R^{11j}$ | $R^{12j}$ | $R^{13j}$ | $R^{14j}$ | $R^{15j}$ | $R^{16j}$ | $X^{11j}$ | $X^{12j}$ | Z— |
|---|---|---|---|---|---|---|---|---|---|
| 19 | CH3— | CH3— | CH3— | CH3— | Ph— | CH3— | H | H | (P2W18O62)6 |
| 20 | CH3— | CH3— | CH3— | CH3— | Ph— | CH3— | H | H | (P2MoW17O62)6— |
| 21 | CH3— | CH3— | CH3— | CH3— | Ph— | CH3— | H | H | (P2Mo2W16O62)6— |
| 22 | CH3— | CH3— | CH3— | CH3— | Ph— | CH3— | H | H | (P2Mo3W15O62)6— |
| 23 | CH3— | CH3— | CH3— | CH3— | Ph— | CH3— | H | H | (SiMoW11O40)4— |
| 24 | CH3— | CH3— | CH3— | CH3— | Ph— | CH3— | H | H | (P2W17O61)10— |
| 25 | n-C3H7— | n-C3H7— | n-C3H7— | n-C3H7— | C2H5— | H | H | H | (P2W18O62)6— |
| 26 | n-C3H7— | n-C3H7— | n-C3H7— | n-C3H7— | C2H5— | H | H | H | (P2MoW17O62)6— |
| 27 | n-C3H7— | n-C3H7— | n-C3H7— | n-C3H7— | C2H5— | H | H | H | (P2Mo2W16O62)6— |

TABLE 4

| No. | $R^{11j}$ | $R^{12j}$ | $R^{13j}$ | $R^{14j}$ | $R^{15j}$ | $R^{16j}$ | $X^{11j}$ | $X^{12j}$ | Z— |
|---|---|---|---|---|---|---|---|---|---|
| 28 | C2H5— | C2H5— | C2H5— | C2H5— | C2H5— | H | CH3— | H | (P2W18O62)6— |
| 29 | C2H5— | C2H5— | C2H5— | C2H5— | C2H5— | H | CH3— | H | (P2MoW17O62)6— |
| 30 | C2H5— | C2H5— | C2H5— | C2H5— | C2H5— | H | CH3— | H | (P2Mo2W16O62)6— |
| 31 | C2H5— | C2H5— | C2H5— | C2H5— | C2H5— | H | CH3— | H | (P2Mo3W15O62)6— |
| 32 | C2H5— | C2H5— | C2H5— | C2H5— | C2H5— | H | CH3— | H | (SiMoW11O40)4— |
| 33 | C2H5— | C2H5— | C2H5— | C2H5— | C2H5— | H | CH3— | H | (P2W17O61)10— |
| 34 | C2H5— | C2H5— | C2H5— | C2H5— | C2H5— | H | CH3— | CH3— | (P2W18O62)6 |
| 35 | C2H5— | C2H5— | C2H5— | C2H5— | C2H5— | H | CH3— | CH3— | (P2MoW17O62)6— |
| 36 | C2H5— | C2H5— | C2H5— | C2H5— | C2H5— | H | CH3— | CH3— | (P2Mo3W15O62)6— |

TABLE 5

| No. | $R^{11j}$ | $R^{12j}$ | $R^{13j}$ | $R^{14j}$ | $R^{15j}$ | $R^{16j}$ | $X^{11j}$ | $X^{12j}$ | Z— |
|---|---|---|---|---|---|---|---|---|---|
| 37 | C2H5— | C2H5— | C2H5— | C2H5— | C2H5— | H | CH3— | CH3— | (P2Mo3W15O62)6— |
| 38 | C2H5— | C2H5— | C2H5— | C2H5— | C2H5— | H | CH3— | CH3— | (SiMoW11O40)4— |
| 39 | C2H5— | C2H5— | C2H5— | C2H5— | C2H5— | H | CH3— | CH3— | (P2W17O61)10— |
| 40 | C2H5— | C2H5— | C2H5— | C2H5— | C2H5— | H | Cl | H | (P2W18O62)6— |
| 41 | C2H5— | C2H5— | C2H5— | C2H5— | C2H5— | H | Cl | H | (P2MoW17O62)6— |
| 42 | C2H5— | C2H5— | C2H5— | C2H5— | C2H5— | H | Cl | H | (P2Mo2W16O62)6— |
| 43 | C2H5— | C2H5— | C2H5— | C2H5— | C2H5— | H | Cl | H | (P2Mo3W15O62)6— |
| 44 | C2H5— | C2H5— | C2H5— | C2H5— | C2H5— | H | Cl | H | (SiMoW11O40)4— |
| 45 | C2H5— | C2H5— | C2H5— | C2H5— | C2H5— | H | Cl | H | (P2W17O61)10— |

TABLE 6

| No. | $R^{1j}$ | $R^{12j}$ | $R^{13j}$ | $R^{14j}$ | $R^{15j}$ | $R^{16j}$ | $X^{1lj}$ | $X^{12j}$ | Z– |
|---|---|---|---|---|---|---|---|---|---|
| 46 | C2H5— | C2H5— | C2H5— | C2H5— | C2H5— | C2H5— | H | H | (P2W18O62)6– |
| 47 | C2H5— | C2H5— | C2H5— | C2H5— | C2H5— | C2H5— | H | H | (P2MoW17O62)6– |
| 48 | C2H5— | C2H5— | C2H5— | C2H5— | C2H5— | C2H5— | H | H | (P2Mo2W16O62)6– |
| 49 | C2H5— | C2H5— | C2H5— | C2H5— | C2H5— | C2H5— | H | H | (P2Mo3W15O62)6– |
| 50 | C2H5— | C2H5— | C2H5— | C2H5— | C2H5— | C2H5— | H | H | (SiMoW11O40)4– |
| 51 | C2H5— | C2H5— | C2H5— | C2H5— | C2H5— | C2H5— | H | H | (P2W17O61)10– |
| 52 |  |  | | | C2H5— | H | H | H | (P2W18O62)6– |
| 53 |  |  | | | C2H5— | H | H | H | (P2MoW17O62)6– |
| 54 |  |  | | | C2H5— | H | H | H | (P2Mo2W16O62)6– |

TABLE 7

| No. | $R^{1j}$ | $R^{12j}$ | $R^{13j}$ | $R^{14j}$ | $R^{15j}$ | $R^{16j}$ | $X^{1lj}$ | $X^{12j}$ | Z– |
|---|---|---|---|---|---|---|---|---|---|
| 55 |  |  | | | C2H5— | H | H | H | (P2Mo3W15O62)6– |
| 56 |  |  | | | C2H5— | H | H | H | (SiMoW11O40)4– |
| 57 |  |  | | | C2H5— | H | H | H | (P2W17O61)10– |
| 58 | 4,4,4-trifluorobutyl | 4,4,4-trifluorobutyl | C2H5— | C2H5— | C2H5— | H | H | H | (P2W18O62)6– |
| 59 | 4,4,4-trifluorobutyl | 4,4,4-trifluorobutyl | C2H5— | C2H5— | C2H5— | H | H | H | (P2MoW17O62)6– |
| 60 | 4,4,4-trifluorobutyl | 4,4,4-trifluorobutyl | C2H5— | C2H5— | C2H5— | H | H | H | (SiMoW11O40)4– |
| 61 | 4,4,4-trifluorobutyl | 4,4,4-trifluorobutyl | C2H5— | C2H5— | C2H5— | H | CH3— | H | (P2W18O62)6– |
| 62 | 4,4,4-trifluorobutyl | 4,4,4-trifluorobutyl | C2H5— | C2H5— | C2H5— | H | CH3 | H | (P2MoW17O62)6– |
| 63 | 4,4,4-trifluorobutyl | 4,4,4-trifluorobutyl | C2H5— | C2H5— | C2H5— | H | CH3 | H | ((SiMoW11O40)4– |

The R pixel portion of the RGB three-color pixel portions preferably further includes, as a coloring material, at least one organic pigment selected from the group consisting of C.I. Pigment Red 177, C.I. Pigment Red 242, C.I. Pigment Red 166, C.I. Pigment Red 167, C.I. Pigment Red 179, C.I. Pigment Orange 38, C.I. Pigment Orange 71, C.I. Pigment Yellow 150, C.I. Pigment Yellow 215, C.I. Pigment Yellow 185, C.I. Pigment Yellow 138, and C.I. Pigment Yellow 139.

The G pixel portion of the RGB three-color pixel portions preferably further includes, as a coloring material, at least one organic pigment selected from the group consisting of C.I. Pigment Yellow 150, C.I. Pigment Yellow 215, C.I. Pigment Yellow 185, and C.I. Pigment Yellow 138.

The B pixel portion of the RGB three-color pixel portions preferably further includes, as a coloring material, at least one organic dye or pigment selected from the group consisting of C.I. Pigment Blue 1 and C.I. Pigment Violet 23.

In the case where the color filter is constituted by a black matrix, RGB three-color pixel portions, and a Y pixel portion, the Y pixel portion preferably includes, as a coloring material, a pigment having a water-soluble content of 1.5% or less and/or a specific electrical conductivity of 150 µS/cm or less. The water-soluble content of the pigment is more preferably 1.0% or less. The specific electrical conductivity of the pigment is more preferably 100 µS/cm or less. It is more preferable that the water-soluble content of the pigment is 1.0% or less and the specific electrical conductivity of the pigment is 100 µS/cm or less.

The Y pixel portion preferably includes, as a coloring material, at least one yellow organic dye or pigment selected from the group consisting of C.I. Pigment Yellow 150, C.I. Pigment Yellow 215, C.I. Pigment Yellow 185, C.I. Pigment Yellow 138, and C.I. Pigment Yellow 139.

The chromaticity of each of the above-described pixel portions can be controlled by changing the types of the dyes and pigments used or the mixing ratio of the dyes and pigments. For example, the chromaticity of an R pixel can be controlled by adding a yellow dye or pigment and/or an orange pigment to a red dye or pigment in an appropriate amount, the chromaticity of a G pixel can be controlled by adding a yellow dye or pigment to a green dye or pigment in an appropriate amount, and the chromaticity of a B pixel can be controlled by adding a purple dye or pigment to a blue dye or pigment in an appropriate amount. The chromaticity of the pixels can also be controlled by appropriately changing the diameter of the particles of a pigment.

The pixel portions of the color filter may be formed by a publicly known method. A common method for forming pixel portions is photolithography. In photolithography, the photo-curable composition described below is applied to a surface of a transparent substrate for color filters on which a black matrix is disposed and then dried by being heated (pre-baked). Subsequently, the surface of the transparent substrate is irradiated with ultraviolet rays through a photomask to perform pattern exposure to cure portions of the photo-curable compound corresponding to pixel portions. Unexposed portions are developed with a developing solution. Non-pixel portions are removed, and the pixel portions are fixed on the transparent substrate. In this method, pixel portions formed of a cured, colored coating film composed of the photo-curable composition are formed on the transparent substrate.

For each colored pixels of R pixels, G pixels, B pixels, and, as needed, other color pixels such as Y pixels, the photo-curable compositions described below are prepared and the above-described operations are repeated. Thus, a color filter including colored pixel portions of R pixels, G pixels, B pixels, and Y pixels formed at the respective predetermined positions can be produced.

Spin coating, roll coating, an ink-jet method, and the like can be employed for applying the photo-curable composition described below to a transparent substrate composed of glass or the like.

The conditions for drying the coating film composed of the photo-curable composition applied to a transparent substrate vary depending on, for example, the types of and proportions of the constituents of the photo-curable composition, but are generally at 50° C. to 150° C. for about 1 to about 15 minutes. Light used for photo-curing of the photo-curable composition is preferably ultraviolet rays in the wavelength range of 200 to 500 nm or visible light. Any light source that emits light in this wavelength range can be used.

Examples of a developing method include a liquid application method, a dipping method, and a spraying method. After the exposure and development of the photo-curable composition, the transparent substrate on which the pixel portions of the desired colors are formed is washed with water and then dried. The resulting color filter is subjected to a heat treatment (post-baking) at 90° C. to 280° C. for a predetermined time using a heating device such as a hot plate or an oven. This removes volatile constituents contained in the colored coating film and causes an unreacted portion of the photo-curable compound remaining in the cured, colored coating film composed of the photo-curable composition to heat-cure. Thus, a color filter is formed.

By using the coloring material for color filters according to the present invention in combination with the liquid crystal composition according to the present invention, a liquid crystal display apparatus that limits a reduction in the voltage holding ratio (VHR) of the liquid crystal layer and limits an increase in the ion density (ID) of the liquid crystal layer, which addresses faulty display issues such as white missing pixels, alignment inconsistencies, and burn-in, can be provided.

In general, the photo-curable composition can be prepared in the following manner. Essential components, that is, the dye and/or pigment composition for color filters according to the present invention, an organic solvent, and a dispersing agent are mixed together, and the resulting mixture is stirred so as to uniformly disperse these components. Thus, a pigment dispersion used for forming pixel portion of a color filter is prepared. Then, a photo-curable compound and, as needed, a thermoplastic resin, a photopolymerization initiator, and the like are added to the pigment dispersion. Thus, the photo-curable composition is prepared.

Examples of the organic solvent used above include aromatic compound solvents such as toluene, xylene, and methoxybenzene; acetic acid ester solvents such as ethyl acetate, propyl acetate, butyl acetate, propylene glycol monomethyl ether acetate, propylene glycol monoethyl ether acetate, diethylene glycol methyl ether acetate, diethylene glycol ethyl ether acetate, diethylene glycol propyl ether acetate, and diethylene glycol butyl ether acetate; propionate solvents such as ethoxyethyl propionate; alcohol solvents such as methanol and ethanol; ether solvents such as butyl cellosolve, propylene glycol monomethyl ether, diethylene glycol ethyl ether, and diethylene glycol dimethyl ether; ketone solvents such as methyl ethyl ketone, methyl isobutyl ketone, and cyclohexanone; aliphatic hydrocarbon solvents such as hexane; nitrogen compound solvents such as N,N-dimethylformamide, γ-butyrolactam, N-methyl-2-pyrrolidone, aniline, and pyridine; lactone solvents such as γ-butyrolactone; and carbamic acid ester such as a 48:52 mixture of methyl carbamate and ethyl carbamate.

Examples of the dispersing agent used above include DISPERBYK 130, DISPERBYK 161, DISPERBYK 162, DISPERBYK 163, DISPERBYK 170, DISPERBYK 171, DISPERBYK 174, DISPERBYK 180, DISPERBYK 182, DISPERBYK 183, DISPERBYK 184, DISPERBYK 185, DISPERBYK 2000, DISPERBYK 2001, DISPERBYK 2020, DISPERBYK 2050, DISPERBYK 2070, DISPERBYK 2096, DISPERBYK 2150, DISPERBYK LPN21116, and DISPERBYK LPN6919 produced by BYK-Chemie; EFKA 46, EFKA 47, EFKA 452, EFKA LP4008, EFKA 4009, EFKA LP4010, EFKA LP4050, LP4055, EFKA 400, EFKA 401, EFKA 402, EFKA 403, EFKA 450, EFKA 451, EFKA 453, EFKA 4540, EFKA 4550, EFKA LP4560, EFKA 120, EFKA 150, EFKA 1501, EFKA 1502, and EFKA 1503 produced by EFKA; Solsperse 3000, Solsperse 9000, Solsperse 13240, Solsperse 13650, Solsperse 13940, Solsperse 17000, 18000, Solsperse 20000, Solsperse 21000, Solsperse 20000, Solsperse 24000, Solsperse 26000, Solsperse 27000, Solsperse 28000, Solsperse 32000, Solsperse 36000, Solsperse 37000, Solsperse 38000, Solsperse 41000, Solsperse 42000, Solsperse 43000, Solsperse 46000, Solsperse 54000, and Solsperse 71000 produced by Lubrizol Corporation; and AJISPER PB711, AJISPER PB821, AJISPER PB822, AJISPER PB814, AJISPER PN411, and AJISPER PA111 produced by Ajinomoto Co., Inc. In addition, synthetic resins that are insoluble in water and liquid at room temperature may also be used. Examples of such synthetic resins include an acrylic resin; a urethane resin; an alkyd resin; natural rosins such as a wood rosin, a gum rosin, and a tall rosin; modified rosins such as a polymerized rosin, a disproportionated rosin, a hydrogenated rosin, an oxidized rosin, and a maleated rosin; and rosin derivatives such as a rosin amine, a lime rosin, alkylene oxide adducts of a rosin, alkyd adducts of a rosin, and a rosin-modified phenol. Addition of the above-described dispersing agents and the above-described resins also contributes to reduction in flocculation, improvement of the dispersion stability of the pigments, and improvement of the viscometric property of the dispersion solutions.

An organic pigment derivative such as a phthalimidemethyl derivative, a sulfonic acid derivative, an N-(dialkylamino)methyl derivative, or an N-(dialkylaminoalkyl)sulfonic acid amide derivative may also be added as a dispersing aid. Needless to say, two or more different types of these derivatives may be used in combination.

Examples of the thermoplastic resin used for preparing the photo-curable composition include a urethane resin, an acrylic resin, a polyamide resin, a polyimide resin, a styrene-maleic acid-based resin, and a styrene-maleic anhydride-based resin.

Examples of the photo-curable compound include difunctional monomers such as 1,6-hexanediol diacrylate, ethylene glycol diacrylate, neopentyl glycol diacrylate, triethylene glycol diacrylate, bis(acryloxyethoxy)bisphenol A, and 3-methylpentanediol diacrylate; multifunctional monomers having a relatively low molecular weight, such as trimethylolpropane triacrylate, pentaerythritol triacrylate, tris[2-(meth)acryloyloxyethyl]isocyanurate, dipentaerythritol hexaacrylate, and dipentaerythritol pentaacrylate; and multifunctional monomers having a relatively high molecular weight, such as polyester acrylate, polyurethane acrylate, and polyether acrylate.

Examples of the photopolymerization initiator include acetophenone, benzophenone, benzildimethylketal, benzoyl peroxide, 2-chlorothioxanthone, 1,3-bis(4'-azidobenzal)-2-propane, 1,3-bis(4'-azidobenzal)-2-propane-2'-sulfonic acid, and 4,4'-diazidostilbene-2,2'-disulfonic acid. Examples of commercially available photopolymerization initiators include "Irgacure (trade name)-184", "Irgacure (trade name)-369", "Darocur (trade name)-1173", and "Lucirin-TPO" produced by BASF, "KAYACURE (trade name) DETX" and "KAYACURE (trade name) OA" produced by Nippon Kayaku Co., Ltd., "Vicure 10" and "Vicure 55" produced by Stauffer Chemical Co., "Trigonal PI" produced by Akzo Nobel N.V., "Sandrey 1000" produced by Sand, "Deep" produced by Upjohn Company, and "Biimidazole" produced by KUROGANE KASEI Co., Ltd.

Publicly known, commonly used photosensitizers may be used in combination with the above-described photopolymerization initiators. Examples of the photosensitizers include amines, ureas, compounds containing a sulfur atom, compounds containing a phosphorus atom, compounds containing a chlorine atom, nitriles, and other compounds containing a nitrogen atom. These compounds may be used alone or in combination of two or more.

The mixing proportion of the photopolymerization initiator is preferably, but is not particularly limited to, 0.1% to 30% by mass relative to the amount of compounds including a photo-polymerizable or photo-curable functional group. If the mixing proportion of the photopolymerization initiator is less than 0.1%, the photographic sensitivity during photo-curing may decrease. If the mixing proportion of the photopolymerization initiator exceeds 30%, the crystal of the photopolymerization initiator may precipitate when a pigment-dispersed resist coating film is dried, which may deteriorate the physical properties of the coating film.

Using the above-described materials, by mass, 100 parts of the dye and/or pigment composition for color filters according to the present invention is mixed with 300 to 1000 parts of an organic solvent and 1 to 100 parts of a dispersing agent, and the resulting mixture is stirred so as to uniformly disperse the components. Thus, the above-described dye and pigment liquid can be prepared. Subsequently, a thermoplastic resin, a photo-curable compound, a photopolymerization initiator, and, as needed, an organic solvent are added to the pigment dispersion in such a manner that the total amount of the thermoplastic resin and the photo-curable compound is 3 to 20 parts relative to 1 part of the pigment composition for color filters according to the present invention and the amount of the photopolymerization initiator is 0.05 to 3 parts relative to 1 part of the photo-curable compound. The resulting mixture is stirred so as to uniformly disperse the above components. Thus, a photo-curable composition for forming pixel portions of the color filter is prepared.

Publicly known and commonly used organic solvents and aqueous alkaline solutions may be used as a developing solution. In particular, when the photo-curable composition includes a thermoplastic resin or a photo-curable compound and at least one of them has an acid value and alkali-solubility, washing with an aqueous alkaline solution may be effective in forming pixel portions of the color filter.

A method for producing pixel portions of the color filter by photolithography is described above in detail. Alternatively, the pixel portions of the color filter, which are prepared using the pigment composition for color filters according to the present invention, may be formed by another method such as an electrodeposition method, a transfer method, a micelle electrolysis method, a PVED (photovoltaic electrodeposition) method, an ink-jet method, a reverse printing method, or a thermosetting method. The pixel portions are formed for each color to produce a color filter.

(Alignment Film)

In the liquid crystal display apparatus according to the present invention, when an alignment film is provided in order to align a liquid crystal composition, the alignment film is disposed between the color filter and the liquid crystal layer on a surface of the first substrate and a surface of the second substrate which are brought into contact with the liquid crystal composition. The thickness of the alignment film is small, that is, 100 nm or less at most. Thus, the alignment film does not completely block the interaction between coloring agents such as pigments constituting the color filter and a liquid crystal compound constituting the liquid crystal layer.

In a liquid crystal display apparatus that does not include the alignment film, the interaction between coloring agents, such as pigments, constituting the color filter and a liquid crystal compound constituting the liquid crystal layer becomes stronger.

The alignment film may be composed of, for example, a transparent organic material such as polyimide, polyamide, BCB (benzocyclobutene polymer), or polyvinyl alcohol. In particular, a polyimide alignment film formed by imidization of a polyamic acid prepared by synthesizing a diamine such as an aliphatic or alicyclic diamine (e.g., p-phenylenediamine or 4,4'-diaminodiphenylmethane) with an aliphatic or alicyclic tetracarboxylic acid anhydride (e.g., butanetetracarboxylic acid anhydride or 2,3,5-tricarboxycyclopentyl acetic acid anhydride) or with an aromatic tetracarboxylic acid anhydride (e.g., pyromellitic dianhydride) is preferably used. In this case, generally, alignment is performed by rubbing. When the film serves as a vertical alignment film or the like, alignment is not necessarily performed.

The alignment film may be composed of a material including chalcone, cinnamate, cinnamoyl, or an azo group in the compound. Such a material can be used in combination with polyimide, polyamide, or the like. In such a case, the alignment film may be formed by rubbing or using a photo-alignment technology.

In order to form the alignment film, in general, the above-described material of the alignment film is applied to a substrate by spin coating to form a resin film. Alternatively, a uniaxial stretching method, the Langmuir-Blodgett method, and the like may be employed.

(Transparent Electrode)

In the liquid crystal display apparatus according to the present invention, the transparent electrode may be composed of a conductive metal oxide. Examples of the metal oxide include indium oxide ($In_2O_3$), tin oxide ($SnO_2$), zinc oxide (ZnO), indium tin oxide ($In_2O_2$—$SnO_2$), indium zinc oxide ($In_2O_2$—ZnO), niobium-doped titanium dioxide ($Ti_{1-x}Nb_xO_2$), fluorine-doped tin oxide, graphene nanoribbon, and metal nanowire. Zinc oxide (ZnO), indium tin oxide ($In_2O_2$—$SnO_2$), and indium zinc oxide ($In_2O_2$—ZnO) are preferably used. These transparent conductive films can be patterned by, for example, photo-etching or using a mask.

EXAMPLES

A part of the preferred embodiment of the present invention is described below in detail with reference to Examples, which do not limit the present invention. When referring to a composition in Examples and Comparative Examples, "%" always denotes "% by mass".

The physical properties of a liquid crystal composition are represented as follows.

$T_{N-i}$: Nematic phase-isotropic liquid phase transition temperature (° C.) as an upper limit temperature of liquid crystal phase $\Delta\varepsilon$: Dielectric anisotropy $\Delta n$: Refractive index anisotropy $\eta$: Viscosity (mPa·s) at 20° C.

$d_{gap}$: Gap (μm) between a first substrate and a second substrate of a cell

VHR: Voltage holding ratio (%) at 70° C.

(the ratio (%) of a voltage measured when a voltage of 5 V was applied to a cell having a thickness of 3.5 μm, in which the liquid crystal composition had been injected, at a frame time of 200 ms and a pulse width of 64 μs relative to the initially applied voltage)

ID: Ion density ($pC/cm^2$) at 70° C.

(an ion density measured with MTR-1 (produced by TOYO Corporation) when a voltage of 20 V was applied to a cell having a thickness of 3.5 μm, in which the liquid crystal composition had been injected, at a frequency of 0.05 Hz)

The following abbreviations are used to describe compounds.

n (numeral) at the end $C_nH_{2n+1}$—
-2- —$CH_2CH_2$—
-1O— —$CH_2O$—
—O1- —$OCH_2$—
—V— —CO—
—VO— —COO—
—CFFO— —$CF_2O$—
—F —F
—Cl —Cl
—CN —C≡N
—OCFFF —$OCF_3$
—CFFF —$CF_3$
—OCFF —$OCHF_2$
—On —$OC_nH_{2n+1}$
-T- —C≡C—
ndm- $C_nH_{2n+1}$—HC=CH—$(CH_2)_{m-1}$—

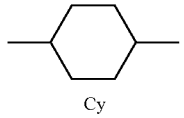
Cy

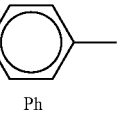
Ph

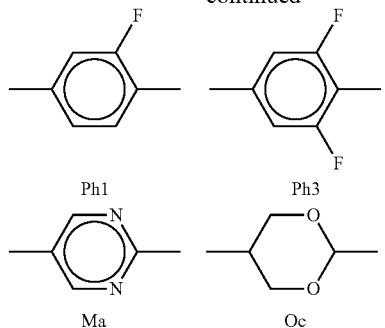
Ph1   Ph3

Ma   Oc

The liquid crystal display apparatus was evaluated in terms of burn-in in the following manner. A predetermined fixed pattern was displayed in a displaying area for 1000 hours. Subsequently, uniform display over the entire screen was performed, and the level of a residual image of the fixed pattern was visually inspected and rated on the following four-point scale.

Excellent: A residual image was absent.

Good: A slight residual image was present, but at an acceptable level.

Poor: A residual image was present at an unacceptable level.

Failure: A strong residual image was present.

[Preparation of Color Filter]

[Preparation of Coloring Composition]

[Red Pigment Coloring Composition 1]

Into a plastic bottle, 10 parts of a red pigment 1 (C.I. Pigment Red 254, water-soluble content: 0.3%, specific electrical conductivity: 30 μS/cm) was charged. Into the plastic bottle, 55 parts of propylene glycol monomethyl ether acetate, 7.0 parts of DISPERBYK LPN21116 (produced by BYK-Chemie), and 0.3-to-0.4-mmφ SEPR beads were added. These components were dispersed for 4 hours using Paint Conditioner (produced by Toyo Seiki Kogyo Co., Ltd.). The resulting mixture was filtered through a 5-μm filter to prepare a pigment dispersion. Then, 75.00 parts of the pigment dispersion was mixed with 5.50 parts of a polyester acrylate resin (ARONIX (trade name) M7100, produced by TOAGOSEI CO., LTD.), 5.00 parts of dipentaerythritol hexaacrylate (KAYARAD (trade name) DPHA, produced by Nippon Kayaku Co., Ltd.), 1.00 parts of benzophenone (KAYACURE (trade name) BP-100, produced by Nippon Kayaku Co., Ltd.), and 13.5 parts of UCAR ester EEP under stirring using a dispersion stirrer. The resulting mixture was filtered through a filter having a pore size of 1.0 μm. Thus, a red pigment coloring composition 1 was prepared.

Note that the water-soluble content of the pigment was calculated in accordance with JIS K5101-16-1 (Test methods for pigments-Part 16: Matter soluble in water-Section 1: Hot extraction method), that is, in the following manner:

1. Into a 500-mL rigid beaker, 5.00 g of an accurately weighed pigment is charged. To the beaker, 200 mL of ion-exchange water (electrical conductivity: 5 μS/cm or less, pH: 7.0±1.0) is added. The ion-exchange water is added in small amounts at a time. After 5 mL of first-grade reagent methanol is added to the beaker to soak the pigment in the ion-exchange water to a sufficient degree, the remaining ion-exchange water is added to the beaker. The resulting liquid mixture is boiled for 5 minutes.

2. The liquid mixture is cooled to room temperature, and transferred to a 250-mL graduated cylinder. To the graduated cylinder, the above-described ion-exchange water is added until the volume of the liquid mixture becomes 250 mL. The liquid mixture is vigorously stirred and then filtered through a filter paper No. 5C produced by ADVANTEC.

3. Initially, about 50 mL of the filtrate is removed, and 100 mL of the remaining filtrate is weighed using a graduated cylinder and transferred to an evaporation pan of known mass. The filtrate adhering to the graduated cylinder is washed off with a small amount of ion-exchange water into the evaporation pan.

4. The evaporation pan is placed in a water bath, and evaporation to dryness is performed. The evaporation pan is dried for 2 hours in a drying machine kept at 105° C. to 110° C. and subsequently charged into a desiccator. After the evaporation pan is left to cool, the mass of the evaporation pan is measured. Thus, the amount of substance that remained after evaporation is determined.

5. The water-soluble content of the pigment is calculated using the following formula.

Water-soluble content of the pigment (%)=Amount of substance remaining after evaporation (g)× 2.5/Mass of the pigment (g)×100

The specific electrical conductivity of the pigment was calculated in the following manner. The specific electrical conductivity of the ion-exchange water used was measured using a conductivity meter (e.g., Model: CM-30V produced by DKK-TOA CORPORATION). The specific electrical conductivity of the 100 mL of filtrate, which was weighed using a graduated cylinder in the above step 3, was measured using the conductivity meter. Then, the specific electrical conductivity of the pigment was calculated by correcting the measured value by using the following formula.

Specific electrical conductivity of the pigment=Specific electrical conductivity of the filtrate−Specific electrical conductivity of the ion-exchange water used

[Red Pigment Coloring Composition 2]

A red pigment coloring composition 2 was prepared as described above, except that a pigment (water-soluble content: 0.4%, specific electrical conductivity: 30 μS/cm) prepared by mixing 6 parts of the red pigment 1 with 2 parts of a red pigment 2 (C.I. Pigment Red 177, water-soluble content: 0.5%, specific electrical conductivity: 40 μS/cm) and 2 parts of a yellow pigment 1 (C.I. Pigment Yellow 139, water-soluble content: 0.4%, specific electrical conductivity: 40 μS/cm) was used instead of 10 parts of the red pigment 1 used for preparing the red pigment coloring composition 1.

[Red Pigment Coloring Composition 3]

A red pigment coloring composition 3 was prepared as described above, except that 10 parts of a red pigment 3 (C.I. Pigment Red 255, water-soluble content: 0.6%, specific electrical conductivity: 60 μS/cm) was used instead of 10 parts of the red pigment 1 used for preparing the red pigment coloring composition 1.

[Red Pigment Coloring Composition 4]

A red pigment coloring composition 4 was prepared as described above, except that a pigment (water-soluble content: 0.2%, specific electrical conductivity: 30 μS/cm) prepared by mixing 8 parts of a red pigment 4 (C.I. Pigment Red 264, water-soluble content: 0.2%, specific electrical conductivity: 25 μS/cm) with 2 parts of the yellow pigment 1 (C.I. Pigment Yellow 139, water-soluble content: 0.4%, specific electrical conductivity: 40 μS/cm) was used instead of 10 parts of the red pigment 1 used for preparing the red pigment coloring composition 1.

[Red Pigment Coloring Composition 5]

A red pigment coloring composition 5 was prepared as described above, except that 10 parts of a red pigment 5 (C.I. Pigment Red 48:1, water-soluble content: 1.6%, specific electrical conductivity: 170 μS/cm) was used instead of 10 parts of the red pigment 1 used for preparing the red pigment coloring composition 1.

[Green Pigment Coloring Composition 1]

A green pigment coloring composition 1 was prepared as described above, except that a pigment (water-soluble content: 0.4%, specific electrical conductivity: 50 μS/cm) prepared by mixing 6 parts of a green pigment 1 (C.I. Pigment Green 36, water-soluble content: 0.3%, specific electrical conductivity: 40 μS/cm) with 4 parts of a yellow pigment 2 (C.I. Pigment Yellow 150, water-soluble content: 0.6%, specific electrical conductivity: 70 μS/cm) was used instead of 10 parts of the red pigment 1 used for preparing the red pigment coloring composition 1.

[Green Pigment Coloring Composition 2]

A green pigment coloring composition 2 was prepared as described above, except that a pigment (water-soluble content: 0.2%, specific electrical conductivity: 30 μS/cm) prepared by mixing 4 parts of a green pigment 2 (C.I. Pigment Green 7, water-soluble content: 0.2%, specific electrical conductivity: 30 μS/cm) with 6 parts of a yellow pigment 3 (C.I. Pigment Yellow 138, water-soluble content: 0.2%, specific electrical conductivity: 30 μS/cm) was used instead of 6 parts of the green pigment 1 and 4 parts of the yellow pigment 2 used for preparing the green pigment coloring composition 1.

[Green Pigment Coloring Composition 3]

A green pigment coloring composition 3 was prepared as described above, except that a pigment (water-soluble content: 0.2%, specific electrical conductivity: 30 μS/cm) prepared by mixing 6 parts of a green pigment 3 (C.I. Pigment Green 58, water-soluble content: 0.2%, specific electrical conductivity: 25 μS/cm) with 4 parts of the yellow pigment 3 (C.I. Pigment Yellow 138, water-soluble content: 0.2%, specific electrical conductivity: 30 μS/cm) was used instead of 6 parts of the green pigment 1 and 4 parts of the yellow pigment 2 used for preparing the green pigment coloring composition 1.

[Green Pigment Coloring Composition 4]

A green pigment coloring composition 4 was prepared as described above, except that a pigment (water-soluble content: 0.7%, specific electrical conductivity: 80 μS/cm) prepared by mixing 6 parts of the green pigment 3 (C.I. Pigment Green 58, water-soluble content: 0.2%, specific electrical conductivity: 25 μS/cm) with 3.6 parts of the yellow pigment 3 (C.I. Pigment Yellow 138, water-soluble content: 0.2%, specific electrical conductivity: 30 μS/cm) and 0.4 parts of the sulfonic acid derivative of YELLOW 138 which is described in Production Example 2 of Japanese Unexamined Patent Application Publication No. 2004-292785 was used instead of 6 parts of the green pigment 1 and 4 parts of the yellow pigment 2 used for preparing the green pigment coloring composition 1.

[Green Pigment Coloring Composition 5]

A green pigment coloring composition 5 was prepared as described above, except that a pigment (water-soluble content: 1.8%, specific electrical conductivity: 190 μS/cm) prepared by mixing 6 parts of a green pigment 4 (C.I. Pigment Green 4, water-soluble content: 1.7%, specific electrical conductivity: 180 μS/cm) with 4 parts of a yellow pigment 4 (C.I. Pigment Yellow 62, water-soluble content: 1.9%, specific electrical conductivity: 190 μS/cm) was used instead of 6 parts of the green pigment 1 and 4 parts of the yellow pigment 2 used for preparing the green pigment coloring composition 1.

[Blue Pigment Coloring Composition 1]

A blue pigment coloring composition 1 was prepared as described above, except that a pigment (water-soluble content: 0.3%, specific electrical conductivity: 30 μS/cm) prepared by mixing 9 parts of a blue pigment 1 (C.I. Pigment Blue 15:6, water-soluble content: 0.2%, specific electrical conductivity: 20 μS/cm) with 1 part of a purple pigment 1 (C.I. Pigment Violet 23, water-soluble content: 0.7%, specific electrical conductivity: 80 μS/cm) was used instead of 10 parts of the red pigment 1 used for preparing the red pigment coloring composition 1.

[Blue Pigment Coloring Composition 2]

A blue pigment coloring composition 2 was prepared as described above, except that a pigment (water-soluble content: 0.5%, specific electrical conductivity: 50 μS/cm) prepared using the blue pigment 1 whose water-soluble content was changed to 0.5% and whose specific electrical conductivity was changed to 50 μS/cm, that is, namely, a blue pigment 2, was used.

[Blue Pigment Coloring Composition 3]

A blue pigment coloring composition 3 was prepared as described above, except that 10 parts of a triarylmethane pigment represented by General Formula (1) (Compound No. 5 in Table 1, water-soluble content: 1.1%, specific electrical conductivity: 114 μS/cm) was used instead of 9 parts of the blue pigment 1 and 1 part of the purple pigment 1 used for preparing the blue pigment coloring composition 1.

[Blue Pigment Coloring Composition 4]

A blue pigment coloring composition 4 was prepared as described above, except that 10 parts of a blue pigment 3 (C.I. Pigment Blue 1, water-soluble content: 1.3%, specific electrical conductivity: 160 μS/cm) was used instead of 9 parts of the blue pigment 1 and 1 part of the purple pigment 1 used for preparing the blue pigment coloring composition 1.

[Blue Pigment Coloring Composition 5]

A blue pigment coloring composition 5 was prepared as described above, except that 10 parts of a blue pigment 4 (C.I. Pigment Blue 61, water-soluble content: 1.8%, specific electrical conductivity: 200 μS/cm) was used instead of 9 parts of the blue pigment 1 and 1 part of the purple pigment 1 used for preparing the blue pigment coloring composition 1.

[Yellow Pigment Coloring Composition 1]

A yellow pigment coloring composition 1 was prepared as described above, except that a pigment (water-soluble content: 1.6%, specific electrical conductivity: 120 μS/cm) prepared by mixing 9 parts of a yellow pigment 5 (C.I. Pigment Yellow 138, water-soluble content: 0.5%, specific electrical conductivity: 50 μS/cm) with 1 part of the sulfonic acid derivative of YELLOW 138 which is described in Production Example 2 of Japanese Unexamined Patent Application Publication No. 2004-292785 was used instead of 10 parts of the red pigment 1 used for preparing the red pigment coloring composition 1.

[Yellow Pigment Coloring Composition 5]

A yellow pigment coloring composition 5 was prepared as described above, except that 10 parts of the yellow pigment 5 (C.I. Pigment Yellow 150, water-soluble content: 0.6%, specific electrical conductivity: 70 μS/cm) was used instead of the yellow pigment 5 used for preparing the yellow pigment composition 1.

[Preparation of Color Filter]

A specific one of the red coloring compositions was applied to a glass substrate, on which a black matrix was deposited, by spin coating so as to form a coating film having a thickness of 2 μm. After being dried at 70° C. for 20 minutes, the coating film was exposed to ultraviolet rays through a photomask using an exposure machine including an extra-high pressure mercury lamp to form a striped pattern. The patterned coating film was subjected to spray development using an alkali developing solution for 90 seconds, then washed with ion-exchanged water, and air-dried. Subsequently, post-baking was performed in a clean oven at 230° C. for 30 minutes. Thus, red pixels constituted by a colored layer having a striped pattern were formed on the transparent substrate.

In the same manner, a specific one of the green coloring compositions was applied to the glass substrate by spin coating so as to form a coating film having a thickness of 2 μm. After being dried, the coating film was exposed to light using the exposure machine so that a colored layer having a striped pattern was developed at a position displaced from that of the red pixels. Thus, green pixels adjacent to the red pixels were formed.

In the same manner, a specific one of the blue coloring compositions was applied to the glass substrate by spin coating so as to form a coating film having a thickness of 2 μm. Thus, blue pixels adjacent to the red pixels and the green pixels were formed. In the above-described manner, a color filter including three-colored pixels of red, green, and blue having a striped pattern formed on the transparent substrate was prepared.

Optionally, in the same manner, a specific one of the yellow coloring compositions was also applied to the glass substrate by spin coating so as to form a coating film having a thickness of 2 μm. Thus, yellow color filter including four-colored pixels of red, green, blue, and yellow having a striped pattern formed on the transparent substrate was prepared.

Color filters 1 to 4 and a comparative color filter 1 were prepared using the dye coloring compositions and the pigment coloring compositions shown in Table 8.

TABLE 8

|  | Color filter 1 | Color filter 2 | Color filter 3 | Color filter 4 | Comparative color filter 1 |
| --- | --- | --- | --- | --- | --- |
| R pixel portion | Red pigment coloring composition 1 | Red pigment coloring composition 2 | Red pigment coloring composition 3 | Red pigment coloring composition 4 | Red pigment coloring composition 5 |
| G pixel portion | Green pigment coloring composition 1 | Green pigment coloring composition 2 | Green pigment coloring composition 3 | Green pigment coloring composition 4 | Green pigment coloring composition 5 |
| B pixel portion | Blue pigment coloring composition 1 | Blue pigment coloring composition 2 | Blue pigment coloring composition 3 | Blue pigment coloring composition 4 | Blue pigment coloring composition 5 |

TABLE 8-continued

|  | Color filter 1 | Color filter 2 | Color filter 3 | Color filter 4 | Comparative color filter 1 |
|---|---|---|---|---|---|
| Y pixel portion | None | Yellow pigment coloring composition 1 | None | Yellow pigment coloring composition 2 | Yellow pigment coloring composition 2 |

Examples 1 to 4

An electrode structure was formed on the first and second substrates, and an alignment film having a vertical alignment was formed on surfaces of the first and second substrates which faced each other. Subsequently, a rubbing treatment was performed to form a TN cell. The liquid crystal compositions 1 to 4 shown in Table 9, which had a positive dielectric anisotropy, was held between the first and second substrates. Then, liquid crystal display apparatuses of Example 1 ($d_{gap}$=3.5 μm, alignment film: AL-1051) were each prepared using a specific one of the color filters 1 to 4 shown in Table 8. The VHR and ID of each liquid crystal display apparatus were measured. Each liquid crystal display apparatus was evaluated in terms of burn-in. Table 10 summarizes the results.

TABLE 9

|  | Liquid crystal composition 1 |
|---|---|
| 5-Cy-Ph—F | 5 |
| 7-Cy-Ph—F | 6 |
| 2-Cy-Cy-Ph—OCFFF | 11 |
| 3-Cy-Cy-Ph3—F | 12 |
| 3-Cy-Cy-Ph—OCFFF | 12 |
| 3-Cy-Ph—Ph1—OCFFF | 12 |
| 4-Cy-Cy-Ph—OCFFF | 10 |
| 5-Cy-Cy-Ph3—F | 9 |
| 5-Cy-Cy-Ph—OCFFF | 12 |
| 5-Cy-Ph—Ph3—F | 11 |
| Total composition proportion | 100 |
| Tni/° C. | 91.8 |
| Δn (20° C.) | 0.093 |
| Δε (20° C.) | 11.3 |

TABLE 10

|  | Example 1 | Example 2 | Example 3 | Example 4 |
|---|---|---|---|---|
| Liquid crystal composition | Liquid crystal composition 1 | Liquid crystal composition 1 | Liquid crystal composition 1 | Liquid crystal composition 1 |
| Color filter | Color filter 1 | Color filter 2 | Color filter 3 | Color filter 4 |
| VHR | 99.6 | 99.5 | 99.1 | 99.1 |
| ID | 17 | 25 | 58 | 80 |
| Burn-in | Excellent | Excellent | Good | Good |

The liquid crystal display apparatuses of Examples 1 to 4 had a high VHR and a small ID. Furthermore, a residual image was absent in the burn-in evaluation. Even when a residual image was present, it was very slight and at an acceptable level.

Comparative Examples 1 to 8

The comparative liquid crystal composition 1 or 2 shown in Table 11, which had a positive dielectric anisotropy, was held inside the TN cell used in Example 1. Then, liquid crystal display apparatuses of Comparative Examples 1 to 8 were each prepared using a specific one of the color filters 1 to 4 shown in Table 8. The VHR and ID of each liquid crystal display apparatus were measured. Each liquid crystal display apparatus was evaluated in terms of burn-in. Tables 12 and 13 summarize the results.

TABLE 11

|  | Comparative liquid crystal composition 1 | Comparative liquid crystal composition 2 |
|---|---|---|
| 5-Cy-Ph—F | 5 | 5 |
| 7-Cy-Ph—F | 6 | 6 |
| 2-Cy-Cy-Ph—OCFFF | 11 | 11 |
| 3-Cy-Cy-Ph3—F | 12 |  |
| 3-Cy-Cy-Ph1—OCFFF |  | 12 |
| 3-Cy-Cy-Ph—OCFFF | 12 | 12 |
| 3-Cy-Ph—Ph1—OCFFF | 12 |  |
| 4-Cy-Cy-Ph—OCFFF | 10 | 10 |
| 5-Cy-Cy-Ph3—F |  | 9 |
| 5-Cy-Cy-Ph—OCFFF | 12 | 12 |
| 5-Cy-Ph—Ph3—F | 10 |  |
| 3-Ph—VO—Ph1—CN |  | 11 |
| 3-Cy-Cy-Ph3—CN |  | 8 |
| 3-Cy-Ma-Ph3—CN | 10 | 4 |
| Total composition proportion | 100 | 100 |
| Tni/° C. | 91.1 | 92.1 |
| Δn (20° C.) | 0.097 | 0.094 |
| Δε (20° C.) | 12.5 | 11.7 |

TABLE 12

|  | Comparative example 1 | Comparative example 2 | Comparative example 3 | Comparative example 4 |
|---|---|---|---|---|
| Liquid crystal composition | Comparative liquid crystal composition 1 | Comparative liquid crystal composition 1 | Comparative liquid crystal composition 1 | Comparative liquid crystal composition 1 |
| Color filter | Color filter 1 | Color filter 2 | Color filter 3 | Color filter 4 |
| VHR | 98.5 | 98.4 | 98.2 | 98.0 |
| ID | 120 | 128 | 144 | 160 |
| Burn-in | Poor | Failure | Failure | Failure |

TABLE 13

|  | Comparative example 5 | Comparative example 6 | Comparative example 7 | Comparative example 8 |
|---|---|---|---|---|
| Liquid crystal composition | Comparative liquid crystal composition 2 | Comparative liquid crystal composition 2 | Comparative liquid crystal composition 2 | Comparative liquid crystal composition 2 |
| Color filter | Color filter 1 | Color filter 2 | Color filter 3 | Color filter 4 |
| VHR | 98.4 | 98.4 | 98.1 | 97.8 |
| ID | 125 | 131 | 150 | 168 |
| Burn-in | Failure | Failure | Failure | Failure |

The liquid crystal display apparatuses of Comparative Examples 1 to 8 had a lower VHR and a higher ID than the liquid crystal display apparatuses according to the present invention. Furthermore, occurrence of a residual image was observed in the burn-in evaluation, which was not at an acceptable level.

Comparative Example 9

The liquid crystal composition 1 shown in Table 9, which had a positive dielectric anisotropy, was held inside the TN cell used in Example 1. Then, a liquid crystal display apparatus of Comparative Example 9 was prepared using the comparative color filter 1 shown in Table 8. The VHR and ID of the liquid crystal display apparatus were measured. The liquid crystal display apparatus was evaluated in terms of burn-in. Table 14 summarizes the results.

TABLE 14

|  | Comparative example 9 |
| --- | --- |
| Liquid crystal composition | Liquid crystal composition 1 |
| Color filter | Comparative color filter 1 |
| VHR | 97.2 |
| ID | 215 |
| Burn-in | Failure |

The liquid crystal display apparatus of Comparative Example 9 had a lower VHR and a higher ID than the liquid crystal display apparatuses according to the present invention. Furthermore, occurrence of a residual image was observed in the burn-in evaluation, which was not at an acceptable level.

Examples 5 to 16

A specific one of the liquid crystals shown in Table 15, which had a positive dielectric anisotropy, was held between the first and second substrates as in Example 1. Then, liquid crystal display apparatuses of Examples 5 to 16 were each prepared using a specific one of the color filters shown in Table 8. The VHR and ID of each liquid crystal display apparatus were measured. Each liquid crystal display apparatus was evaluated in terms of burn-in. Tables 16 to 18 summarize the results.

TABLE 15

|  | Liquid crystal composition 2 | Liquid crystal composition 3 | Liquid crystal composition 4 |
| --- | --- | --- | --- |
| 5-Cy-Ph—F | 5 | 5 | 6 |
| 7-Cy-Ph—F | 6 | 6 | 6 |
| 2-Cy-Cy-Ph—OCFFF | 11 | 11 | 11 |
| 3-Cy-Cy-Ph1—F | 12 |  |  |
| 3-Cy-Cy-Ph1—OCFFF |  |  | 9 |
| 3-Cy-Cy-Ph3—OCFFF |  | 12 |  |
| 3-Cy-Cy-Ph—OCFFF | 12 | 12 | 12 |
| 3-Cy-Ph—Ph1—F |  |  | 14 |
| 3-Cy-Ph—Ph1—OCFFF | 12 | 12 |  |
| 4-Cy-Cy-Ph—OCFFF | 10 | 10 | 10 |
| 5-Cy-Cy-Ph1—F | 9 |  |  |
| 5-Cy-Cy-Ph1—OCFFF |  |  | 10 |
| 5-Cy-Cy-Ph3—OCFFF |  | 9 |  |

TABLE 15-continued

|  | Liquid crystal composition 2 | Liquid crystal composition 3 | Liquid crystal composition 4 |
| --- | --- | --- | --- |
| 5-Cy-Cy-Ph—OCFFF | 12 | 12 | 10 |
| 5-Cy-Ph—Ph1—F |  |  | 12 |
| 5-Cy-Ph—Ph1—OCFFF | 11 | 11 |  |
| Total composition proportion | 100 | 100 | 100 |
| Tni/° C. | 96.1 | 98.9 | 97.6 |
| Δn (20° C.) | 0.091 | 0.096 | 0.096 |
| Δε (20° C.) | 10.4 | 10.5 | 8.6 |

TABLE 16

|  | Example 5 | Example 6 | Example 7 | Example 8 |
| --- | --- | --- | --- | --- |
| Liquid crystal composition | Liquid crystal composition 2 | Liquid crystal composition 2 | Liquid crystal composition 2 | Liquid crystal composition 2 |
| Color filter | Color filter 1 | Color filter 2 | Color filter 3 | Color filter 4 |
| VHR | 99.5 | 99.3 | 99.2 | 99.1 |
| ID | 18 | 32 | 57 | 75 |
| Burn-in | Excellent | Excellent | Good | Good |

TABLE 17

|  | Example 9 | Example 10 | Example 11 | Example 12 |
| --- | --- | --- | --- | --- |
| Liquid crystal composition | Liquid crystal composition 3 | Liquid crystal composition 3 | Liquid crystal composition 3 | Liquid crystal composition 3 |
| Color filter | Color filter 1 | Color filter 2 | Color filter 3 | Color filter 4 |
| VHR | 99.7 | 99.5 | 99.2 | 99.1 |
| ID | 15 | 26 | 52 | 71 |
| Burn-in | Excellent | Excellent | Good | Good |

TABLE 18

|  | Example 13 | Example 14 | Example 15 | Example 16 |
| --- | --- | --- | --- | --- |
| Liquid crystal composition | Liquid crystal composition 4 | Liquid crystal composition 4 | Liquid crystal composition 4 | Liquid crystal composition 4 |
| Color filter | Color filter 1 | Color filter 2 | Color filter 3 | Color filter 4 |
| VHR | 99.6 | 99.4 | 99.3 | 99.1 |
| ID | 18 | 28 | 39 | 75 |
| Burn-in | Excellent | Excellent | Excellent | Good |

The liquid crystal display apparatuses of Examples 5 to 16 had a high VHR and a small ID. Furthermore, a residual image was absent in the burn-in evaluation. Even when a residual image was present, it was very slight and at an acceptable level.

Examples 17 to 28

A specific one of the liquid crystals shown in Table 19, which had a positive dielectric anisotropy, was held between the first and second substrates as in Example 1. Then, liquid crystal display apparatuses of Examples 17 to 28 were each prepared using a specific one of the color filters shown in Table 8. The VHR and ID of each liquid crystal display apparatus were measured. Each liquid crystal display apparatus was evaluated in terms of burn-in. Tables 20 to 22 summarize the results.

TABLE 19

|  | Liquid crystal composition 5 | Liquid crystal composition 6 | Liquid crystal composition 7 |
| --- | --- | --- | --- |
| 5-Cy-Ph—F | 5 | 5 | 5 |
| 7-Cy-Ph—F | 6 | 6 | 6 |
| 2-Cy-Cy-Ph1—F |  | 12 | 12 |
| 3-Cy-Cy-Ph1—F | 12 | 10 | 10 |
| 3-Cy-Cy-Ph1—OCFFF | 12 | 12 | 12 |
| 3-Cy-Cy-Ph—OCFFF | 12 |  |  |
| 3-Cy-Ph—Ph1—OCFFF | 12 | 12 | 12 |
| 4-Cy-Cy-Ph1—F |  | 12 | 12 |
| 5-Cy-Cy-Ph1—F | 11 | 11 | 11 |
| 5-Cy-Cy-Ph1—OCFFF | 9 | 9 | 9 |
| 5-Cy-Cy-Ph—OCFFF | 10 |  |  |
| 5-Cy-Ph—Ph1—OCFFF | 11 | 11 | 11 |
| Total composition proportion | 100 | 100 | 100 |
| Tni/° C. | 91.1 | 83.5 | 86.8 |
| Δn (20° C.) | 0.092 | 0.089 | 0.092 |
| Δε (20° C.) | 9.9 | 8.3 | 7.9 |

TABLE 20

|  | Example 17 | Example 18 | Example 19 | Example 20 |
| --- | --- | --- | --- | --- |
| Liquid crystal composition | Liquid crystal composition 5 | Liquid crystal composition 5 | Liquid crystal composition 5 | Liquid crystal composition 5 |
| Color filter | Color filter 1 | Color filter 2 | Color filter 3 | Color filter 4 |
| VHR | 99.7 | 99.6 | 99.3 | 99.1 |
| ID | 15 | 21 | 49 | 72 |
| Burn-in | Excellent | Excellent | Good | Good |

TABLE 21

|  | Example 21 | Example 22 | Example 23 | Example 24 |
| --- | --- | --- | --- | --- |
| Liquid crystal composition | Liquid crystal composition 6 | Liquid crystal composition 6 | Liquid crystal composition 6 | Liquid crystal composition 6 |
| Color filter | Color filter 1 | Color filter 2 | Color filter 3 | Color filter 4 |
| VHR | 99.6 | 99.4 | 99.2 | 99.0 |
| ID | 12 | 31 | 50 | 73 |
| Burn-in | Excellent | Excellent | Good | Good |

TABLE 22

|  | Example 25 | Example 26 | Example 27 | Example 28 |
| --- | --- | --- | --- | --- |
| Liquid crystal composition | Liquid crystal composition 7 | Liquid crystal composition 7 | Liquid crystal composition 7 | Liquid crystal composition 7 |
| Color filter | Color filter 1 | Color filter 2 | Color filter 3 | Color filter 4 |
| VHR | 99.6 | 99.5 | 99.2 | 99.1 |
| ID | 17 | 22 | 59 | 74 |
| Burn-in | Excellent | Excellent | Good | Good |

The liquid crystal display apparatuses of Examples 17 to 28 had a high VHR and a small ID. Furthermore, a residual image was absent in the burn-in evaluation. Even when a residual image was present, it was very slight and at an acceptable level.

Examples 29 to 40

A specific one of the liquid crystals shown in Table 23, which had a positive dielectric anisotropy, was held between the first and second substrates as in Example 1. Then, liquid crystal display apparatuses of Examples 29 to 40 were each prepared using a specific one of the color filters shown in Table 8. The VHR and ID of each liquid crystal display apparatus were measured. Each liquid crystal display apparatus was evaluated in terms of burn-in. Tables 24 to 26 summarize the results.

TABLE 23

|  | Liquid crystal composition 8 | Liquid crystal composition 9 | Liquid crystal composition 10 |
| --- | --- | --- | --- |
| 5-Cy-2-Ph1—F |  | 5 |  |
| 5-Cy-Ph—F |  | 10 |  |
| 5-Ph1-Ph—OCFFF | 8 |  |  |
| 7-Cy-2-Ph1—F |  | 5 |  |
| 7-Cy-Ph3—F |  |  | 8 |
| 7-Cy-Ph—F |  | 15 |  |
| 7-Ph1-Ph—OCFFF | 7 |  |  |
| 2-Cy-Cy-Ph—OCFFF | 13 | 9 |  |
| 3-Cy-2-Cy-Ph3—F |  |  | 10 |
| 3-Cy-Cy-2-Ph3—F |  |  | 10 |
| 3-Cy-Cy-Ph3—F | 12 |  | 6 |
| 3-Cy-Cy-Ph—OCFFF | 15 | 12 |  |
| 3-Cy-Ph1—Ph—OCFF |  | 7 |  |
| 3-Cy-Ph—CFFO—Ph3—F |  |  | 5 |
| 3-Cy-Ph—CFFO—Ph—OCFFF |  |  | 5 |
| 3-Cy-Ph—Ph1—F |  | 13 |  |
| 3-Cy-Ph—Ph1—OCFF |  | 8 |  |
| 3-Cy-Ph—Ph3—F | 9 |  | 5 |
| 4-Cy-2-Cy-Ph3—F |  |  | 6 |
| 4-Cy-Cy-Ph3—F |  |  | 3 |
| 4-Cy-Cy-Ph—OCFFF | 13 |  |  |
| 5-Cy-2-Cy-Ph3—F |  |  | 6 |
| 5-Cy-Cy-2-Ph3—F |  |  | 5 |
| 5-Cy-Cy-Ph3—F | 9 |  |  |
| 5-Cy-Cy-Ph—OCFFF | 14 | 12 |  |
| 5-Cy-Ph—CFFO—Ph1—F |  |  | 5 |
| 5-Cy-Ph—CFFO—Ph3—F |  |  | 10 |
| 5-Cy-Ph—CFFO—Ph—CF3 |  |  | 5 |
| 5-Cy-Ph—Ph3—F |  |  | 5 |
| 3-Cy-Cy-2-Ph—Ph3—F |  |  | 3 |
| 3-Cy-Cy-Ph1—Ph—F |  | 4 |  |
| 3-Cy-Cy-Ph—Ph3—F |  |  | 3 |
| Total composition proportion | 100 | 100 | 100 |
| Tni/° C. | 79.8 | 65.1 | 61.7 |
| Δn (20° C.) | 0.0876 | 0.0995 | 0.0827 |
| Δε (20° C.) | 8.7 | 7.6 | 7.3 |

TABLE 24

|  | Example 29 | Example 30 | Example 31 | Example 32 |
| --- | --- | --- | --- | --- |
| Liquid crystal composition | Liquid crystal composition 8 | Liquid crystal composition 8 | Liquid crystal composition 8 | Liquid crystal composition 8 |
| Color filter | Color filter 1 | Color filter 2 | Color filter 3 | Color filter 4 |
| VHR | 99.7 | 99.5 | 99.2 | 99.0 |
| ID | 13 | 19 | 55 | 74 |
| Burn-in | Excellent | Excellent | Excellent | Good |

TABLE 25

|  | Example 33 | Example 34 | Example 35 | Example 36 |
|---|---|---|---|---|
| Liquid crystal composition | Liquid crystal composition 9 | Liquid crystal composition 9 | Liquid crystal composition 9 | Liquid crystal composition 9 |
| Color filter | Color filter 1 | Color filter 2 | Color filter 3 | Color filter 4 |
| VHR | 99.5 | 99.5 | 99.3 | 99.2 |
| ID | 20 | 22 | 37 | 52 |
| Burn-in | Excellent | Excellent | Excellent | Good |

TABLE 26

|  | Example 37 | Example 38 | Example 39 | Example 40 |
|---|---|---|---|---|
| Liquid crystal composition | Liquid crystal composition 10 | Liquid crystal composition 10 | Liquid crystal composition 10 | Liquid crystal composition 10 |
| Color filter | Color filter 1 | Color filter 2 | Color filter 3 | Color filter 4 |
| VHR | 99.6 | 99.4 | 99.3 | 99.2 |
| ID | 18 | 29 | 42 | 56 |
| Burn-in | Excellent | Excellent | Good | Good |

The liquid crystal display apparatuses of Examples 29 to 40 had a high VHR and a small ID. Furthermore, a residual image was absent in the burn-in evaluation. Even when a residual image was present, it was very slight and at an acceptable level.

Examples 41 to 56

A specific one of the liquid crystals shown in Tables 27 and 28, which had a positive dielectric anisotropy, was held between the first and second substrates as in Example 1. Then, liquid crystal display apparatuses of Examples 41 to 56 were each prepared using a specific one of the color filters shown in Table 8. The VHR and ID of each liquid crystal display apparatus were measured. Each liquid crystal display apparatus was evaluated in terms of burn-in. Tables 29 to 32 summarize the results.

TABLE 27

|  | Liquid crystal composition 11 | Liquid crystal composition 12 | Liquid crystal composition 13 |
|---|---|---|---|
| 3-Cy-2-Ph1—Cl | 5 |  |  |
| 3-Cy-Ph1—Cl |  |  | 11 |
| 5-Cy-2-Ph1—Cl | 5 |  |  |
| 5-Cy-Ph1—Cl |  |  | 10 |
| 2-Cy-Cy-Ph3—Cl |  | 10 |  |
| 3-Cy-Cy-Ph3—Cl |  | 9 |  |
| 5-Cy-Cy-Ph3—Cl |  | 11 |  |
| 5-Cy-Ph—F | 11 | 7 |  |
| 6-Cy-Ph—F |  | 4 |  |
| 7-Cy-Ph—F | 13 | 6 | 10 |
| 2-Cy-Cy-Ph—OCFFF | 9 | 9 | 9 |
| 3-Cy-Cy-Ph—OCFFF | 12 | 11 | 12 |
| 3-Cy-Ph1—Ph—CFFF | 5 |  | 5 |
| 3-Cy-Ph1—Ph—F |  |  | 10 |
| 3-Cy-Ph1—Ph—OCFFF |  | 12 |  |
| 4-Cy-Cy-Ph—OCFFF | 7 |  | 7 |
| 5-Cy-Cy-Ph—OCFFF | 12 | 12 | 12 |
| 5-Cy-Ph1—Ph—CFFF | 5 |  |  |
| 5-Cy-Ph1—Ph—OCFFF |  | 9 |  |
| 5-Cy-Ph—Ph1—F | 13 |  | 8 |
| 2-Cy-Cy-Ph1—Ph—F | 3 |  |  |
| 3-Cy-Cy-Ph1—Ph—F |  |  | 3 |
| 5-Cy-Cy-Ph1—Ph—F |  |  | 3 |
| Total composition proportion | 100 | 100 | 100 |
| Tni/° C. | 65.8 | 86.2 | 70.7 |
| Δn (20° C.) | 0.0825 | 0.0923 | 0.0992 |
| Δε (20° C.) | 7.5 | 6.2 | 6.9 |

TABLE 28

|  | Liquid crystal composition 14 |
|---|---|
| 3-Cy-Cy-Ph—Cl | 4 |
| 5-Cy-Cy-Ph—Cl | 4 |
| 2-Cy-Ph—Ph1—F | 3 |
| 2-Cy-Ph—Ph—F | 3 |
| 3-Cy-2-Cy-Ph3—F | 6 |
| 3-Cy-Cy-2-Ph3—F | 12 |
| 3-Cy-Cy-Ph3—F | 3 |
| 3-Cy-Ph—CFFO—Ph—OCFFF | 5 |
| 3-Cy-Ph—Ph1—F | 3 |
| 3-Cy-Ph—Ph3—F | 6 |
| 3-Cy-Ph—Ph—F | 3 |
| 4-Cy-2-Cy-Ph3—F | 6 |
| 4-Cy-Cy-Ph3—F | 3 |
| 5-Cy-2-Cy-Ph3—F | 6 |
| 5-Cy-Cy-2-Ph3—F | 6 |
| 5-Cy-Ph—CFFO—Ph3—F | 10 |
| 5-Cy-Ph—CFFO—Ph—CF3 | 5 |
| 5-Cy-Ph—Ph1—F | 6 |
| 5-Cy-Ph—Ph3—F | 6 |
| Total composition proportion | 100 |
| Tni/° C. | 82.4 |
| Δn (20° C.) | 0.0998 |
| Δε (20° C.) | 10.9 |

TABLE 29

|  | Example 41 | Example 42 | Example 43 | Example 44 |
|---|---|---|---|---|
| Liquid crystal composition | Liquid crystal composition 11 | Liquid crystal composition 11 | Liquid crystal composition 11 | Liquid crystal composition 11 |
| Color filter | Color filter 1 | Color filter 2 | Color filter 3 | Color filter 4 |
| VHR | 99.7 | 99.6 | 99.4 | 99.3 |
| ID | 12 | 18 | 33 | 45 |
| Burn-in | Excellent | Excellent | Excellent | Excellent |

TABLE 30

|  | Example 45 | Example 46 | Example 47 | Example 48 |
|---|---|---|---|---|
| Liquid crystal composition | Liquid crystal composition 12 | Liquid crystal composition 12 | Liquid crystal composition 12 | Liquid crystal composition 12 |
| Color filter | Color filter 1 | Color filter 2 | Color filter 3 | Color filter 4 |
| VHR | 99.7 | 99.7 | 99.5 | 99.3 |
| ID | 11 | 13 | 34 | 51 |
| Burn-in | Excellent | Excellent | Excellent | Good |

TABLE 31

|  | Example 49 | Example 50 | Example 51 | Example 52 |
|---|---|---|---|---|
| Liquid crystal composition | Liquid crystal composition 13 | Liquid crystal composition 13 | Liquid crystal composition 13 | Liquid crystal composition 13 |
| Color filter | Color filter 1 | Color filter 2 | Color filter 3 | Color filter 4 |
| VHR | 99.6 | 99.5 | 99.3 | 99.2 |
| ID | 13 | 16 | 36 | 54 |
| Burn-in | Excellent | Excellent | Good | Excellent |

TABLE 32

|  | Example 53 | Example 54 | Example 55 | Example 56 |
|---|---|---|---|---|
| Liquid crystal composition | Liquid crystal composition 14 | Liquid crystal composition 14 | Liquid crystal composition 14 | Liquid crystal composition 14 |
| Color filter | Color filter 1 | Color filter 2 | Color filter 3 | Color filter 4 |
| VHR | 99.8 | 99.6 | 99.4 | 99.4 |
| ID | 10 | 18 | 39 | 37 |
| Burn-in | Excellent | Excellent | Good | Good |

The liquid crystal display apparatuses of Examples 41 to 56 had a high VHR and a small ID. Furthermore, a residual image was absent in the burn-in evaluation. Even when a residual image was present, it was very slight and at an acceptable level.

Examples 57 to 72

A specific one of the liquid crystals shown in Table 33, which had a positive dielectric anisotropy, was held between the first and second substrates as in Example 1. Then, liquid crystal display apparatuses of Examples 57 to 72 were each prepared using a specific one of the color filters shown in Table 8. The VHR and ID of each liquid crystal display apparatus were measured. Each liquid crystal display apparatus was evaluated in terms of burn-in. Tables 34 to 37 summarize the results.

TABLE 33

|  | Liquid crystal composition 15 | Liquid crystal composition 16 | Liquid crystal composition 17 | Liquid crystal composition 18 |
|---|---|---|---|---|
| 3-Cy-Ph—Cl |  |  |  | 4 |
| 5-Cy-Ph—Cl |  |  |  | 4 |
| 7-Cy-Ph—Cl |  |  |  | 5 |
| 2-Cy-Cy-Ph—Cl |  |  |  | 6 |
| 3-Cy-2-Cy-Ph1—Cl |  |  |  | 3 |
| 3-Cy-Cy-Ph—Cl |  |  |  | 7 |
| 5-Cy-Cy-Ph—Cl |  |  |  | 6 |
| 3-Cy-Ph—OCFFF | 4 | 4 |  |  |
| 3-Ph—Ph—OCFFF |  |  | 8 |  |
| 4-Cy-Ph—OCFFF | 6 | 6 |  |  |
| 5-Cy-Ph—OCFFF | 7 | 7 |  |  |
| 5-Ph—Ph—OCFFF |  |  | 13 |  |
| 7-Ph—Ph—OCFFF |  |  | 13 |  |
| 2-Cy-Cy-Ph—OCFFF |  |  | 8 |  |
| 2-Cy-Ph—Ph1—F | 8 | 8 |  | 6 |
| 3-Cy-Cy-Ph—OCFFF |  |  | 13 |  |
| 3-Cy-Ph1—Ph—CFFF |  | 9 |  |  |
| 3-Cy-Ph1—Ph—F | 12 | 12 |  |  |
| 3-Cy-Ph1—Ph—OCFFF | 9 |  |  |  |
| 3-Cy-Ph—CFFO—Ph3—F |  |  |  | 5 |
| 3-Cy-Ph—CFFO—Ph—OCFFF |  |  |  | 5 |
| 3-Cy-Ph—Ph1—F |  |  | 14 | 6 |
| 3-Cy-Ph—Ph3—F | 12 | 12 |  | 13 |
| 4-Cy-Cy-Ph—OCFFF |  |  | 5 |  |
| 4-Cy-Ph—Ph3—F | 10 | 10 |  |  |
| 5-Cy-Cy-Ph—OCFFF |  |  | 12 |  |
| 5-Cy-Ph1—Ph—CFFF |  | 11 |  |  |
| 5-Cy-Ph1—Ph—OCFFF | 11 |  |  |  |
| 5-Cy-Ph—Ph1—F | 10 | 10 | 14 | 12 |
| 5-Cy-Ph—Ph3—F | 11 | 11 |  | 13 |
| 3-Cy-Ph1-T-Ph-2 |  |  |  | 3 |
| 3-Cy-Ph1—V—Ph-2 |  |  |  | 2 |
| Total composition proportion | 100 | 100 | 100 | 100 |
| Tni/° C. | 65.9 | 61.7 | 65.6 | 89.1 |
| Δn (20° C.) | 0.1116 | 0.1155 | 0.117 | 0.1274 |
| Δε (20° C.) | 5.9 | 7.3 | 10.5 | 6.2 |

TABLE 34

|  | Example 57 | Example 58 | Example 59 | Example 60 |
|---|---|---|---|---|
| Liquid crystal composition | Liquid crystal composition 15 | Liquid crystal composition 15 | Liquid crystal composition 15 | Liquid crystal composition 15 |
| Color filter | Color filter 1 | Color filter 2 | Color filter 3 | Color filter 4 |
| VHR | 99.6 | 99.7 | 99.3 | 99.2 |
| ID | 18 | 17 | 52 | 62 |
| Burn-in | Excellent | Excellent | Good | Good |

TABLE 35

|  | Example 61 | Example 62 | Example 63 | Example 64 |
|---|---|---|---|---|
| Liquid crystal composition | Liquid crystal composition 16 | Liquid crystal composition 16 | Liquid crystal composition 16 | Liquid crystal composition 16 |
| Color filter | Color filter 1 | Color filter 2 | Color filter 3 | Color filter 4 |
| VHR | 99.5 | 99.5 | 99.2 | 99.1 |
| ID | 15 | 19 | 63 | 71 |
| Burn-in | Excellent | Excellent | Good | Good |

TABLE 36

|  | Example 65 | Example 66 | Example 67 | Example 68 |
|---|---|---|---|---|
| Liquid crystal composition | Liquid crystal composition 17 | Liquid crystal composition 17 | Liquid crystal composition 17 | Liquid crystal composition 17 |
| Color filter | Color filter 1 | Color filter 2 | Color filter 3 | Color filter 4 |
| VHR | 99.6 | 99.4 | 99.2 | 99.1 |
| ID | 16 | 34 | 58 | 75 |
| Burn-in | Excellent | Excellent | Good | Good |

TABLE 37

|  | Example 69 | Example 70 | Example 71 | Example 72 |
| --- | --- | --- | --- | --- |
| Liquid crystal composition | Liquid crystal composition 18 | Liquid crystal composition 18 | Liquid crystal composition 18 | Liquid crystal composition 18 |
| Color filter | Color filter 1 | Color filter 2 | Color filter 3 | Color filter 4 |
| VHR | 99.5 | 99.5 | 99.3 | 99.1 |
| ID | 20 | 19 | 43 | 67 |
| Burn-in | Excellent | Excellent | Excellent | Good |

The liquid crystal display apparatuses of Examples 57 to 72 had a high VHR and a small ID. Furthermore, a residual image was absent in the burn-in evaluation. Even when a residual image was present, it was very slight and at an acceptable level.

Examples 73 to 80

A specific one of the liquid crystals shown in Table 38, which had a positive dielectric anisotropy, was held between the first and second substrates as in Example 1. Then, liquid crystal display apparatuses of Examples 73 to 80 were each prepared using a specific one of the color filters shown in Table 8. The VHR and ID of each liquid crystal display apparatus were measured. Each liquid crystal display apparatus was evaluated in terms of burn-in. Tables 39 and 40 summarize the results.

TABLE 38

|  | Liquid crystal composition 19 | Liquid crystal composition 20 |
| --- | --- | --- |
| 5-Cy-Ph—F | 6 | 5 |
| 7-Cy-Ph—F | 6 | 6 |
| 2-Cy-Ph—Ph1—F | 8 |  |
| 3-Cy-2-Cy-Ph—OCFFF | 8 |  |
| 3-Cy-Cy-2-Ph—OCFFF | 8 |  |
| 3-Cy-Cy-Ph1—OCFFF |  | 12 |
| 3-Cy-Cy-Ph—OCFFF |  | 12 |
| 3-Cy-Ph—CFFO—Ph3—F | 3 |  |
| 3-Cy-Ph—CFFO—Ph—OCFFF | 5 |  |
| 3-Cy-Ph—Ph1—F | 8 | 12 |
| 3-Cy-Ph—Ph1—OCFFF |  | 12 |
| 5-Cy-2-Cy-Ph—OCFFF | 8 |  |
| 5-Cy-Cy-2-Ph—OCFFF | 8 |  |
| 5-Cy-Cy-Ph1—OCFFF |  | 9 |
| 5-Cy-Cy-Ph—OCFFF | 8 | 10 |
| 5-Cy-Ph—CFFO—Ph3—F | 8 |  |
| 5-Cy-Ph—Ph1—F | 16 | 11 |
| 5-Cy-Ph—Ph1—OCFFF |  | 11 |
| Total composition proportion | 100 | 100 |
| Tni/° C. | 84.5 | 89.3 |
| Δn (20° C.) | 0.1004 | 0.105 |
| Δε (20° C.) | 6.3 | 9.7 |

TABLE 39

|  | Example 73 | Example 74 | Example 75 | Example 76 |
| --- | --- | --- | --- | --- |
| Liquid crystal composition | Liquid crystal composition 19 | Liquid crystal composition 19 | Liquid crystal composition 19 | Liquid crystal composition 19 |
| Color filter | Color filter 1 | Color filter 2 | Color filter 3 | Color filter 4 |
| VHR | 99.6 | 99.4 | 99.3 | 99.2 |
| ID | 14 | 37 | 51 | 72 |
| Burn-in | Excellent | Excellent | Good | Good |

TABLE 40

|  | Example 77 | Example 78 | Example 79 | Example 80 |
| --- | --- | --- | --- | --- |
| Liquid crystal composition | Liquid crystal composition 20 | Liquid crystal composition 20 | Liquid crystal composition 20 | Liquid crystal composition 20 |
| Color filter | Color filter 1 | Color filter 2 | Color filter 3 | Color filter 4 |
| VHR | 99.7 | 99.5 | 99.4 | 99.3 |
| ID | 14 | 23 | 41 | 52 |
| Burn-in | Excellent | Excellent | Excellent | Good |

The liquid crystal display apparatuses of Examples 73 to 80 had a high VHR and a small ID. Furthermore, a residual image was absent in the burn-in evaluation. Even when a residual image was present, it was very slight and at an acceptable level.

Examples 81 to 88

A specific one of the liquid crystals shown in Table 41, which had a positive dielectric anisotropy, was held between the first and second substrates as in Example 1. Then, liquid crystal display apparatuses of Examples 81 to 88 were each prepared using a specific one of the color filters shown in Table 8. The VHR and ID of each liquid crystal display apparatus were measured. Each liquid crystal display apparatus was evaluated in terms of burn-in. Tables 42 and 43 summarize the results.

TABLE 41

|  | Liquid crystal composition 21 | Liquid crystal composition 22 |
| --- | --- | --- |
| 3-Ph1—Ph—Cl |  | 6 |
| 5-Ph1—Ph—Cl |  | 7 |
| 2-Cy-Ph—Ph3—Cl | 5 | 5 |
| 3-Cy-Ph—Ph3—Cl | 9 | 9 |
| 5-Cy-Ph—Ph3—Cl | 11 | 11 |
| 3-Ph—Ph1—F | 6 |  |
| 5-Ph—Ph1—F | 7 |  |
| 2-Cy-Ph—Ph1—F | 8 | 8 |
| 3-Cy-2-Ph—Ph1—F | 11 | 11 |
| 3-Cy-Ph—Ph1—F | 12 | 12 |
| 4-Cy-2-Ph—Ph1—F | 10 | 10 |
| 5-Cy-2-Ph—Ph1—F | 11 | 11 |
| 5-Cy-Ph—Ph1—F | 10 | 10 |
| Total composition proportion | 100 | 100 |
| Tni/° C. | 85.3 | 83.1 |
| Δn (20° C.) | 0.1474 | 0.1582 |
| Δε (20° C.) | 5.9 | 5.4 |

TABLE 42

|  | Example 81 | Example 82 | Example 83 | Example 84 |
| --- | --- | --- | --- | --- |
| Liquid crystal composition | Liquid crystal composition 21 | Liquid crystal composition 21 | Liquid crystal composition 21 | Liquid crystal composition 21 |
| Color filter | Color filter 1 | Color filter 2 | Color filter 3 | Color filter 4 |
| VHR | 99.7 | 99.6 | 99.4 | 99.3 |
| ID | 13 | 19 | 39 | 53 |
| Burn-in | Excellent | Excellent | Excellent | Good |

TABLE 43

|  | Example 85 | Example 86 | Example 87 | Example 88 |
|---|---|---|---|---|
| Liquid crystal composition | Liquid crystal composition 22 | Liquid crystal composition 22 | Liquid crystal composition 22 | Liquid crystal composition 22 |
| Color filter | Color filter 1 | Color filter 2 | Color filter 3 | Color filter 4 |
| VHR | 99.6 | 99.4 | 99.2 | 99.1 |
| ID | 25 | 37 | 67 | 78 |
| Burn-in | Excellent | Excellent | Good | Good |

The liquid crystal display apparatuses of Examples 81 to 88 had a high VHR and a small ID. Furthermore, a residual image was absent in the burn-in evaluation. Even when a residual image was present, it was very slight and at an acceptable level.

Examples 89 to 96

A specific one of the liquid crystals shown in Table 44, which had a positive dielectric anisotropy, was held between the first and second substrates as in Example 1. Then, liquid crystal display apparatuses of Examples 89 to 96 were each prepared using a specific one of the color filters shown in Table 8. The VHR and ID of each liquid crystal display apparatus were measured. Each liquid crystal display apparatus was evaluated in terms of burn-in. Tables 45 and 46 summarize the results.

TABLE 44

|  | Liquid crystal composition 23 | Liquid crystal composition 24 |
|---|---|---|
| 5-Cy-Cy-1 | 6 | 5 |
| 0d1-Cy-Cy-3 | 24 | 35 |
| 1d1-Cy-Cy-3 | 5 | 9 |
| 0d1-Cy-Cy-Ph-1 |  | 2 |
| 0d1-Cy-Ph—Ph-3 | 5 | 9 |
| 5-Cy-Ph—F | 3 | 2 |
| 7-Cy-Ph—F | 4 | 2 |
| 2-Cy-Cy-Ph—OCFFF | 7 | 4 |
| 3-Cy-Cy-Ph—OCFFF | 7 | 5 |
| 4-Cy-Cy-Ph—OCFFF | 6 | 4 |
| 5-Cy-Cy-Ph—OCFFF | 7 | 5 |
| 3-Cy-Cy-Ph3—F | 7 | 5 |
| 5-Cy-Cy-Ph3—F | 5 | 4 |
| 3-Cy-Ph—Ph1—OCFFF | 7 | 5 |
| 5-Cy-Ph—Ph3—F | 7 | 4 |
| Total composition proportion | 100 | 100 |
| Tni/° C. | 75.7 | 75.0 |
| Δn (20° C.) | 0.087 | 0.084 |
| Δε (20° C.) | 4.7 | 3.0 |

TABLE 45

|  | Example 89 | Example 90 | Example 91 | Example 92 |
|---|---|---|---|---|
| Liquid crystal composition | Liquid crystal composition 23 | Liquid crystal composition 23 | Liquid crystal composition 23 | Liquid crystal composition 23 |
| Color filter | Color filter 1 | Color filter 2 | Color filter 3 | Color filter 4 |
| VHR | 99.7 | 99.6 | 99.4 | 99.3 |
| ID | 14 | 22 | 41 | 52 |
| Burn-in | Excellent | Excellent | Excellent | Excellent |

TABLE 46

|  | Example 93 | Example 94 | Example 95 | Example 96 |
|---|---|---|---|---|
| Liquid crystal composition | Liquid crystal composition 24 | Liquid crystal composition 24 | Liquid crystal composition 24 | Liquid crystal composition 24 |
| Color filter | Color filter 1 | Color filter 2 | Color filter 3 | Color filter 4 |
| VHR | 99.6 | 99.7 | 99.3 | 99.2 |
| ID | 16 | 14 | 50 | 66 |
| Burn-in | Excellent | Excellent | Good | Good |

The liquid crystal display apparatuses of Examples 89 to 96 had a high VHR and a small ID. Furthermore, a residual image was absent in the burn-in evaluation. Even when a residual image was present, it was very slight and at an acceptable level.

Examples 97 to 104

A specific one of the liquid crystals shown in Table 47, which had a positive dielectric anisotropy, was held between the first and second substrates as in Example 1. Then, liquid crystal display apparatuses of Examples 97 to 104 were each prepared using a specific one of the color filters shown in Table 8. The VHR and ID of each liquid crystal display apparatus were measured. Each liquid crystal display apparatus was evaluated in terms of burn-in. Tables 48 and 49 summarize the results.

TABLE 47

|  | Liquid crystal composition 25 | Liquid crystal composition 26 |
|---|---|---|
| 5-Cy-Cy-1 | 5 |  |
| 0d1-Cy-Cy-3 | 12 | 31 |
| 1d1-Cy-Cy-3 | 12 | 11 |
| 0d1-Cy-Cy-Ph-1 | 9 | 9 |
| 0d3-Cy-Cy-Ph-1 | 5 |  |
| 0d1-Cy-Ph—Ph-3 | 5 | 9 |
| 7-Cy-Ph—F | 5 | 3 |
| 3-Cy-Cy-Ph3—F | 4 | 3 |
| 4-Cy-Cy-Ph3—F | 2 |  |
| 3-Cy-2-Cy-Ph3—F | 6 | 4 |
| 4-Cy-2-Cy-Ph3—F | 3 | 2 |
| 5-Cy-2-Cy-Ph3—F | 3 | 2 |
| 3-Cy-Cy-2-Ph3—F | 6 | 4 |
| 5-Cy-Cy-2-Ph3—F | 3 | 2 |
| 3-Cy-Ph—Ph3—F | 3 | 2 |
| 5-Cy-Ph—Ph3—F | 3 | 2 |
| 5-Ph—Ph3—CFFO—Ph—CF3 | 3 | 2 |
| 5-Ph—Ph3—CFFO—Ph1—F | 3 | 2 |
| 3-Ph—Ph3—CFFO—Ph3—F | 3 | 2 |
| 5-Ph—Ph3—CFFO—Ph3—F | 6 | 4 |
| 3-Ph—Ph3—CFFO—Ph—OCFFF | 3 | 2 |
| 3-Cy-Cy-Ph—Ph3—F | 2 | 2 |
| 3-Cy-Cy-2-Ph—Ph3—F | 2 | 2 |
| Total composition proportion | 108 | 100 |
| Tni/° C. | 75.2 | 75.3 |
| Δn (20° C.) | 0.087 | 0.081 |
| Δε (20° C.) | 4.7 | 3.0 |

TABLE 48

|  | Example 97 | Example 98 | Example 99 | Example 100 |
|---|---|---|---|---|
| Liquid crystal composition | Liquid crystal composition 25 | Liquid crystal composition 25 | Liquid crystal composition 25 | Liquid crystal composition 25 |

TABLE 48-continued

|  | Example 97 | Example 98 | Example 99 | Example 100 |
|---|---|---|---|---|
| Color filter | Color filter 1 | Color filter 2 | Color filter 3 | Color filter 4 |
| VHR | 99.7 | 99.5 | 99.3 | 99.2 |
| ID | 14 | 34 | 62 | 71 |
| Burn-in | Excellent | Excellent | Excellent | Good |

TABLE 49

|  | Example 101 | Example 102 | Example 103 | Example 104 |
|---|---|---|---|---|
| Liquid crystal composition | Liquid crystal composition 26 | Liquid crystal composition 26 | Liquid crystal composition 26 | Liquid crystal composition 26 |
| Color filter | Color filter 1 | Color filter 2 | Color filter 3 | Color filter 4 |
| VHR | 99.8 | 99.6 | 99.4 | 99.4 |
| ID | 15 | 19 | 37 | 34 |
| Burn-in | Excellent | Excellent | Excellent | Excellent |

The liquid crystal display apparatuses of Examples 97 to 104 had a high VHR and a small ID. Furthermore, a residual image was absent in the burn-in evaluation. Even when a residual image was present, it was very slight and at an acceptable level.

Examples 105 to 112

A specific one of the liquid crystals shown in Table 50, which had a positive dielectric anisotropy, was held between the first and second substrates as in Example 1. Then, liquid crystal display apparatuses of Examples 105 to 112 were each prepared using a specific one of the color filters shown in Table 8. The VHR and ID of each liquid crystal display apparatus were measured. Each liquid crystal display apparatus was evaluated in terms of burn-in. Tables 51 and 52 summarize the results.

TABLE 50

|  | Liquid crystal composition 27 | Liquid crystal composition 28 |
|---|---|---|
| 5-Cy-Cy-1 | 5 | 5 |
| 0d1-Cy-Cy-3 | 21 | 31 |
| 1d1-Cy-Cy-3 | 5 | 10 |
| 0d1-Cy-Cy-Ph-1 |  | 5 |
| 0d1-Cy-Ph—Ph-3 | 9 | 9 |
| 2-Cy-Cy-Ph—F | 2 | 2 |
| 3-Cy-Cy-Ph—Cl | 2 | 2 |
| 5-Cy-Cy-Ph—Cl | 2 | 2 |
| 3-Cy-Cy-Ph3—F | 2 | 2 |
| 4-Cy-Cy-Ph3—F | 2 |  |
| 3-Cy-2-Cy-Ph3—F | 3 | 2 |
| 4-Cy-2-Cy-Ph3—F | 3 | 2 |
| 5-Cy-2-Cy-Ph3—F | 3 | 2 |
| 3-Cy-Cy-2-Ph3—F | 7 | 4 |
| 5-Cy-Cy-2-Ph3—F | 4 | 2 |
| 2-Cy-Ph—Ph—F | 2 | 2 |
| 3-Cy-Ph—Ph—F | 2 | 2 |
| 2-Cy-Ph—Ph1—F | 2 | 2 |
| 5-Cy-Ph—Ph1—F | 4 | 2 |
| 3-Cy-Ph—Ph3—F | 4 | 2 |
| 5-Cy-Ph—Ph3—F | 4 | 2 |
| 5-Ph—Ph3—CFFO—Ph—CF3 | 3 | 2 |
| 5-Ph—Ph3—CFFO—Ph3—F | 6 | 4 |
| 3-Ph—Ph3—CFFO—Ph—OCFFF | 3 | 2 |
| Total composition proportion | 100 | 100 |

TABLE 50-continued

|  | Liquid crystal composition 27 | Liquid crystal composition 28 |
|---|---|---|
| Tni/° C. | 75.3 | 75.0 |
| Δn (20° C.) | 0.095 | 0.089 |
| Δε (20° C.) | 4.9 | 3.2 |

TABLE 51

|  | Example 105 | Example 106 | Example 107 | Example 108 |
|---|---|---|---|---|
| Liquid crystal composition | Liquid crystal composition 27 | Liquid crystal composition 27 | Liquid crystal composition 27 | Liquid crystal composition 27 |
| Color filter | Color filter 1 | Color filter 2 | Color filter 3 | Color filter 4 |
| VHR | 99.6 | 99.6 | 99.5 | 99.3 |
| ID | 12 | 15 | 36 | 66 |
| Burn-in | Excellent | Excellent | Excellent | Good |

TABLE 52

|  | Example 109 | Example 110 | Example 111 | Example 112 |
|---|---|---|---|---|
| Liquid crystal composition | Liquid crystal composition 28 | Liquid crystal composition 28 | Liquid crystal composition 28 | Liquid crystal composition 28 |
| Color filter | Color filter 1 | Color filter 2 | Color filter 3 | Color filter 4 |
| VHR | 99.7 | 99.5 | 99.3 | 99.2 |
| ID | 16 | 27 | 53 | 72 |
| Burn-in | Excellent | Excellent | Good | Good |

The liquid crystal display apparatuses of Examples 105 to 112 had a high VHR and a small ID. Furthermore, a residual image was absent in the burn-in evaluation. Even when a residual image was present, it was very slight and at an acceptable level.

Examples 113 to 120

A specific one of the liquid crystals shown in Table 53, which had a positive dielectric anisotropy, was held between the first and second substrates as in Example 1. Then, liquid crystal display apparatuses of Examples 113 to 120 were each prepared using a specific one of the color filters shown in Table 8. The VHR and ID of each liquid crystal display apparatus were measured. Each liquid crystal display apparatus was evaluated in terms of burn-in. Tables 54 and 55 summarize the results.

TABLE 53

|  | Liquid crystal composition 29 | Liquid crystal composition 30 |
|---|---|---|
| 0d1-Cy-Cy-3 | 25 | 33 |
| 1d1-Cy-Cy-3 |  | 4 |
| 0d1-Cy-Ph—Ph-3 |  | 3 |
| 3-Cy-Ph—Cl | 3 | 2 |
| 5-Cy-Ph—Cl | 3 | 2 |
| 7-Cy-Ph—Cl | 4 | 3 |
| 2-Cy-Cy-Ph—Cl | 4 | 4 |
| 3-Cy-Cy-Ph—Cl | 4 | 4 |
| 5-Cy-Cy-Ph—Cl | 4 | 4 |
| 3-Cy-2-Cy-Ph1—Cl | 2 | 2 |
| 2-Cy-Ph—Ph1—F | 5 | 4 |
| 3-Cy-Ph—Ph1—F | 5 | 4 |
| 5-Cy-Ph—Ph1—F | 9 | 6 |
| 3-Cy-Ph—Ph3—F | 10 | 8 |

TABLE 53-continued

|  | Liquid crystal composition 29 | Liquid crystal composition 30 |
|---|---|---|
| 5-Cy-Ph—Ph3—F | 10 | 8 |
| 3-Ph—Ph3—CFFO—Ph3—F | 4 | 3 |
| 3-Ph—Ph3—CFFO—Ph—OCFFF | 4 | 3 |
| 3-Cy-Ph1-T-Ph-2 | 2 | 2 |
| 3-Cy-Ph1—V—Ph-2 | 2 | 1 |
| Total composition proportion | 100 | 100 |
| Tni/° C. | 77.7 | 75.7 |
| Δn (20° C.) | 0.107 | 0.100 |
| Δε (20° C.) | 3.9 | 3.0 |

TABLE 54

|  | Example 113 | Example 114 | Example 115 | Example 116 |
|---|---|---|---|---|
| Liquid crystal composition | Liquid crystal composition 29 | Liquid crystal composition 29 | Liquid crystal composition 29 | Liquid crystal composition 29 |
| Color filter | Color filter 1 | Color filter 2 | Color filter 3 | Color filter 4 |
| VHR | 99.7 | 99.6 | 99.4 | 99.3 |
| ID | 17 | 23 | 48 | 60 |
| Burn-in | Excellent | Excellent | Excellent | Good |

TABLE 55

|  | Example 117 | Example 118 | Example 119 | Example 120 |
|---|---|---|---|---|
| Liquid crystal composition | Liquid crystal composition 30 | Liquid crystal composition 30 | Liquid crystal composition 30 | Liquid crystal composition 30 |
| Color filter | Color filter 1 | Color filter 2 | Color filter 3 | Color filter 4 |
| VHR | 99.7 | 99.6 | 99.4 | 99.5 |
| ID | 19 | 22 | 45 | 35 |
| Burn-in | Excellent | Excellent | Excellent | Excellent |

The liquid crystal display apparatuses of Examples 113 to 120 had a high VHR and a small ID. Furthermore, a residual image was absent in the burn-in evaluation. Even when a residual image was present, it was very slight and at an acceptable level.

Examples 121 to 128

A specific one of the liquid crystals shown in Table 56, which had a positive dielectric anisotropy, was held between the first and second substrates as in Example 1. Then, liquid crystal display apparatuses of Examples 121 to 128 were each prepared using a specific one of the color filters shown in Table 8. The VHR and ID of each liquid crystal display apparatus were measured. Each liquid crystal display apparatus was evaluated in terms of burn-in. Tables 57 and 58 summarize the results.

TABLE 56

|  | Liquid crystal composition 31 | Liquid crystal composition 32 |
|---|---|---|
| 5-Cy-Cy-1 |  | 5 |
| 0d1-Cy-Cy-3 | 20 | 22 |
| 1d1-Cy-Cy-3 | 5 | 9 |
| 0d1-Cy-Cy-Ph-1 |  | 5 |
| 0d1-Cy-Ph—Ph-3 |  | 4 |
| 5-Cy-Ph—F | 5 | 4 |

TABLE 56-continued

|  | Liquid crystal composition 31 | Liquid crystal composition 32 |
|---|---|---|
| 7-Cy-Ph—F | 5 | 4 |
| 5-Cy-Cy-Ph—OCFFF | 6 | 4 |
| 3-Cy-2-Cy-Ph—OCFFF | 6 | 4 |
| 5-Cy-2-Cy-Ph—OCFFF | 6 | 4 |
| 3-Cy-Cy-2-Ph—OCFFF | 6 | 4 |
| 5-Cy-Cy-2-Ph—OCFFF | 6 | 4 |
| 2-Cy-Ph—Ph1—F | 6 | 4 |
| 3-Cy-Ph—Ph1—F | 6 | 4 |
| 5-Cy-Ph—Ph1—F | 12 | 9 |
| 3-Ph—Ph3—CFFO—Ph3—F | 2 | 3 |
| 5-Ph—Ph3—CFFO—Ph3—F | 5 | 4 |
| 3-Ph—Ph3—CFFO—Ph—OCFFF | 4 | 3 |
| Total composition proportion | 100 | 100 |
| Tni/° C. | 76.1 | 76.0 |
| Δn (20° C.) | 0.088 | 0.090 |
| Δε (20° C.) | 3.9 | 3.0 |

TABLE 57

|  | Example 121 | Example 122 | Example 123 | Example 124 |
|---|---|---|---|---|
| Liquid crystal composition | Liquid crystal composition 31 | Liquid crystal composition 31 | Liquid crystal composition 31 | Liquid crystal composition 31 |
| Color filter | Color filter 1 | Color filter 2 | Color filter 3 | Color filter 4 |
| VHR | 99.6 | 99.5 | 99.3 | 99.3 |
| ID | 22 | 39 | 59 | 68 |
| Burn-in | Excellent | Excellent | Good | Good |

TABLE 58

|  | Example 125 | Example 126 | Example 127 | Example 128 |
|---|---|---|---|---|
| Liquid crystal composition | Liquid crystal composition 32 | Liquid crystal composition 32 | Liquid crystal composition 32 | Liquid crystal composition 32 |
| Color filter | Color filter 1 | Color filter 2 | Color filter 3 | Color filter 4 |
| VHR | 99.8 | 99.6 | 99.5 | 99.4 |
| ID | 20 | 29 | 40 | 56 |
| Burn-in | Excellent | Excellent | Good | Good |

The liquid crystal display apparatuses of Examples 121 to 128 had a high VHR and a small ID. Furthermore, a residual image was absent in the burn-in evaluation. Even when a residual image was present, it was very slight and at an acceptable level.

Examples 129 to 132

A liquid crystal composition 33 was prepared by mixing the liquid crystal composition 1 used in Example 1, which had a positive dielectric anisotropy, with 0.3% by mass of 2-methyl-acrylic acid 4'-{2-[4-(2-acryloyloxy-ethyl)-phenoxycarbonyl]-ethyl}-biphenyl-4-yl ester. The liquid crystal composition 33 was held inside the TN cell used in Example 1. While a driving voltage was applied between the electrodes, ultraviolet irradiation (3.0 J/cm$^2$) was done for 600 seconds to perform a polymerization treatment. Subsequently, liquid crystal display apparatuses of Examples 129 to 132 were each prepared using a specific one of the color filters 1 to 4 shown in Table 8. The VHR and ID of each liquid crystal display apparatus were measured. Each liquid crystal display apparatus was evaluated in terms of burn-in. Table 59 summarizes the results.

TABLE 59

|  | Example 129 | Example 130 | Example 131 | Example 132 |
|---|---|---|---|---|
| Liquid crystal composition | Liquid crystal composition 33 | Liquid crystal composition 33 | Liquid crystal composition 33 | Liquid crystal composition 33 |
| Color filter | Color filter 1 | Color filter 2 | Color filter 3 | Color filter 4 |
| VHR | 99.6 | 99.4 | 99.3 | 99.2 |
| ID | 19 | 39 | 57 | 73 |
| Burn-in | Excellent | Good | Good | Good |

The liquid crystal display apparatuses of Examples 129 to 132 had a high VHR and a small ID. Furthermore, a residual image was absent in the burn-in evaluation. Even when a residual image was present, it was very slight and at an acceptable level.

Examples 133 to 136

A liquid crystal composition 34 was prepared by mixing the liquid crystal composition 29 having a positive dielectric anisotropy with 0.3% by mass of bismethacrylic acid biphenyl-4,4'-diyl ester. The liquid crystal composition 34 was held inside the TN cell used in Example 1. While a driving voltage was applied between the electrodes, ultraviolet irradiation (3.0 J/cm$^2$) was done for 600 seconds to perform a polymerization treatment. Subsequently, liquid crystal display apparatuses of Examples 133 to 136 were each prepared using a specific one of the color filters 1 to 4 shown in Table 8. The VHR and ID of each liquid crystal display apparatus were measured. Each liquid crystal display apparatus was evaluated in terms of burn-in. Table 60 summarizes the results.

TABLE 60

|  | Example 133 | Example 134 | Example 135 | Example 136 |
|---|---|---|---|---|
| Liquid crystal composition | Liquid crystal composition 34 | Liquid crystal composition 34 | Liquid crystal composition 34 | Liquid crystal composition 34 |
| Color filter | Color filter 1 | Color filter 2 | Color filter 3 | Color filter 4 |
| VHR | 99.7 | 99.6 | 99.4 | 99.3 |
| ID | 17 | 25 | 46 | 59 |
| Burn-in | Excellent | Excellent | Good | Good |

The liquid crystal display apparatuses of Examples 133 to 136 had a high VHR and a small ID. Furthermore, a residual image was absent in the burn-in evaluation. Even when a residual image was present, it was very slight and at an acceptable level.

Examples 137 to 140

A liquid crystal composition 35 was prepared by mixing the liquid crystal composition 32 having a positive dielectric anisotropy with 0.3% by mass of bismethacrylic acid 3-fluorobiphenyl-4,4'-diyl ester. The liquid crystal composition 35 was held inside the TN cell used in Example 1. While a driving voltage was applied between the electrodes, ultraviolet irradiation (3.0 J/cm$^2$) was done for 600 seconds to perform a polymerization treatment. Subsequently, liquid crystal display apparatuses of Examples 137 to 140 were each prepared using a specific one of the color filters 1 to 4 shown in Table 8. The VHR and ID of each liquid crystal display apparatus were measured. Each liquid crystal display apparatus was evaluated in terms of burn-in. Table 61 summarizes the results.

TABLE 61

|  | Example 137 | Example 138 | Example 139 | Example 140 |
|---|---|---|---|---|
| Liquid crystal composition | Liquid crystal composition 35 | Liquid crystal composition 35 | Liquid crystal composition 35 | Liquid crystal composition 35 |
| Color filter | Color filter 1 | Color filter 2 | Color filter 3 | Color filter 4 |
| VHR | 99.8 | 99.6 | 99.3 | 99.4 |
| ID | 15 | 27 | 59 | 47 |
| Burn-in | Excellent | Excellent | Good | Good |

The liquid crystal display apparatuses of Examples 137 to 140 had a high VHR and a small ID. Furthermore, a residual image was absent in the burn-in evaluation. Even when a residual image was present, it was very slight and at an acceptable level.

Examples 141 to 144

The liquid crystal shown in Table 62, which had a positive dielectric anisotropy, was held between the first and second substrates as in Example 1. Then, liquid crystal display apparatuses of Examples 141 to 144 were each prepared using a specific one of the color filters shown in Table 8. The VHR and ID of each liquid crystal display apparatus were measured. Each liquid crystal display apparatus was evaluated in terms of burn-in. Table 63 summarizes the results.

TABLE 62

|  | Liquid crystal composition 36 |
|---|---|
| 0d1-Cy-Cy-Ph-1 | 16 |
| 3-Ph—Ph3—CFFO—Ph3—F | 12 |
| 3-Cy-Cy-CFFO—Ph3—F | 7 |
| 3-Ph—Ph1—PH3—CFFO—Ph3—F | 2 |
| 0d1-Cy-Cy-3 | 28 |
| 1d1-Cy-Cy-3 | 9 |
| 0d3-Cy-Cy—Ph-1 | 14 |
| 2-Ph—Ph3—CFFO—Ph3—F | 2 |
| 2-Py—Ph—Ph3—CFFO—Ph3—F | 3 |
| 3-Py—Ph—Ph3—CFFO—Ph3—F | 6 |
| 3-Ph—Ph—Ph1—Ph3—F | 1 |
| Total composition proportion | 100 |
| Tni/° C. | 90.0 |
| Δn (20° C.) | 0.105 |
| Δε (20° C.) | 7.0 |

TABLE 63

|  | Example 141 | Example 142 | Example 143 | Example 144 |
|---|---|---|---|---|
| Liquid crystal composition | Liquid crystal composition 36 | Liquid crystal composition 36 | Liquid crystal composition 36 | Liquid crystal composition 36 |
| Color filter | Color filter 1 | Color filter 2 | Color filter 3 | Color filter 4 |
| VHR | 99.8 | 99.7 | 99.5 | 99.4 |
| ID | 15 | 25 | 42 | 53 |
| Burn-in | Excellent | Excellent | Excellent | Good |

The liquid crystal display apparatuses of Examples 141 to 144 had a high VHR and a small ID. Furthermore, a residual image was absent in the burn-in evaluation. Even when a residual image was present, it was very slight and at an acceptable level.

Examples 145 to 148

The liquid crystal shown in Table 64, which had a positive dielectric anisotropy, was held between the first and second substrates as in Example 1. Then, liquid crystal display apparatuses of Examples 145 to 148 were each prepared using a specific one of the color filters shown in Table 8. The VHR and ID of each liquid crystal display apparatus were measured. Each liquid crystal display apparatus was evaluated in terms of burn-in. Table 65 summarizes the results.

TABLE 64

|  | Liquid crystal composition 37 |
|---|---|
| 0d1-Cy-Cy-3 | 15 |
| 1d1-Cy-Cy-3 | 2 |
| 2-Cy-Cy-Ph3—F | 8 |
| 0d1-Cy-Cy-Ph-1 | 8 |
| 3-Cy-Cy-Ph—OCFFF | 14 |
| 3-Cy-Ph—Ph3—F | 9 |
| 3-Ph—Ph3—CFFO—Ph3—F | 11 |
| 3-Cy-Cy-CFFO—Ph3—F | 9 |
| 5-Cy-Cy-CFFO—Ph3—F | 8 |
| 2-Ph—Ph1—Ph-3 | 6 |
| 2-Ph—Ph1—Ph-4 | 4 |
| 3-Cy-Cy-Ph1—Ph3—F | 3 |
| 5-Ph1—Ph3—CFFO—Ph3—F | 3 |
| Total composition proportion | 100 |
| Tni/° C. | 90.4 |
| Δn (20° C.) | 0.105 |
| Δε (20° C.) | 9.0 |

TABLE 65

|  | Example 145 | Example 146 | Example 147 | Example 148 |
|---|---|---|---|---|
| Liquid crystal composition | Liquid crystal composition 37 | Liquid crystal composition 37 | Liquid crystal composition 37 | Liquid crystal composition 37 |
| Color filter | Color filter 1 | Color filter 2 | Color filter 3 | Color filter 4 |
| VHR | 99.7 | 99.6 | 99.4 | 99.4 |
| ID | 18 | 22 | 49 | 51 |
| Burn-in | Excellent | Excellent | Excellent | Excellent |

The liquid crystal display apparatuses of Examples 145 to 148 had a high VHR and a small ID. Furthermore, a residual image was absent in the burn-in evaluation.

Examples 149 to 152

The liquid crystal shown in Table 66, which had a positive dielectric anisotropy, was held between the first and second substrates as in Example 1. Then, liquid crystal display apparatuses of Examples 149 to 152 were each prepared using a specific one of the color filters shown in Table 8. The VHR and ID of each liquid crystal display apparatus were measured. Each liquid crystal display apparatus was evaluated in terms of burn-in. Table 67 summarizes the results.

TABLE 66

|  | Liquid crystal composition 38 |
|---|---|
| 0d1-Cy-Cy-3 | 38 |
| 1d1-Cy-Cy-3 | 14 |
| 3-Ph—Ph3—CFFO—Ph3—F | 8 |
| 3-Cy-Cy-CFFO—Ph3—F | 15 |
| 0d3-Cy-Cy-Ph-1 | 9 |
| 3-Ph—Ph1—Ph3—CFFO—Ph3—F | 2 |
| 4-Ph—Ph1—Ph3—CFFO—Ph3—F | 7 |
| 5-Ph—Ph1—Ph3—CFFO—Ph3—F | 7 |
| Total composition proportion | 100 |
| Tni/° C. | 81.8 |
| Δn (20° C.) | 0.099 |
| Δε (20° C.) | 8.0 |

TABLE 67

|  | Example 149 | Example 150 | Example 151 | Example 152 |
|---|---|---|---|---|
| Liquid crystal composition | Liquid crystal composition 38 | Liquid crystal composition 38 | Liquid crystal composition 38 | Liquid crystal composition 38 |
| Color filter | Color filter 1 | Color filter 2 | Color filter 3 | Color filter 4 |
| VHR | 99.8 | 99.6 | 99.3 | 99.3 |
| ID | 15 | 25 | 60 | 66 |
| Burn-in | Excellent | Excellent | Excellent | Good |

The liquid crystal display apparatuses of Examples 149 to 152 had a high VHR and a small ID. Furthermore, a residual image was absent in the burn-in evaluation. Even when a residual image was present, it was very slight and at an acceptable level.

Examples 153 to 156

The liquid crystal shown in Table 68, which had a positive dielectric anisotropy, was held between the first and second substrates as in Example 1. Then, liquid crystal display apparatuses of Examples 153 to 156 were each prepared using a specific one of the color filters shown in Table 8. The VHR and ID of each liquid crystal display apparatus were measured. Each liquid crystal display apparatus was evaluated in terms of burn-in. Table 69 summarizes the results.

TABLE 68

|  | Liquid crystal composition 39 |
|---|---|
| 3-Ph—Ph3—CFFO—Ph3—F | 12 |
| 0d1-Cy-Cy-3 | 25 |
| 1d1-Cy-Cy-3 | 7 |
| 0d1-Cy-Cy-Ph-1 | 16 |
| 3-Ph—Ph1—Ph3—CFFO—Ph3—F | 5 |
| 0d3-Cy-Cy-Ph-1 | 8 |
| 3-Py—Ph—Ph3—CFFO—Ph3—F | 5 |
| 5-Cy-Cy-CFFO—Ph3—F | 4 |
| 2-Py—Ph—Ph3—CFFO—Ph3—F | 3 |
| 3-Cy-Ph—Ph1—F | 5 |
| 3-Cy-Cy-CFFO—Ph3—F | 10 |
| Total composition proportion | 100 |
| Tni/° C. | 85.3 |
| Δn (20° C.) | 0.105 |
| Δε (20° C.) | 9.3 |

TABLE 69

| | Example 153 | Example 154 | Example 155 | Example 156 |
|---|---|---|---|---|
| Liquid crystal composition | Liquid crystal composition 39 | Liquid crystal composition 39 | Liquid crystal composition 39 | Liquid crystal composition 39 |
| Color filter | Color filter 1 | Color filter 2 | Color filter 3 | Color filter 4 |
| VHR | 99.6 | 99.5 | 99.3 | 99.2 |
| ID | 23 | 38 | 64 | 68 |
| Burn-in | Excellent | Excellent | Excellent | Good |

The liquid crystal display apparatuses of Examples 153 to 156 had a high VHR and a small ID. Furthermore, a residual image was absent in the burn-in evaluation. Even when a residual image was present, it was very slight and at an acceptable level.

Examples 157 to 160

The liquid crystal shown in Table 70, which had a positive dielectric anisotropy, was held between the first and second substrates as in Example 1. Then, liquid crystal display apparatuses of Examples 157 to 160 were each prepared using a specific one of the color filters shown in Table 8. The VHR and ID of each liquid crystal display apparatus were measured. Each liquid crystal display apparatus was evaluated in terms of burn-in. Table 71 summarizes the results.

TABLE 70

| | Liquid crystal composition 40 |
|---|---|
| 3-Ph—Ph3—CFFO—Ph3—F | 7 |
| 0d1-Cy-Cy-3 | 34 |
| 0d1-Cy-Cy-Ph-1 | 7 |
| 3-Cy-Cy-CFFO—Ph3—F | 8 |
| 3-Cy-Cy-Ph1—Ph3—F | 9 |
| 3-Py—Ph—Ph3—CFFO—Ph3—F | 10 |
| 5-Cy-Cy-CFFO—Ph3—F | 10 |
| 3-Cy-Cy-Ph—OCFFF | 4 |
| 3-Ph—Ph1—Ph3—F | 6 |
| 3-Cy-Ph—Ph-Cy-3 | 5 |
| Total composition proportion | 100 |
| Tni/° C. | 93.2 |
| Δn (20° C.) | 0.098 |
| Δε (20° C.) | 9.3 |

TABLE 71

| | Example 157 | Example 158 | Example 159 | Example 160 |
|---|---|---|---|---|
| Liquid crystal composition | Liquid crystal composition 40 | Liquid crystal composition 40 | Liquid crystal composition 40 | Liquid crystal composition 40 |
| Color filter | Color filter 1 | Color filter 2 | Color filter 3 | Color filter 4 |
| VHR | 99.8 | 99.7 | 99.5 | 99.4 |
| ID | 16 | 19 | 40 | 55 |
| Burn-in | Excellent | Excellent | Excellent | Excellent |

The liquid crystal display apparatuses of Examples 157 to 160 had a high VHR and a small ID. Furthermore, a residual image was absent in the burn-in evaluation.

The invention claimed is:

1. A liquid crystal display apparatus comprising a first substrate, a second substrate, a liquid crystal composition layer held between the first substrate and the second substrate, a color filter including a black matrix and at least RGB three-color pixel portions, a pixel electrode, and a common electrode,
wherein the liquid crystal composition layer is composed of a liquid crystal composition including one or more compounds represented by General Formula (LC1), the amount of the one or more compounds being more than 90% by mass of the total amount of liquid crystal compounds having a dielectric anisotropy of 2 or more, the liquid crystal compounds constituting the liquid crystal composition,

[Chem. 1]

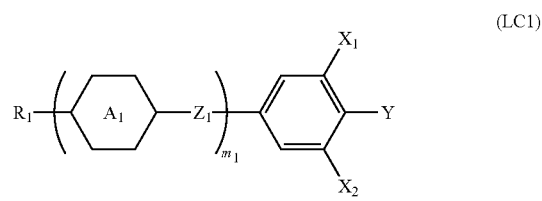

(LC1)

(where $R_1$ represents an alkyl group having 1 to 15 carbon atoms; one or more $CH_2$ groups of the alkyl group may be replaced by —O—, —CH=CH—, —CO—, —OCO—, —COO—, —C≡C—, —CF$_2$O—, or —OCF$_2$— in such a manner that an oxygen atom is not directly adjacent to another oxygen atom; one or more hydrogen atoms of the alkyl group may optionally be replaced by a halogen; $A_1$ each independently represents any one of the following structures:

[Chem. 2]

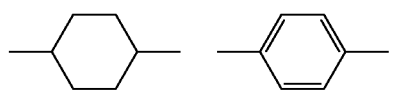

(in these structures, one or more $CH_2$ groups of the cyclohexane ring may be replaced by an oxygen atom, one or more CH groups of the benzene ring may be replaced by a nitrogen atom, and one or more hydrogen atoms may be replaced by Cl, F, $CF_3$, or $OCF_3$); $X_1$ and $X_2$ each independently represent H, Cl, F, $CF_3$, or $OCF_3$; Y represents Cl, F, $CF_3$, or $OCF_3$; $Z_1$ represents a single bond, —CH=CH—, —C≡C—, —CH$_2$CH$_2$—, —(CH$_2$)$_4$—, —OCH$_2$—, —CH$_2$O—, —OCF$_2$—, or —CF$_2$O—; and $m_1$ is an integer of 1 to 3, and
wherein the RGB three-color pixel portions include, as a coloring material, a pigment having a water-soluble content of 0% by mass or more and 1.5% by mass or less and/or a specific electrical conductivity of 10 μS/cm or more and 150 μS/cm or less.

2. The liquid crystal display apparatus according to claim 1, wherein the RGB three-color pixel portions include, as a coloring material, a pigment having a water-soluble content of 0% by mass or more and 1.0% by mass or less and a specific electrical conductivity of 10 μS/cm or more and 100 μS/cm or less.

3. The liquid crystal display apparatus according to claim 1, wherein the RGB three-color pixel portions include an R pixel portion including, as a coloring material, a diketopyrrolopyrrole-based red pigment; a G pixel portion including, as a coloring material, a halogenated metal phthalocyanine pigment; and a B pixel portion including, as a coloring material, an ∈-type phthalocyanine pigment and/or a triarylmethane pigment.

4. The liquid crystal display apparatus according to claim 3,
wherein the halogenated metal phthalocyanine pigment included in the G pixel portion includes, as a central metal, a metal selected from the group consisting of Al, Si, Sc, Ti, V, Mg, Fe, Co, Ni, Zn, Cu, Ga, Ge, Y, Zr, Nb, In, Sn, and Pb,
wherein, when the central metal is trivalent, one group selected from a halogen atom, a hydroxyl group, and a sulfonic group is bonded to the central metal or the central metal is oxo-cross-linked or thio-cross-linked, and
wherein, when the central metal is a tetravalent metal, one oxygen atom or two identical or different groups selected from a halogen atom, a hydroxyl group, and a sulfonic group are bonded to the central metal.

5. The liquid crystal display apparatus according to claim 3, wherein the halogenated metal phthalocyanine pigment included in the G pixel portion is C.I. Pigment Green 58.

6. The liquid crystal display apparatus according to claim 3, wherein the ∈-type phthalocyanine pigment included in the B pixel portion is C.I. Pigment Blue 15:6.

7. The liquid crystal display apparatus according to claim 3, wherein the triarylmethane pigment included in the B pixel portion includes C.I. Pigment Blue 1 and/or a triarylmethane pigment represented by General Formula (1),

[Chem. 3]

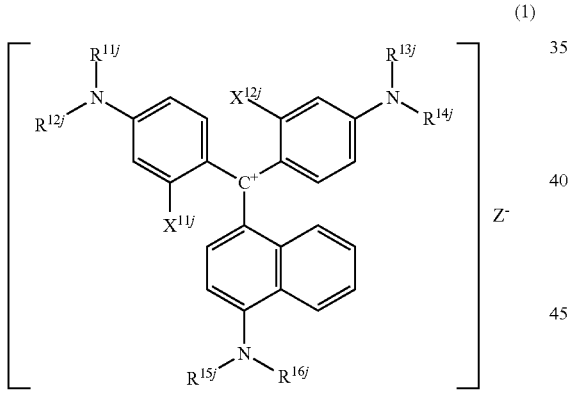

(1)

(where $R^{11j}$ to $R^{16j}$ each independently represent a hydrogen atom, an alkyl group having 1 to 8 carbon atoms which may be substituted, or an aryl group which may be substituted; when $R^{11j}$ to $R^{16j}$ represent an alkyl group which may be substituted, adjacent $R^{11j}$ and $R^{12j}$, adjacent $R^{13j}$ and $R^{14j}$, and adjacent $R^{15j}$ and $R^{16j}$ may be each bonded to each other to form a ring structure; $X^{11j}$ and $X^{12j}$ each independently represent a hydrogen atom, a halogen atom, or an alkyl group having 1 to 8 carbon atoms which may be substituted; $Z^-$ is at least one anion selected from a heteropolyoxometalate anion represented by $(P_2Mo_yW_{18-y}O_{62})^{6-}/6$ where y is an integer of 0, 1, 2, or 3, a heteropolyoxometalate anion represented by $(SiMoW_{11}O_{40})^{4-}/4$, and a lacunary Dawson-type phosphotungstic acid heteropolyoxometalate anion; and, when one molecule includes a plurality of structures represented by Formula (1), the structures may be identical or different).

8. The liquid crystal display apparatus according to claim 3, wherein the diketopyrrolopyrrole-based red pigment included in the R pixel portion includes one or more pigments selected from C.I. Pigment Red 254, C.I. Pigment Red 255, C.I. Pigment Red 264, C.I. Pigment Red 272, C.I. Pigment Orange 71, and C.I. Pigment Orange 73.

9. The liquid crystal display apparatus according to claim 1, wherein the color filter includes the black matrix, the RGB three-color pixel portions, and a Y pixel portion including, as a coloring material, a pigment having a water-soluble content of 1.5% or less and/or a specific electrical conductivity of 150 μS/cm or less.

10. The liquid crystal display apparatus according to claim 1, wherein the liquid crystal composition layer is composed of a liquid crystal composition including one or more compounds represented by General Formula (LC5),

[Chem. 4]

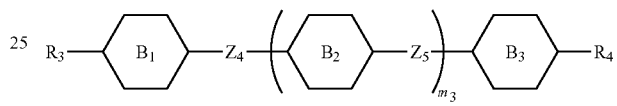

(LC5)

(where $R_3$ and $R_4$ each independently represent an alkyl group having 1 to 15 carbon atoms; one or more $CH_2$ groups of the alkyl group may be replaced by —O—, —CH=CH—, —CO—, —OCO—, —COO—, —C≡C—, —CF$_2$O—, or —OCF$_2$— in such a manner that an oxygen atom is not directly adjacent to another oxygen atom; one or more hydrogen atoms of the alkyl group may optionally be replaced by a halogen; $B_1$ to $B_3$ each independently represent any one of the following structures:

[Chem. 5]

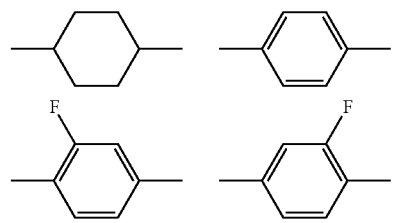

(in these structures, one or more $CH_2CH_2$ groups of the cyclohexane ring may be replaced by —CH=CH—, —CF$_2$O—, or —OCF$_2$— and one or more CH groups of the benzene ring may be replaced by a nitrogen atom); $Z_4$ and $Z_5$ each independently represent a single bond, —CH=CH—, —CF=CF—, —C≡C—, —CH$_2$CH$_2$—, —(CH$_2$)$_4$—, —COO—, —OCH$_2$—, —CH$_2$O—, —OCF$_2$—, or —CF$_2$O—; and $m_3$ is 0 to 3).

11. The liquid crystal display apparatus according to claim 1, wherein the compound represented by General Formula (LC-1) is one or more compounds selected from a group consisting of compounds represented by General Formula (LC1)-1 to General Formula (LC1)-4,

[Chem. 6]

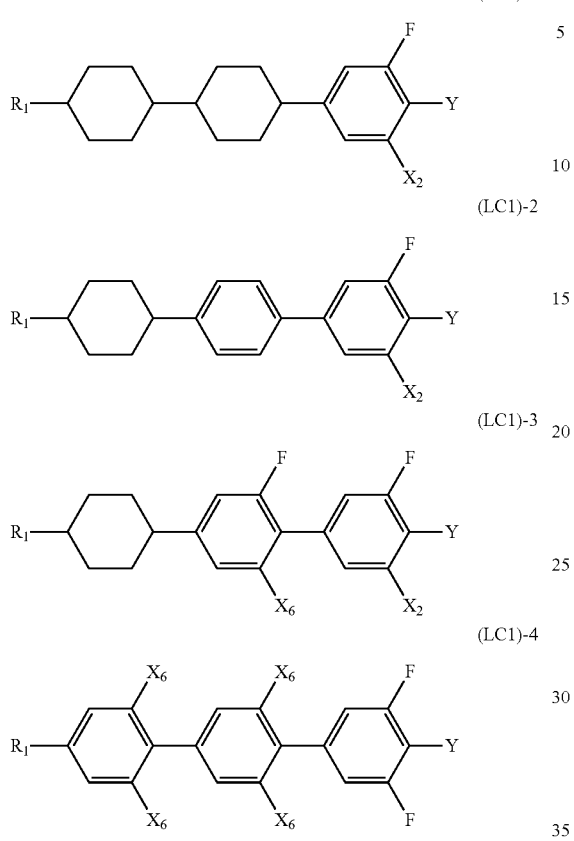

(LC1)-1, (LC1)-2, (LC1)-3, (LC1)-4

(where $R_1$ represents an alkyl group having 1 to 15 carbon atoms, one or more $CH_2$ groups of the alkyl group may be replaced by —O—, —CH=CH—, —CO—, —OCO—, —COO—, —C≡—, —CF$_2$O—, or —OCF$_2$— in such a manner that an oxygen atom is not directly adjacent to another oxygen atom; $X_2$ and $X_6$ each independently represent a hydrogen atom, Cl, F, $CF_3$, or $OCF_3$; when a plurality of $X_6$'s are present, they may be identical or different; and Y represents Cl, F, $CF_3$, $OCH_2F$, $OCHF_2$, or $OCF_3$).

12. The liquid crystal display apparatus according to claim 10, wherein the compound represented by General Formula (LC5) is one or more compounds selected from a group consisting of compounds represented by General Formula (LC5)-1 to General Formula (LC5)-14,

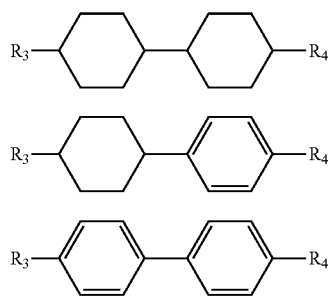

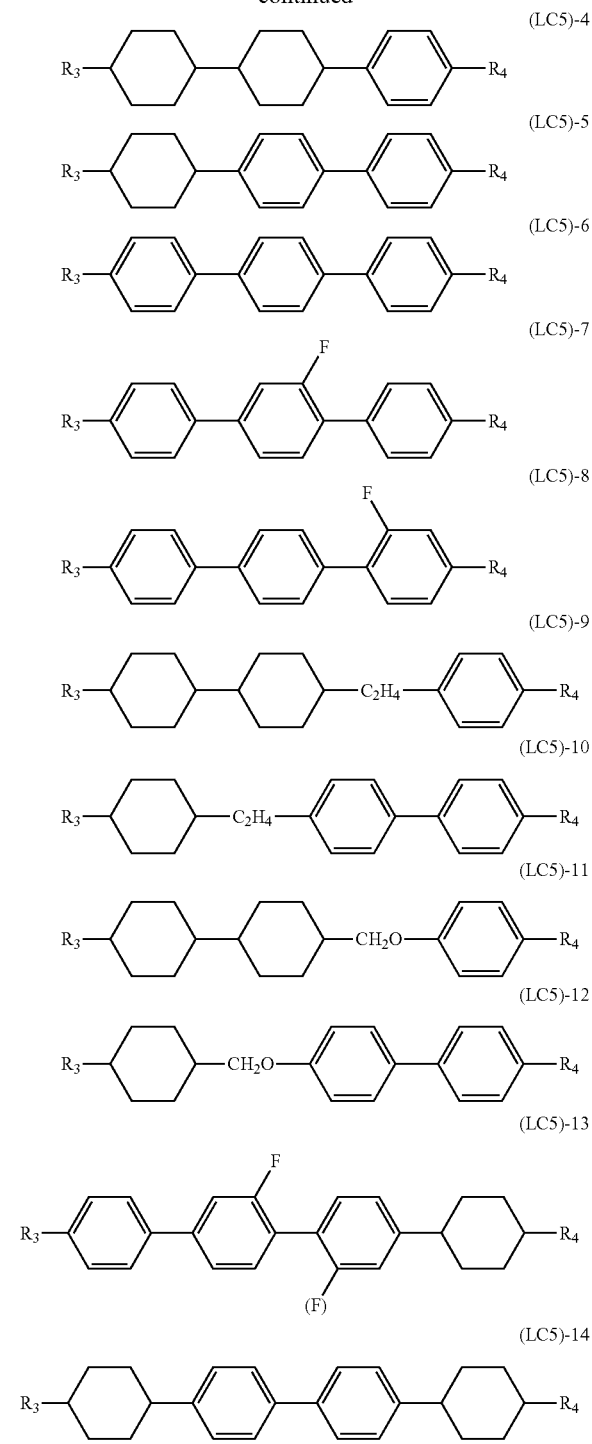

(LC5)-1 through (LC5)-14

(where $R_3$ and $R_4$ each independently represent an alkyl group having 1 to 7 carbon atoms, an alkoxy group having 1 to 7 carbon atoms, an alkenyl group having 2 to 7 carbon atoms, or an alkenyloxy group having 2 to 7 carbon atoms).

13. The liquid crystal display apparatus according to claim 1, wherein the liquid crystal composition layer is composed of a polymer prepared by polymerizing a liquid crystal composition including one or more polymerizable compounds.

14. The liquid crystal display apparatus according to claim 13, wherein the one or more polymerizable compounds are represented by General Formula (PC1),

[Chem. 8]

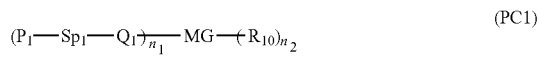

(PC1)

(where $P_1$ represents a polymerizable functional group; $Sp_1$ represents a spacer group having 0 to 20 carbon atoms; $Q_1$ represents a single bond, —O—, —NH—, —NHCOO—, —OCONH—, —CH=CH—, —CO—, —COO—, —OCO—, —OCOO—, —OOCO—, —CH=CH—, —CH=CH—COO—, —OCO—CH=CH—, or —C≡C—; $n_1$ and $n_2$ are 1, 2, or 3; MG represents a mesogenic group or a mesogenic supporting group; $R_{10}$ represents a halogen atom, a cyano group, or an alkyl group having 1 to 25 carbon atoms, and one or more $CH_2$ groups of the alkyl group may be replaced by —O—, —S—, —NH—, —N(CH$_3$)—, —CO—, —COO—, —OCO—, —OCOO—, —SCO—, —COS—, or —C≡C— in such a manner that an oxygen atom is not directly adjacent to another oxygen atom; and, in another case, $R_{10}$ represents $P_2$—$Sp_2$-$Q_2$- (where $P_2$, $Sp_2$, $Q_2$ independently represent the same things as $P_1$, $Sp_1$, $Q_1$, respectively)).

* * * * *